(12) United States Patent
Gohl et al.

(10) Patent No.: US 11,393,350 B2
(45) Date of Patent: *Jul. 19, 2022

(54) SYSTEMS AND METHODS FOR VEHICLE GUIDANCE USING DEPTH MAP GENERATION

(71) Applicant: GoPro, Inc., San Mateo, CA (US)

(72) Inventors: Pascal Gohl, Winterthur (CH); Sammy Omari, Zurich (CH)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,506

(22) Filed: Aug. 5, 2020

(65) Prior Publication Data
US 2021/0027641 A1    Jan. 28, 2021

Related U.S. Application Data

(63) Continuation of application No. 16/360,097, filed on Mar. 21, 2019, now Pat. No. 10,769,957, which is a (Continued)

(51) Int. Cl.
*H04N 7/18* (2006.01)
*G08G 5/04* (2006.01)
(Continued)

(52) U.S. Cl.
CPC .......... *G08G 5/045* (2013.01); *B64C 39/024* (2013.01); *B64D 47/08* (2013.01); *G06K 9/6215* (2013.01);
(Continued)

(58) Field of Classification Search
CPC ........ G08G 5/045; G08G 5/0069; G06T 7/73; G06T 5/00; G06T 7/20; G06T 7/0002; G06T 7/60; G06T 2207/30168; G06T 2207/20021; G06T 2200/04; G06T 2207/30252; G06T 2207/10012; G06T 7/593; H04N 13/128; H04N 2013/0081; H04N 13/239; H04N 13/271; G06K 9/6215; G06K 9/66; G06K 9/52; G06K 9/00805; G06K 9/0063; B64C 39/024;
(Continued)

(56) References Cited

U.S. PATENT DOCUMENTS 3,180,205 A    4/1965  Heppe
6,141,034 A   10/2000  McCutchen
(Continued)

*Primary Examiner* — Shan E Elahi
(74) *Attorney, Agent, or Firm* — Young Basile Hanlon & MacFarlane, P.C.

(57) ABSTRACT

This disclosure relates to systems and methods for vehicle guidance. Stereo images may be obtained at different times using a stereo image sensor. A depth image may be determined based on an earlier obtained pair of stereo images. The depth image may be refined based on predictions of an earlier stereo image and a later obtained stereo image. Depth information for an environment around a vehicle may be obtained. The depth information may characterize distances between the vehicle and the environment around the vehicle. A spherical depth map may be generated from the depth information. Maneuver controls for the vehicle may be provided based on the spherical depth map.

20 Claims, 26 Drawing Sheets

Related U.S. Application Data continuation of application No. 15/204,375, filed on Jul. 7, 2016, now Pat. No. 10,269,257.

(60) Provisional application No. 62/203,745, filed on Aug. 11, 2015, provisional application No. 62/203,765, filed on Aug. 11, 2015, provisional application No. 62/203,754, filed on Aug. 11, 2015.

(51) Int. Cl.

| | | |
|---|---|---|
| *G06T 5/00* | (2006.01) | |
| *G06K 9/62* | (2022.01) | |
| *G06T 7/20* | (2017.01) | |
| *G06T 7/00* | (2017.01) | |
| *G06T 7/60* | (2017.01) | |
| *B64C 39/02* | (2006.01) | |
| *B64D 47/08* | (2006.01) | |
| *G08G 5/00* | (2006.01) | |
| *H04N 13/128* | (2018.01) | |
| *G06T 7/73* | (2017.01) | |
| *G06V 10/42* | (2022.01) | |
| *G06V 30/194* | (2022.01) | |
| *H04N 13/00* | (2018.01) | |

(52) U.S. Cl.
CPC ............. *G06T 5/00* (2013.01); *G06T 7/0002* (2013.01); *G06T 7/20* (2013.01); *G06T 7/60* (2013.01); *G06T 7/73* (2017.01); *G06V 10/42* (2022.01); *G06V 30/194* (2022.01); *G08G 5/0069* (2013.01); *H04N 13/128* (2018.05); *B64C 2201/027* (2013.01); *G06T 2200/04* (2013.01); *G06T 2207/20021* (2013.01); *G06T 2207/30168* (2013.01); *H04N 2013/0081* (2013.01)

(58) Field of Classification Search
CPC ........ B64C 2201/027; B64C 2201/141; B64C 2201/123; B64C 2201/127; B64D 47/08; G05D 1/106
USPC .......................................................... 348/47
See application file for complete search history.

(56) References Cited

U.S. PATENT DOCUMENTS

| | | | |
|---|---|---|---|
| 9,158,304 B2 | 10/2015 | Fleck | |
| 9,409,646 B2 | 8/2016 | Fleck | |
| 9,778,662 B2 | 10/2017 | Tang | |
| 10,269,257 B1* | 4/2019 | Gohl | G06K 9/52 |
| 10,769,957 B2* | 9/2020 | Gohl | G05D 1/106 |
| 2002/0180759 A1 | 12/2002 | Park | |
| 2003/0122942 A1* | 7/2003 | Parker | H04N 19/60 |
| | | | 375/E7.211 |
| 2005/0062869 A1 | 3/2005 | Zimmermann | |
| 2007/0093945 A1 | 4/2007 | Grzywna | |
| 2009/0122133 A1 | 5/2009 | Hartman | |
| 2009/0251530 A1 | 10/2009 | Cilia | |
| 2010/0250022 A1 | 9/2010 | Hines | |
| 2010/0265248 A1* | 10/2010 | Mccrae | G06T 15/205 |
| | | | 715/850 |
| 2010/0268457 A1* | 10/2010 | Mccrae | G06T 15/30 |
| | | | 701/408 |
| 2011/0181689 A1* | 7/2011 | Kweon | H04N 5/23238 |
| | | | 348/37 |
| 2012/0098926 A1* | 4/2012 | Kweon | H04N 5/3696 |
| | | | 348/308 |
| 2012/0154785 A1 | 6/2012 | Gilliland | |
| 2013/0010111 A1* | 1/2013 | Laforte | H04N 5/23216 |
| | | | 348/143 |
| 2013/0094705 A1 | 4/2013 | Tyagi | |
| 2013/0166103 A1 | 6/2013 | Ko | |
| 2013/0266211 A1 | 10/2013 | Tippetts | |
| 2013/0345920 A1 | 12/2013 | Duggan | |
| 2014/0036064 A1 | 2/2014 | Lu | |
| 2014/0132804 A1 | 5/2014 | Guissin | |
| 2014/0192144 A1 | 7/2014 | St. Clair | |
| 2014/0240464 A1 | 8/2014 | Lee | |
| 2014/0267596 A1 | 9/2014 | Geerds | |
| 2014/0267733 A1* | 9/2014 | Wu | G08G 1/054 |
| | | | 348/149 |
| 2014/0267752 A1 | 9/2014 | Huang | |
| 2014/0324253 A1 | 10/2014 | Duggan | |
| 2014/0362176 A1 | 12/2014 | St. Clair | |
| 2015/0057917 A1 | 2/2015 | Cheng | |
| 2015/0071524 A1 | 3/2015 | Lee | |
| 2015/0142211 A1 | 5/2015 | Shehata | |
| 2015/0160658 A1 | 6/2015 | Reedman | |
| 2015/0166476 A1 | 6/2015 | Chen | |
| 2015/0249815 A1 | 9/2015 | Sandrew | |
| 2015/0304532 A1 | 10/2015 | Bart | |
| 2015/0336015 A1 | 11/2015 | Blum | |
| 2015/0350614 A1 | 12/2015 | Meier | |
| 2015/0358612 A1 | 12/2015 | Sandrew | |
| 2015/0363648 A1 | 12/2015 | Li | |
| 2015/0367958 A1 | 12/2015 | Lapstun | |
| 2015/0370250 A1 | 12/2015 | Bachrach | |
| 2016/0018822 A1 | 1/2016 | Nevdahs | |
| 2016/0031559 A1 | 2/2016 | Zang | |
| 2016/0037068 A1 | 2/2016 | Jenny | |
| 2016/0054737 A1 | 2/2016 | Soil | |
| 2016/0070265 A1* | 3/2016 | Liu | G05D 1/0088 |
| | | | 701/25 |
| 2016/0076892 A1 | 3/2016 | Zhou | |
| 2016/0101856 A1 | 4/2016 | Kohstall | |
| 2016/0105609 A1 | 4/2016 | Pettegrew | |
| 2016/0129999 A1 | 5/2016 | Mays | |
| 2016/0139596 A1 | 5/2016 | Na | |
| 2016/0139602 A1 | 5/2016 | Kohstall | |
| 2016/0179096 A1 | 6/2016 | Bradlow | |
| 2016/0189101 A1 | 6/2016 | Kantor | |
| 2016/0221186 A1 | 8/2016 | Perrone | |
| 2016/0259330 A1 | 9/2016 | Lacaze | |
| 2016/0274338 A1 | 9/2016 | Davies | |
| 2016/0286119 A1 | 9/2016 | Rondinelli | |
| 2016/0295108 A1 | 10/2016 | Cao | |
| 2016/0304198 A1 | 10/2016 | Jourdan | |
| 2016/0306351 A1 | 10/2016 | Fisher | |
| 2016/0327950 A1 | 11/2016 | Bachrach | |
| 2016/0336020 A1 | 11/2016 | Bradlow | |
| 2016/0344981 A1 | 11/2016 | Lunt | |
| 2016/0349599 A1 | 12/2016 | Macmillan | |
| 2016/0360104 A1 | 12/2016 | Zhang | |
| 2016/0376004 A1 | 12/2016 | Claridge | |
| 2017/0006340 A1 | 1/2017 | Enke | |
| 2017/0023394 A1 | 1/2017 | Akbar | |
| 2017/0041553 A1 | 2/2017 | Cao | |
| 2017/0090271 A1* | 3/2017 | Harris | H04N 7/183 |
| 2017/0123425 A1 | 5/2017 | Zhao | |
| 2017/0142400 A1* | 5/2017 | Peterson | H04N 13/271 |
| 2017/0148168 A1* | 5/2017 | Lindner | G06T 5/001 |
| 2017/0301109 A1 | 10/2017 | Chan | |
| 2017/0368413 A1 | 12/2017 | Shavit | |
| 2018/0146197 A1* | 5/2018 | Yi | H04N 19/124 |
| 2018/0278916 A1 | 9/2018 | Kim | |

\* cited by examiner

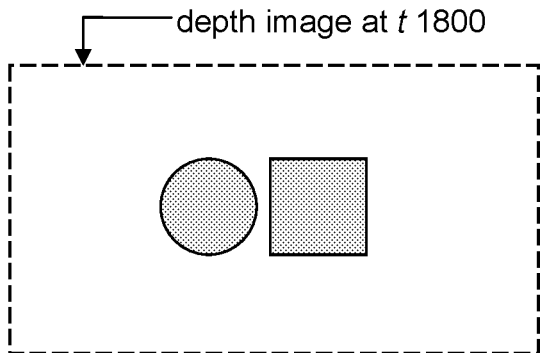
FIG. 18
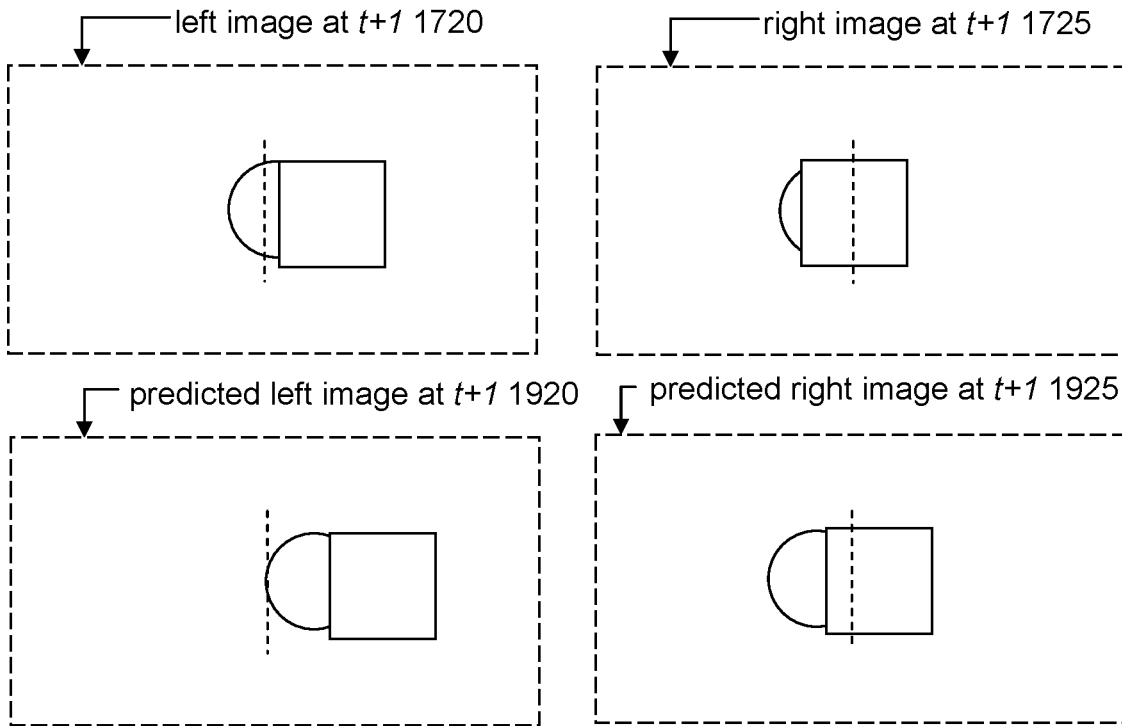
FIG. 19A     FIG. 19B

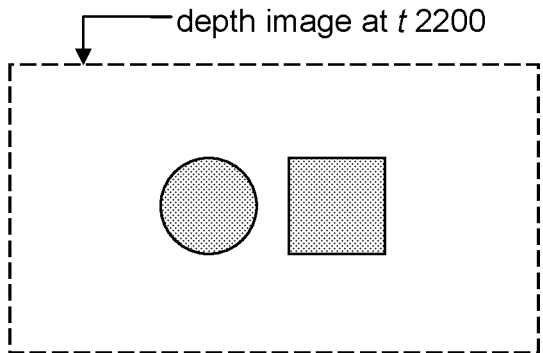 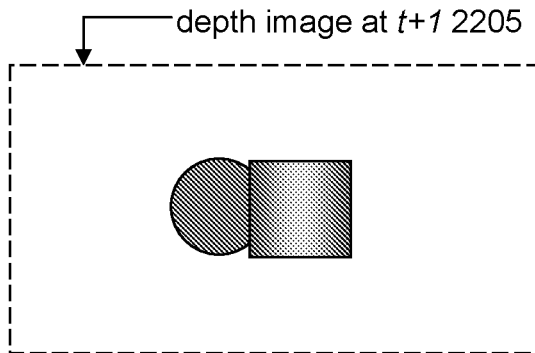
FIG. 22A  FIG. 22B
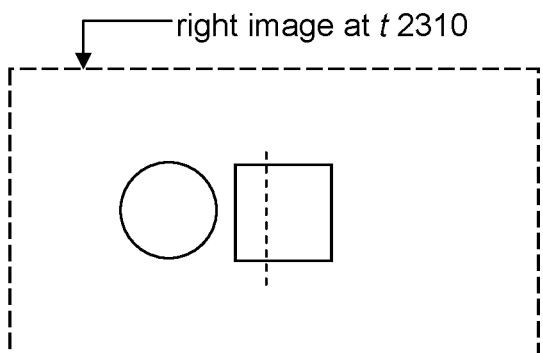 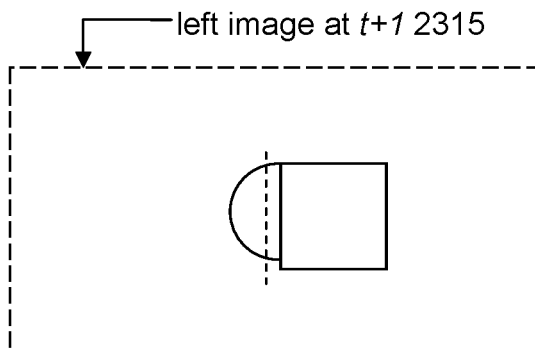
FIG. 23A  FIG. 23B

SYSTEMS AND METHODS FOR VEHICLE GUIDANCE USING DEPTH MAP GENERATION

CROSS-REFERENCE TO RELATED APPLICATION(S)

This application is a continuation of U.S. application patent Ser. No. 16/360,097, filed on Mar. 21, 2019, which is a continuation of U.S. application patent Ser. No. 15/204, 375, filed Jul. 7, 2016, now U.S. Pat. No. 10,269,257, which claims the benefit of U.S. Provisional Application No. 62/203,745, filed Aug. 11, 2015, U.S. Provisional Application No. 62/203,765, filed Aug. 11, 2015, and U.S. Provisional Application No. 62/203,754, filed Aug. 11, 2015, the entire disclosures of which are hereby incorporated by reference.

TECHNICAL FIELD

This disclosure relates to systems and methods for vehicle guidance.

BACKGROUND

A moving platform carrying a sensor to provide control and guidance for the moving platform is known. In such a system, the type and/or the extent of control and guidance provided may be limited by resource costs. For example, with respect to unmanned aerial vehicles, processing and/or storage resource costs of detecting objects limit the objects identified to those objects that are static, i.e., not moving. The amount of processing and/or storage resources necessary to process depth information for the environment of the unmanned aerial vehicles may be limited.

SUMMARY

In some aspects of the disclosure, a system configured to detect a moving object may include one or more of an image sensor, a motion and orientation sensor, one or more hardware-implemented processors and/or other components. Some or all of the system may be installed in a vehicle and/or be otherwise coupled with the vehicle. In some implementations, the one or more hardware-implemented processors may be located remotely from the vehicle. In some implementations, the one or more hardware-implemented processors may be located on or in the vehicle. In some implementations, the image sensor may be located remotely from the vehicle. In some implementations, the image sensor may be located on or in the vehicle. In some implementations, the image sensor, the motion and orientation sensor, and the one or more hardware-implemented processors may be carried on or in the vehicle, and the field of view of the image sensor may be a function of the position and orientation of the vehicle.

The image sensor may be configured to generate visual output signals conveying visual information within a field of view of the image sensor. The image sensor may include one or more of a charge-coupled device sensor, an active pixel sensor, a complementary metal-oxide semiconductor sensor, an N-type metal-oxide-semiconductor sensor, and/or other image sensors.

The motion and orientation sensor may be configured to generate motion and orientation output signals conveying motion information and orientation information of the image sensor. The motion and orientation sensor may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

The hardware-implemented processor(s) may include one or more computing/processing devices with one or more algorithms/logics implemented in hardware to perform one or more functions. Algorithms/logics may be implemented in hardware via machine-readable instructions (e.g., a hardware description language file, a netlist, etc.). As a non-limiting example, a hardware-implemented processor(s) may include one or more of a field-programmable gate array, an application-specific integrated circuit, and/or other hardware-implemented processors.

The hardware-implemented processor(s) may be configured by machine-readable instructions to execute one or more function components. The function components may include one or more of an imaging component, a predicted change component, a predicted imaging component, an actual change component, an optical flow component, an optical flow adjustment component, a detection component, a behavior component, and/or other function components.

The imaging component may be configured obtain a first image. The first image may be determined based on the visual output signals such that the visual output signals used to determine the first image are generated by the image sensor at a first time. The imaging component may be configured to obtain a second image. The second image may be determined based on the visual output signals such that the visual output signals used to determine the second image are generated by the image sensor at a second time that is subsequent to the first time.

The predicted change component may be configured to obtain a predicted change in the field of view of the image sensor between the first time and the second time. The predicted change in the field of view of the image sensor between the first time and the second time may be determined based on the motion and orientation output signals.

The predicted imaging component may be configured to determine a predicted first image by adjusting the second image based on the predicted change in the field of view.

The actual change component may be configured to obtain an actual change in the field of view of the image sensor between the first time and the second time. The actual change in the field of view of the image sensor between the first time and the second time may be determined based on a comparison of the first image with the predicted first image. In some implementations, the determination of the actual change in the field of view may include, when comparing the first image with the predicted first image, disregarding portions of the first image and the predicted first image.

The optical flow component may be configured to obtain optical flow between the first image and the second image. In some implementations, obtaining the optical flow between the first image and the second image may include obtaining individual optical flow vectors between the first image and the second image.

The optical flow adjustment component may be configured to obtain adjusted optical flow. The adjusted optical flow may be determined based on the actual change in the field of view. The adjusted optical flow may be determined by adjusting the optical flow to account for the actual change in the field of view. In some implementations, adjusting the optical flow to account for the actual change in the field of view may include adjusting the individual optical flow vectors to offset the actual change in the field of view.

The detection component may be configured to obtain the presence of the moving object. The presence of the moving object may be detected based on the adjusted optical flow. In some implementations, the detection of the presence of the moving object may be made through identification of a cluster of the adjusted optical flow vectors. In some implementations, the detection component may be configured to obtain an object type of the moving object. The object type of the moving object may be determined based on the adjusted optical flow.

In some implementations, the behavior component may be configured to control the vehicle to avoid the moving object. In some implementations, the behavior component may be configured to control the vehicle to follow the moving object. In some implementations, the behavior component may be configured to effectuate one or more operating behaviors of a vehicle based on the identified object type.

In some implementations, the one or more operating behaviors of the vehicle may include the vehicle maintaining a minimum distance between the moving object and/or a maximum distance from the moving object. In some implementations, the one or more operating behaviors of the vehicle may include the vehicle maintaining a minimum speed and/or a maximum speed. In some implementations, the one or more operating behaviors of the vehicle may include the vehicle maintaining the moving object within the field of view of the image sensor. In some implementations, the one or more operating behaviors of the vehicle may include the vehicle facilitating wireless communication of the visual information to a remote computing device.

In some aspects of the disclosure, a system for collision avoidance of an unmanned aerial vehicle may include one or more processors and/or other components. In some implementations, the system may include one or more stereo image sensors.

The stereo image sensor(s) may be carried by the unmanned aerial vehicle. The stereo image sensor(s) may include a first image sensor, a second image sensor, and/or other components. The first image sensor may be configured to generate first visual output signals conveying visual information within a field of view of the first image sensor. The first image sensor may include one or more of a charge-coupled device sensor, an active pixel sensor, a complementary metal-oxide semiconductor sensor, an N-type metal-oxide-semiconductor sensor, and/or other image sensors. The second image sensor may be configured to generate second visual output signals conveying visual information within a field of view of the second image sensor. The second image sensor may include one or more of a charge-coupled device sensor, an active pixel sensor, a complementary metal-oxide semiconductor sensor, an N-type metal-oxide-semiconductor sensor, and/or other image sensors.

The processor(s) may be configured by machine-readable instructions to execute one or more computer program components. The computer program components may include one or more of a depth information component, a spherical depth map component, a maneuver controls component, and/or other computer program components. In some implementations, the processor(s) may include one or more of a hardware-implemented processor, a software-implemented processor, and/or other processors. In some implementations, the hardware-implemented processor(s) may be located remotely from the software-implemented processor(s).

The depth information component may be configured to obtain depth information for an environment around the unmanned aerial vehicle and/or other information. The depth information may characterize one or more distances between the unmanned aerial vehicle and the environment around the unmanned aerial vehicle. The depth information may include one or more of distance information, disparity information, and/or other depth information. In some implementations, the depth information component may be configured to compare the first visual information with the second visual information to determine the depth information and/or other information.

The spherical depth map component may be configured to generate a spherical depth map from the depth information and/or other information. A center of the spherical depth map may coincide with a location of the unmanned aerial vehicle. The spherical depth map may represent distances to closest surfaces of the environment around the unmanned aerial vehicle as a function of longitude angles and latitude angles.

In some implementations, the spherical depth may be divided into map cells corresponding to the longitude angles and the latitude angles. The map cells may include a first map cell corresponding to a first longitude angle and a first latitude angle. In some implementations, generating the spherical depth map may include reducing a three-dimensional map of a surrounding into the spherical depth map.

In some implementations, generating the spherical depth map may include determining distance values for the map cells. The distance values may be determined based on the distances to the closest surfaces of the environment around the unmanned aerial vehicle and/or other information. A first distance value for the first map cell may be determined based on a first distance to a first closest surface of the environment around the unmanned aerial vehicle at the first longitude angle and the first latitude angle and/or other information.

In some the determination of distance values may disregard distances to surfaces of the environment around the unmanned aerial vehicle at individual longitude angles and individual latitude angles that are greater than the distances to the closest surfaces of the environment around the unmanned aerial vehicle at the individual longitude angles and the individual latitude angles. In some implementations, the distance values may correspond only to the closest surfaces of the environment around the unmanned aerial vehicle at individual longitude angles and individual latitude angles.

In some implementations, the spherical depth map may include one or more dead zones in one or more polar regions. The distance values may not be determined for the map cells in the dead zone(s).

In some implementations, the spherical depth map component may be configured to, responsive to detecting the unmanned aerial vehicle traveling a threshold distance, transform the spherical depth map. The spherical depth may be transformed such that the center of the spherical depth map coincides with the location of the unmanned aerial vehicle.

The maneuver controls component may be configured to provide maneuver controls for the unmanned aerial vehicle. The maneuver controls for the unmanned aerial vehicle may be based on the spherical depth map. In some implementations, the maneuver controls for the unmanned aerial vehicle may include controlling the unmanned aerial vehicle to avoid one or more objects in the environment around the unmanned aerial vehicle.

In some aspects of the disclosure, a system for collision avoidance of an unmanned aerial vehicle may include one or more processors and/or other components. In some implementations, the system may include one or more stereo image sensors. In some implementations, the system may include one or more motion and orientation sensors.

The stereo image sensor(s) may be carried by the unmanned aerial vehicle. The stereo image sensor(s) may include a first image sensor, a second image sensor, and/or other components. The first image sensor may be configured to generate first visual output signals conveying visual information within a field of view of the first image sensor. The first image sensor may include one or more of a charge-coupled device sensor, an active pixel sensor, a complementary metal-oxide semiconductor sensor, an N-type metal-oxide-semiconductor sensor, and/or other image sensors. The second image sensor may be configured to generate second visual output signals conveying visual information within a field of view of the second image sensor. The second image sensor may include one or more of a charge-coupled device sensor, an active pixel sensor, a complementary metal-oxide semiconductor sensor, an N-type metal-oxide-semiconductor sensor, and/or other image sensors.

The motion and orientation sensor(s) may be configured to generate motion and orientation output signals conveying motion information and orientation information of the unmanned aerial vehicle. The motion and orientation sensor may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

The processor(s) may be configured by machine-readable instructions to execute one or more computer program components. The computer program components may include one or more of an object detection component, a depth information component, a depth map component, a physical model information component, a predicted path component, a collision detection component, a collision avoidance component, and/or other computer program components.

The object detection component may be configured to detect one or more stationary objects in an environment around the unmanned aerial vehicle. The object detection component may be configured to detect one or more moving objects in the environment around the unmanned aerial vehicle. In some implementations, the object detection component may be configured to identify one or more object types of one or more detected moving objects.

The depth information component may be configured to obtain depth information for an environment around the unmanned aerial vehicle and/or other information. The depth information may characterize one or more distances between the unmanned aerial vehicle and the environment around the unmanned aerial vehicle. The environment around the unmanned aerial vehicle may include one or more detected stationary objects and/or one or more detected moving objects. The depth information may include one or more of distance information, disparity information, and/or other depth information. In some implementations, the depth information component may be configured to compare the first visual information with the second visual information to determine the depth information and/or other information.

The depth map component may be configured to generate a depth map from the depth information and/or other information. The depth map may characterize distances between the unmanned aerial vehicle and one or more detected stationary objects and/or one or more detected moving objects. In some implementations, the depth may include a spherical depth map and/or other depth maps.

The accuracy of the depth map may be characterized by a depth map accuracy and/or other information. The depth map accuracy may provide information about accuracy of the distances between the unmanned aerial vehicle and the detected objects characterized by the depth map with respect to actual distances between the unmanned aerial vehicle and the detected objects. The depth map accuracy may provide information about accuracy of the distance between the unmanned aerial vehicle and one or more detected stationary objects and/or one or more detected moving objects characterized by the depth map with respect to actual distances between the unmanned aerial vehicle and one or more detected stationary objects and/or one or more detected moving object.

The physical model information component may be configured to obtain vehicle physical model information and/or other information. The vehicle physical model information may characterize a motion of the unmanned aerial vehicle. In some implementations, the vehicle physical model information may be based on the motion and orientation information and/or other information. In some implementations, the vehicle physical model information may be based on one or more of a weight of the unmanned aerial vehicle, a size of the unmanned aerial vehicle, a shape of the unmanned aerial vehicle, a linear speed of the unmanned aerial vehicle, a linear acceleration of the unmanned aerial vehicle, a linear direction of the unmanned aerial vehicle, an angular speed of the unmanned aerial vehicle, an angular acceleration of the unmanned aerial vehicle, an angular direction of the unmanned aerial vehicle, a motion instruction for the unmanned aerial vehicle, an environmental condition around the unmanned aerial vehicle, and/or other parameters.

The accuracy of the vehicle physical model information may be characterized by a vehicle physical model accuracy and/or other information. The vehicle physical model accuracy may provide information about accuracy of the motion of the unmanned aerial vehicle characterized by the vehicle physical model information with respect to an actual motion of the unmanned aerial vehicle.

The physical model information component may be configured to, responsive to detection of one or more moving objects, obtain moving object physical model information and/or other information. The moving object physical model information may characterize one or more motions of one or more moving objects. In some implementations, the moving object physical model information may be based on one or more object types of one or more detected moving objects and/or other information.

The accuracy of the moving object physical model information may be characterized by a moving object physical model accuracy and/or other information. The moving object physical model accuracy may provide information about accuracy of the motion of one or more moving objects characterized by the moving object physical model information with respect to the actual motion of one or more moving objects.

The predicted path component may be configured to determine a predicted vehicle path based on the vehicle physical model information, the vehicle physical model accuracy, and/or other information. The predicted vehicle path may include predicted location(s) of the unmanned aerial vehicle at one or more future times.

The predicted path component may be configured to, responsive to detection of one or more moving objects, determine one or more predicted moving object paths based on the depth map, the depth map accuracy, the moving object physical model information, the moving object physical model accuracy, and/or other information. The predicted moving object path(s) may include predicted location(s) of the moving object(s) at one or more future times.

The collision detection component may be configured to, responsive to detecting one or more stationary objects, determine whether the unmanned aerial vehicle moving in the predicted vehicle path may collide with one or more detected stationary objects based on the depth map, the depth map accuracy, the predicted vehicle path, and/or other information. One or more collisions may be determined at one or more locations and/or at one or more future times.

The collision detection component may be configured to, responsive to detection of one or more moving objects, determine whether the unmanned aerial vehicle moving in the predicted vehicle path may collide with one or more detected moving objects based on the predicted vehicle path, the predicted moving object path, and/or other information. One or more collisions may be determined at one or more locations and/or at one or more future times.

The collision avoidance component may be configured to, responsive to determination of one or more collisions of the unmanned aerial vehicle moving in the predicted vehicle path, change a velocity of the unmanned aerial vehicle to avoid one or more collision. In some implementations, changing the velocity of the unmanned aerial vehicle may include changing one or more speeds of the unmanned aerial vehicle. In some implementations, changing the velocity of the unmanned aerial vehicle may include changing one or more directions of the unmanned aerial vehicle to move the unmanned aerial vehicle in a path that deviates from the predicted vehicle path.

In some aspects of the disclosure, a system for estimating an ego-motion may include one or more of a hardware-implemented processor, a stereo image sensor, a motion and orientation sensor, and/or other components.

The stereo image sensor(s) may include a first image sensor, a second image sensor, and/or other components. The first image sensor may be configured to generate first visual output signals conveying visual information within a field of view of the first image sensor. The first image sensor may include one or more of a charge-coupled device sensor, an active pixel sensor, a complementary metal-oxide semiconductor sensor, an N-type metal-oxide-semiconductor sensor, and/or other image sensors. The second image sensor may be configured to generate second visual output signals conveying visual information within a field of view of the second image sensor. The second image sensor may include one or more of a charge-coupled device sensor, an active pixel sensor, a complementary metal-oxide semiconductor sensor, an N-type metal-oxide-semiconductor sensor, and/or other image sensors.

The motion and orientation sensor(s) may be configured to generate motion and orientation output signals conveying motion information and orientation information of the stereo image sensor. The motion and orientation sensor may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

The hardware-implemented processor(s) may include one or more computing/processing devices with one or more algorithms/logics implemented in hardware to perform one or more functions. Algorithms/logics may be implemented in hardware via machine-readable instructions (e.g., a hardware description language file, a netlist, etc.). As a non-limiting example, a hardware-implemented processor(s) may include one or more of a field-programmable gate array, an application-specific integrated circuit, and/or other hardware-implemented processors.

The hardware-implemented processor(s) may be configured by machine-readable instructions to execute one or more function components. The function components may include one or more of an imaging component, a depth image component, a predicted motion component, a predicted imaging component, an error component, an actual motion component, and/or other function components.

The imaging component may be configured to obtain one or more images and/or other information. The imaging component may be configured to obtain a first image, a second image, a third image, a fourth image, and/or other images. The first image may be determined based on the first visual output signals such that the first visual output signals used to determine the first image are generated by the first image sensor at a first time. The second image may be determined based on the second visual output signals such that the second visual output signals used to determine the second image are generated by the second image sensor at the first time.

The third image may be determined based on the first visual output signals such that the first visual output signals used to determine the first image are generated by the first image sensor at a second time that is subsequent to the first time. The fourth image may be determined based on the second visual output signals such that the second visual output signals used to determine the second image are generated by the second image sensor at the second time.

The imaging component may be configured to undistort and rectify one or more images. The imaging component may be configured to undistort and rectify the first image, the second image, and/or other images. The imaging component may be configured to undistort and rectify the third image, the fourth image, and/or other images.

The depth image component may be configured to determine one or more depth images based on one or more comparisons of images. The depth image component may be configured to determine a depth image based on a comparison of the first image and the second image. The depth image may include pixel values characterizing distances between the stereo image sensor and objects within the first image and the second image.

In some implementations, the depth image may be determined using one or more parallel algorithms and/or other algorithms. In some implementations, the depth image may be determined using one or more block matching algorithms and/or other algorithms. In some implementations, the depth image may be determined using one or more semi-global block matching algorithms and/or other algorithms.

The predicted motion component may be configured to obtain one or more predicted motion of the stereo image sensor between different times. The predicted motion component may be configured to obtain a predicted motion of the stereo image sensor between the first time and the second time. The predicted motion of the stereo image sensor may be determined based on the motion and orientation output signals. The motion and orientation output signals may convey motion information and orientation information of the stereo image sensor. In some implementations, the predicted motion may be determined based on visual odometry.

The predicted imaging component may be configured to determine one or more predicted images based on one or more predicted motion of the stereo image sensor, one or more depth images, and/or other information. The predicted imaging component may be configured to determine a predicted third image by adjusting the first image based on the predicted motion, the depth image, and/or other information. The predicted imaging component may be configured to determine a predicted fourth image by adjusting the second image based on the predicted motion, the depth image, and/or other information.

The error component may be configured to determine one or more error distributions of one or more predicted motion by comparing one or more images with one or more predicted images. The error component may be configured to determine an error distribution of the predicted motion by comparing the third image with the predicted third image and the fourth image with the predicted fourth image.

The actual motion component may be configured to obtain one or more estimated actual motion of the stereo image sensor between different times. The actual motion component may be configured to obtain an estimated actual motion of the stereo image sensor between the first time and the second time. The estimated actual motion may be determined by adjusting the predicted motion to reduce the error distribution of the predicted motion. In some implementations, the predicted motion may be adjusted based on one or more absolute error thresholds and/or other information. In some implementations, the predicted motion may be adjusted based on one or more relative error thresholds and/or other information.

In some implementations, the estimated actual motion of the stereo image sensor between the first time and the second time may include an estimated position of the stereo image sensor at the second time, an estimated orientation of the stereo image sensor at the second time, an estimated velocity of the stereo image sensor at the second time, and/or other estimated actual motion of the stereo image sensor.

(01) In some implementations, the estimated actual motion of the stereo image sensor between the first time and the second time may be used to estimate one or more of an estimated gravity-aligned position of the stereo image sensor at the second time, an estimated gravity-aligned orientation of the stereo image sensor at the second time, an estimated gravity-aligned velocity of the stereo image sensor at the second time, and/or other estimated gravity-aligned motion of the stereo image sensor.

In some aspects of the disclosure, a system for refining a depth image may include one or more of a processor, a stereo image sensor, and/or other components. In some implementations, the system may include one or more motion and orientation sensors.

The stereo image sensor(s) may include a first image sensor, a second image sensor, and/or other components. The first image sensor may be configured to generate first visual output signals conveying visual information within a field of view of the first image sensor. The first image sensor may include one or more of a charge-coupled device sensor, an active pixel sensor, a complementary metal-oxide semiconductor sensor, an N-type metal-oxide-semiconductor sensor, and/or other image sensors. The second image sensor may be configured to generate second visual output signals conveying visual information within a field of view of the second image sensor. The second image sensor may include one or more of a charge-coupled device sensor, an active pixel sensor, a complementary metal-oxide semiconductor sensor, an N-type metal-oxide-semiconductor sensor, and/or other image sensors.

The motion and orientation sensor(s) may be configured to generate motion and orientation output signals conveying motion information and orientation information of the stereo image sensor. The motion and orientation sensor may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

The processor(s) may be configured by machine-readable instructions to execute one or more computer program components. The computer program components may include one or more of an imaging component, a depth image component, a predicted motion component, a predicted imaging component, a refine component, and/or other computer program components.

The imaging component may be configured to obtain one or more images and/or other information. The imaging component may be configured to obtain a first image, a second image, a third image, a fourth image, and/or other images. The first image may be determined based on the first visual output signals such that the first visual output signals used to determine the first image are generated by the first image sensor at a first time. The second image may be determined based on the second visual output signals such that the second visual output signals used to determine the second image are generated by the second image sensor at the first time.

The third image may be determined based on the first visual output signals such that the first visual output signals used to determine the first image are generated by the first image sensor at a second time that is subsequent to the first time. The fourth image may be determined based on the second visual output signals such that the second visual output signals used to determine the second image are generated by the second image sensor at the second time.

The imaging component may be configured to undistort and rectify one or more images. The imaging component may be configured to undistort and rectify the first image, the second image, and/or other images. The imaging component may be configured to undistort and rectify the third image, and/or other images. The imaging component may be configured to undistort and rectify the fourth image, and/or other images.

The depth image component may be configured to determine one or more depth images based on one or more comparisons of images. The depth image component may be configured to determine a first depth image based on a comparison of the first image and the second image. The first depth image may include pixel values characterizing distances between the stereo image sensor and objects within the first image and the second image. In some implementations, the depth image component may be configured to determine a second depth image based on a comparison of the third image and the fourth image. The second depth image may include pixel values characterizing distances between the stereo image sensor and objects within the third image and the fourth image.

The predicted motion component may be configured to obtain one or more predicted motion of the stereo image sensor between different times. The predicted motion component may be configured to obtain a predicted motion of the stereo image sensor between the first time and the second time. In some implementations, the predicted motion of the stereo image sensor may be determined based on the motion and orientation output signals. The motion and orientation output signals may convey motion information and orientation information of the stereo image sensor. In some implementations, the predicted motion may be determined based on visual odometry.

The predicted imaging component may be configured to determine one or more predicted images based on one or more predicted motion of the stereo image sensor, one or more depth images, and/or other information. The predicted imaging component may be configured to determine a predicted second image by adjusting the first image based on the first depth image, and/or other information. The predicted imaging component may be configured to determine a predicted third image by adjusting the first image based on the predicted motion, the first depth image, and/or other information. In some implementations, the predicted imaging component may be configured to determine a predicted second depth image by adjusting the first depth image based on the predicted motion and/or other information.

The refine component may be configured to refine one or more depth images based on one or more comparisons of images with predicted images. The refine component may be configured to refine the first depth image based on a comparison of the second image with the predicted second image. In some implementations, refining the first depth image based on the comparison of the second image with the predicted second image may include determining a mismatch between an image patch in the second image with a corresponding image patch in the predicted second image. Responsive to the mismatch meeting and/or exceeding an error threshold, one or more pixel values of the first depth image corresponding to the image patch may be rejected.

The refine component may be configured to refine the first depth image based on a comparison of the third image with the predicted third image. In some implementations, refining the first depth image based on the comparison of the third image with the predicted third image may include determining a mismatch between an image patch in the third image with a corresponding image patch in the predicted third image. Responsive to the mismatch meeting and/or exceeding an error threshold, one or more pixel values of the first depth image corresponding to the image patch may be rejected.

In some implementations, the refine component may be configured to refine the second depth image based on a comparison of the second depth image with the predicted second depth image. In some implementations, refining the second depth image based on the comparison of the second depth image with the predicted second depth image may include determining a mismatch between a pixel value in the second depth image with a corresponding pixel value in the predicted second depth image. Responsive to the mismatch meeting and/or exceeding an error threshold, a pixel value of the second depth image corresponding to the mismatch may be rejected.

In some implementations, the error threshold may be based on inverse of the distances between the stereo image sensor and the objects. In some implementations, the mismatch between the image patch in the second image with the corresponding image patch in the predicted second image may be determined based on an error distribution.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 18 illustrates an exemplary depth image at time t.

FIGS. 19A-19B illustrate exemplary images and predicted images at time t+1.

FIG. 22A illustrates an exemplary depth image at time t.

FIG. 22B illustrates an exemplary depth image at time t+1.

FIGS. 23A-23B illustrate exemplary images at time t and t+1, and predicted images at time t and t+1.

DETAILED DESCRIPTION

Figure 1:
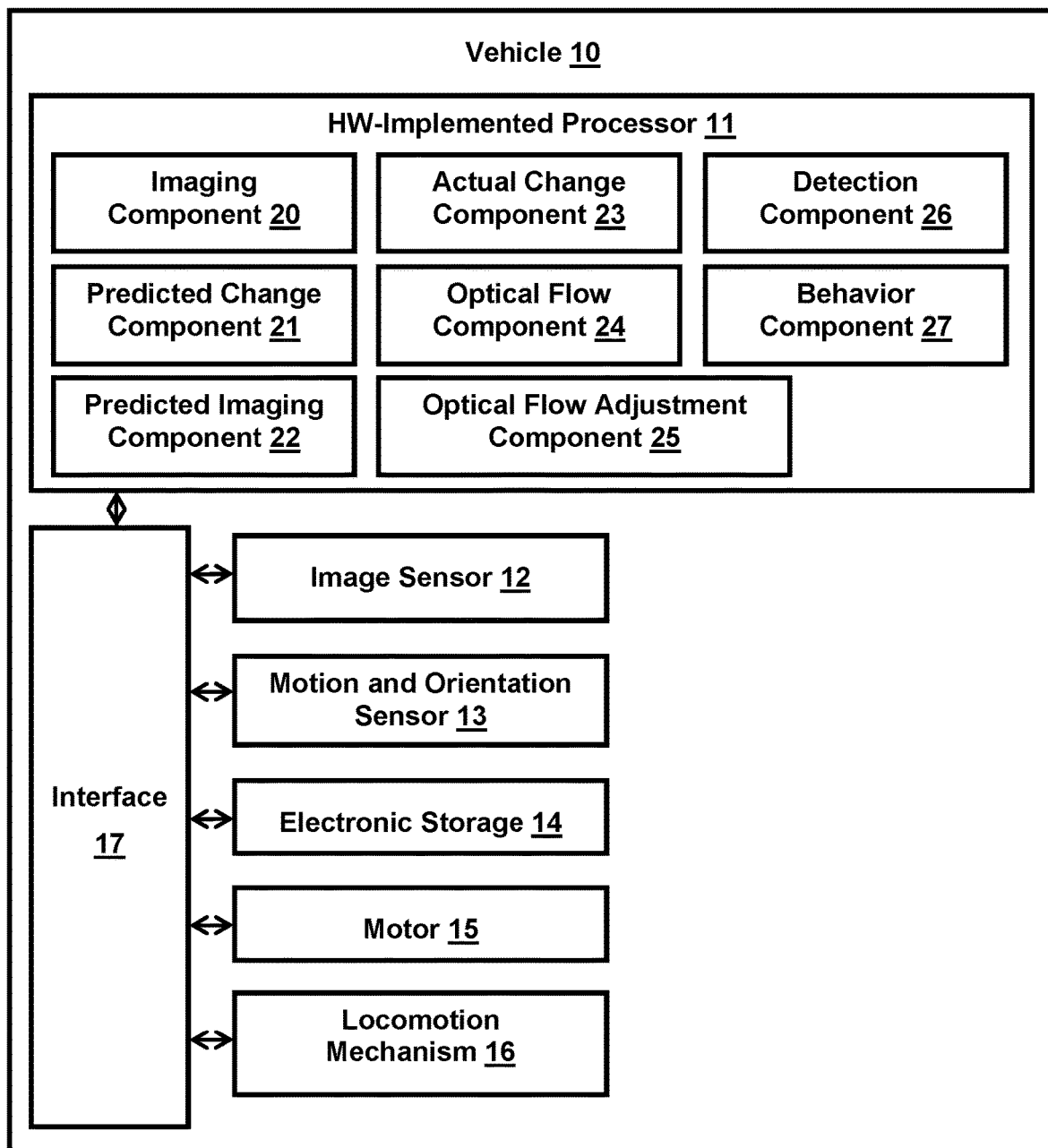
FIG. 1 illustrates a vehicle configured to detect a moving object using adjusted optical flow.

FIG. 1 illustrates vehicle 10 configured to detect a moving object using adjusted optical flow. Vehicle 10 may include one or more of hardware-implemented processor 11, image sensor 12, motion and orientation sensor 13, electronic storage 14, motor 15, locomotion mechanism 16, interface 17 (e.g., bus, wireless interface, etc.), and/or other components. To detect a moving object, two images taken at different times using image sensor 12 may be compared with each other to determine optical flow between the two images. The determined optical flow may be adjusted to account for any change in the field of view of image sensor 12 between the two images. By way of non-limiting example, the field of view of image sensor 12 when the first image was taken may be different from the field of view of the image sensor 12 the second image was taken due to movement of vehicle 10. The presence of the moving object may be detected based on the adjusted optical flow. The detection of the moving object may allow vehicle 10 to avoid or follow the moving object. The object type of the moving object may be identified, and one or more operating behaviors of vehicle 10 may be effectuated based on the identified object type.

Image sensor 12 may be configured to generate visual output signals conveying visual information within the field of view of image sensor 12. Visual information may include one or more of an image, a video, and/or other visual information. Image sensor 12 may include one or more of a charge-coupled device sensor, an active pixel sensor, a complementary metal-oxide semiconductor sensor, an N-type metal-oxide-semiconductor sensor, and/or other image sensors. In some implementations, image sensor 12 may be located remotely from vehicle 10. In some implementations, image sensor 12 may be located on or in vehicle 10. In some implementations, hardware-implemented processor 11, image sensor 12, and motion and orientation sensor 13 may be carried (e.g., attached to, supported, held, disposed on, and/or otherwise carried) by vehicle 10 and the field of view of image sensor 12 may be a function of the position and orientation of vehicle 10.

Motion and orientation sensor 13 may be configured to generate output signals conveying motion information and orientation information of image sensor 12. Motion information may include one or more motion information regarding speed of image sensor 12, distance traveled by image sensor 12, and/or movement of image sensor 12, including one or more of moving forward, moving backwards, moving right, moving left, moving up, moving down, other movements, and/or other motion information. Orientation information may include one or more orientation information regarding orientation of image sensor 12, including one or more of turning right, turning left, rolling right, rolling left, pitching up, pitching down, and/or other orientation information. Motion information and/or orientation information may be processed to obtain motions and/or orientations of image sensor 12 at particular times and/or locations. Motion and orientation sensor 13 may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

Electronic storage 14 may include electronic storage media that electronically stores information. Electronic storage 14 may store software algorithms, information determined by hardware-implemented processor 11, information received remotely, and/or other information that enables vehicle 10 to function properly. For example, electronic storage 14 may store visual information (as discussed elsewhere herein), and/or other information.

Motor 15 may be configured to drive locomotion mechanism 16 to effectuate movement of vehicle 10 along any direction. Locomotion mechanism 16 may include one or more component to effectuate movement of vehicle 10. By way of non-limiting example, locomotion mechanism 16 may include one or more of a wheel, a rotor, a leg, a continuous track, and/or other locomotion mechanisms.

Hardware-implemented processor 11 may be configured to provide information processing capabilities in vehicle 10. Hardware-implemented processor 11 may include one or more computing/processing devices with one or more algorithms/logics implemented in hardware. Algorithms/logics may be implemented in hardware via machine-readable instructions (e.g., a hardware description language file, a netlist, etc.). As a non-limiting example, a hardware-implemented processor(s) may include one or more of a field-programmable gate array, an application-specific integrated circuit, and/or other hardware-implemented processors. In some implementations, hardware-implemented processor 11 may include a plurality of processing units. In some implementations, hardware-implemented processor 11 may be coupled with one or more of RAM, ROM, input/output ports, and/or other peripherals.

Hardware-implemented processor 11 may be configured by machine-readable instructions to execute one or more function components. The function components may include one or more of imaging component 20, predicted change component 21, predicted imaging component 22, actual change component 23, optical flow component 24, optical flow adjustment component 25, detection component 26, behavior component 27, and/or other function components.

Imaging component 20 may be configured obtain images. The images may be determined based on visual output signals conveying visual information. The images may be determined by one or more of imaging component 20, image sensor 12, a computing/processing device coupled to image sensor 12, and/or other components. Visual output signals conveying visual information may be generated by image sensor 12. Imaging component 20 may be configured to obtain an image such that the visual output signals used to determine the image are generated by image sensor 12 at time t. Imaging component 20 may be configured to obtain another image such that the visual output signals used to determine the other image are generated by image sensor 12 at time t+1, which is subsequent to time t. Imaging component 20 may rectify and undistort the images.

For example, image sensor 12 may include one or more charge-coupled device sensors. Image sensor 12 may generate visual output signals conveying visual information within the field of view of image sensor 12 at time t by sequentially measuring the charges of individual rows of pixels (e.g., capacitors) of image sensor 12, where the charges are stored in image sensor 12 at time t. For example, image sensor 12 may include n rows of pixels. Visual output signals conveying visual information may be generated by measuring charges of the first row of pixels, then measuring charges of the second row of pixels, and continuing on until charges of all rows of pixels are measured, where charges are stored in the pixels of image sensor 12 at time t. Other types of image sensors and other methods of determining images are contemplated.

The field of view of image sensor 12 may change between time t and time t+1. For example, movement of vehicle 10 may change the field of view of image sensor 12.

FIGS. 2-6 illustrates a non-limiting example of a system and a method described herein to detect a moving object using adjusted optical flow. FIG. 2A illustrates a top-down view at time t of image sensor 12, and sphere 40 and block 50, which are both within the field of view of image sensor 12. Straight-ahead line 30 indicates the middle of the field of view of image sensor 12. Image component 20 may determine image at t 60, illustrated in FIG. 2B, based on visual output signals conveying visual information, which may be generated by image sensor 12 at time t.

Figure 3A:
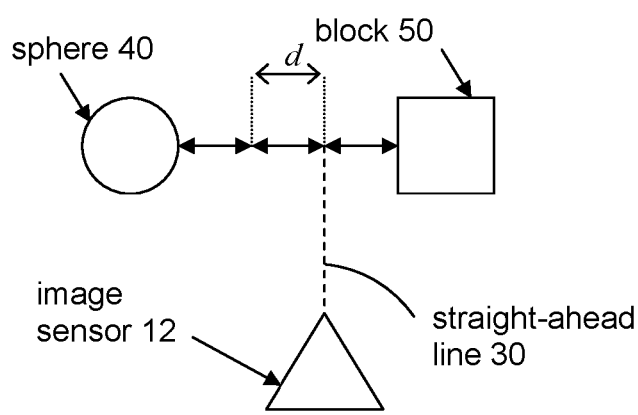
FIG. 3A illustrates a top-down view of an arrangement of an image sensor, a sphere, and a block at time t+1.

FIG. 3A illustrates a top-town view at time t+1 of image sensor 12, sphere 40, and block 50. Compared to time t, image sensor 12 and block 50 have both moved to the right by distance d while sphere 40 has remained stationary. Image component 20 may determine image at t+1 61, illustrated in FIG. 3B, based on visual output signals conveying visual information, which may be generated by image sensor 12 at time t+1. In image at t+1 61, block 50 appears in the same location relative to block 50 in image at t 60, while sphere 40 appears to the left by distance d relative to sphere 40 in image at t 60.

Predicted change component 21 may be configured to obtain predicted changes in the field of view of image sensor 12 between time t and time t+1. The predicted changes in the field of view of image sensor 12 between time t and time t+1 may be determined based on motion and orientation output signals conveying motion information and orientation information of image sensor 12. The predicted changes in the field of view of image sensor 12 may be determined by a companion processor, and/or other components. A companion processor may refer to a computing/processing device that may provide information processing capabilities in conjunction with hardware-implemented processor 11. A companion processor may comprise one or more of a digital processor, an analog processor, a digital circuit designed to process information, a central processing unit, a graphics processing unit, a microcontroller, an analog circuit designed to process information, a state machine, and/or other mechanisms for electronically processing information. A companion processor may be carried by vehicle 10 or located remotely from vehicle 10. For example, a component processor may be located remotely from vehicle 10 and may communicate with vehicle 10/hardware-implemented processor 11 via a wireless communication link.

Motion and orientation output signals conveying motion information and orientation information may be generated by motion and orientation sensor 13. Motion information of image sensor 12 may include one or more motion information regarding speed of image sensor 12, distance traveled by image sensor 12, and/or movement of image sensor 12, including one or more of moving forward, moving backwards, moving right, moving left, moving up, moving down, other movements, and/or other motion information. Orientation information of image sensor 12 may include one or more orientation information regarding orientation of image sensor 12, including one or more of turning right, turning left, rolling right, rolling left, pitching up, pitching down, and/or other orientation information.

Figure 2A:
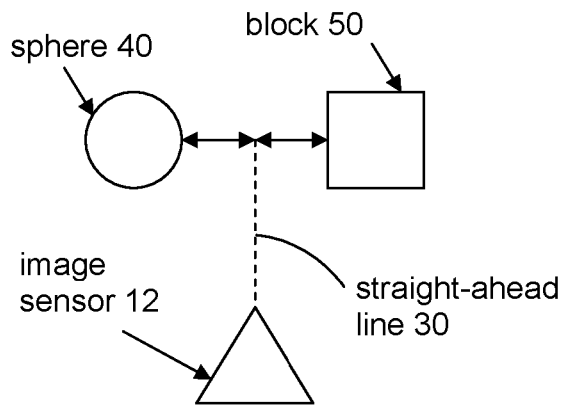
FIG. 2A illustrates a top-down view of an arrangement of an image sensor, a sphere, and a block at time t.
Figure 2B:
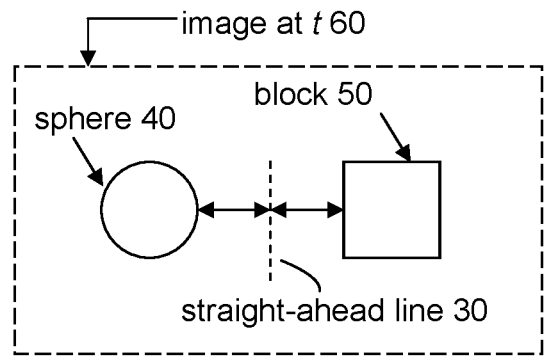
FIG. 2B illustrates an exemplary image at time t.

For example, a companion processor may process motion information and orientation information of image sensor 12 shown in FIGS. 2A and 3A and predict that the field of view of image sensor 12 has moved to the right by distance d between time t and time t+1. The companion processor may communicate the predicted changes in the field of view of image sensor 12 (e.g., change in pose (position and orientation) of image sensor 12) to hardware-implemented processor 11.

Predicted imaging component 22 may be configured to determine a predicted image at time t. The predicted image at time t may include a prediction of how objects within the field of view of image sensor 12 at time t+1 may have looked if image sensor 12 had not moved between time t and time t+1. The predicated image at time t may be determined by adjusting an image determined at time t+1 based on the predicted change in the field of view of image sensor 12 between time t and time t+1. Predicted imaging component 22 may determine a predicted image via inverse composition warping and/or other operations.

Figure 3B:
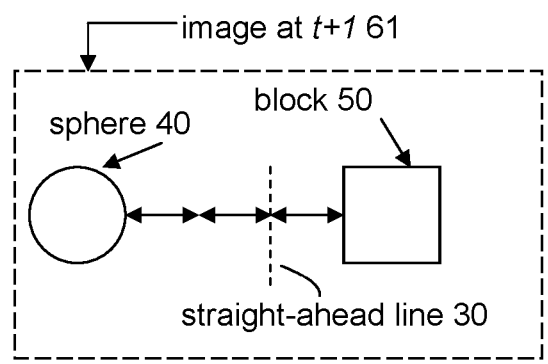
FIG. 3B illustrates an exemplary image at time t+1.
Figure 4:
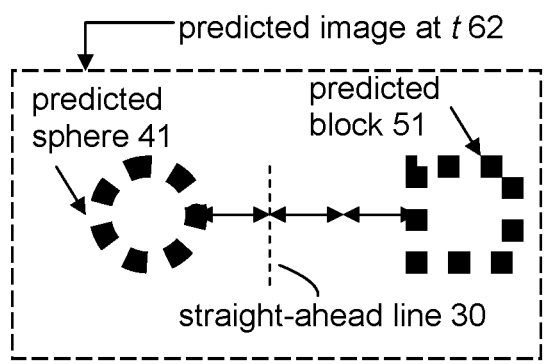
FIG. 4 illustrates an exemplary predicted image at time t.

For example, predicted imaging component 22 may be configured to determine predicted image at t 62, illustrated in FIG. 4, by adjusting image at t+1 61, illustrated in FIG. 3B. To account for the predicted movement to the right by distance d of the field of view of image sensor 12, predicted imaging component 22 may shift both sphere 40 and block 50 in image at t+1 61 by distance d to the right. Predicted image at t 62 may include a range of predictions regarding how sphere 40 and block 50 may have looked to image sensor 12 at time t. For example, ranges of predictions for sphere 40 and block 50 at time t are shown in FIG. 4 as predicted sphere 41 and predicted block 51.

Actual change component 23 may be configured to obtain actual changes in the field of view of image sensor 12 between time t and time t+1. The actual change in the field of view of image sensor 12 between time t and time t+1 may be determined based on a comparison of an image determined at time t and a predicted image at time t. The actual changes in the field of view of image sensor 12 may be determined by one or more of hardware-implemented processor 11, a companion processor, and/or other components. By way of non-limiting example, comparison of two images may be made by comparing intensities of pixels of the image determined at time t and intensities of pixels of the predicated image at time t. Actual changes in the field of view of image sensor 12 may be determined by determining the positions and orientations of image sensor 12 that minimizes the sum of squared differences of the pixel intensities.

Actual change component 23 may perform the comparison of pixels to evaluate the differences between intensities of pixels between the images. The differences between the intensities of pixels between the images may be used to adjust the predicted changes in the field of view of image sensor 12 to reduce the differences between the intensities of pixels between the images. The adjustments to the predicted changes in the field of view of image sensor 12 may be determined through processing and communication between hardware-implemented processor 11 and a companion processor.

For example, actual change component 23 may provide information regarding the differences between the intensities of pixels of the images (e.g., provided in a set of 6×6 linear equations) to the companion processor. The companion processor may use the information (e.g., invert the set of linear equations) to determine changes to the predicted change in the field of view of image sensor 12 (e.g., new delta added to 6 degrees of freedom pose estimate). The companion processor may provide the resulting predicted change in the field of view of image sensor 12 (e.g., new pose estimate) to hardware-implemented processor 11. Predicted imaging component 22 may determine a new predicted image based on the new predicted change in the field of view of image sensor 12 and the comparison of the images may be repeated to refine pose (position and orientation) estimates. The actual changes in the field of view of image sensor 12 may be obtained when the differences between intensities of pixels between the images is below a threshold. In some implementations, the companion processor may process the actual changes in the field of view of image sensor 12 with an Extended Kalman filter to obtain position, orientation, velocity, and/or other movement information of image sensor 12.

In some implementations, comparison of the images may be accomplished through an iterative process in which image resolutions may be changed. For example, the comparison may begin with an initial comparison that uses down-sampled versions of the images. By way of non-limiting example, the images may be down-sampled by a factor of eight. After initial positions and orientations of image sensor 12 are determined from initial comparison of images that have been down-sampled by a factor of eight, the images may be compared again using images that have been down-sampled by a factor of four, and the process may continue until acceptable positions and orientations of image sensor 12 are determined or comparison of up-sampled images does not provide further information.

In some implementations, determination of the actual change in the field of view may include, when comparing an image determined at time t and a predicted image at time t, disregarding portions of the image determined at time t and the predicted image at time t. Portions to be disregarded may be determined by using the laplacian of gaussian convolution. By way of non-limiting example, portions of the images may be disregarded based on an error in disparity of the movement of image sensor 12, or movement of objects within the field of view of image sensor 12. For example, portions of image at t 60 corresponding to block 50 and predicted image at t 62 corresponding to predicted block 51 may be disregarded because comparison of the images indicate that block 50 has moved between time t and time t+1, and the corresponding locations do not assist in the determining actual changes in the field of view of image sensor 12.

Figure 5:
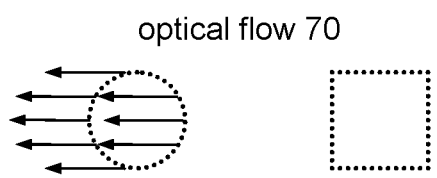
FIG. 5 illustrates an exemplary determined optical flow.

Optical flow component 24 may be configured to obtain optical flow between an image determined at time t and an image determined at time t+1. For example, FIG. 5 illustrates optical flow 70 between image at t 60 and image at t+1 61. Optical flow 70 may show an apparent motion of a spherical object to the left. The optical flow between the two images may be determined by one or more of hardware-implemented processor 11, a companion processor, and/or other components.

Optical flow may be determined using a variety of methods, including, but not limited to one or more of phase correlation, block-based methods, differential methods (such as Lucas-Kanade method, Horn-Schunck method, Buxton-Buxton method, Black-Jepson method, and/or general variational methods), discrete optimization methods, and/or other methods. In some implementations, determining optical flow between an image determined at time t and an image determined at time t+1 may include determining individual optical flow vectors between the images. The optical flow vectors may be determined for an array of location, pixel by pixel, or based on a group of pixels.

Optical flow adjustment component 25 may be configured obtain adjusted optical flow. The adjusted optical flow may be determined based on the actual change in the field of view. The adjusted optical flow may be determined by one or more of hardware-implemented processor 11, a companion processor, and/or other components. The adjusted optical flow may be determined by adjusting the optical flow to account for actual changes in the field of view of image sensor 12.

Figure 6:
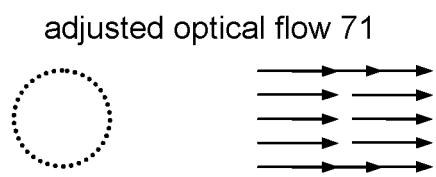
FIG. 6 illustrates an exemplary adjusted optical flow.

In some implementations, adjusting optical flow to account for actual changes in the field of view may include adjusting individual optical flow vectors to offset the actual change in the field of view. For example, optical flow vectors determined between two images may be offset to account for actual changes in the field of view. Such adjustment may reduce optical flow arising from changes in the field of view of image sensor 12. For example, optical flow adjustment component 25 (and/or a companion processor) may adjust optical flow 70, as illustrated in FIG. 5, to account for actual changes in the field of view of image sensor 12 between time t and time t+1. As illustrated in FIG. 6, optical flow adjustment component 25 (and/or a companion processor) may remove optical flow showing an apparent motion of a spherical object to the left as being caused by the field of view of image sensor 12 moving to the right by distance d between time t and time t+1. Optical flow adjustment component 25 (and/or a companion processor) may add optical flow showing a motion of a square object to the right between time t and time t+1.

Detection component 26 may be configured to obtain the presence of a moving object. The presence of the moving object may be determined by one or more of hardware-implemented processor 11, a companion processor, and/or other components. The presence of the moving object may be detected based on adjusted optical flow. For example, detection component 26 (and/or a companion processor) may detect the presence of a moving object based on one or more qualities of adjusted optical flow, including one or more of magnitude, direction, and/or other qualities of adjusted optical flow. By way of non-limiting example, detection component 26 (and/or a companion processor) may segment different portions of adjusted optical flow into sections corresponding to different objects based on discontinuities in magnitude, direction, and/or other qualities of adjusted optical flow. For example, detection component 26 (and/or a companion processor) may segment a square section of adjusted optical flow 71 based on the magnitude of adjusted optical flow and/or direction of adjusted optical flow to the right.

Detection component 26 (and/or a companion processor) may set a minimum threshold value for magnitude, direction, and/or other qualities of adjusted optical flow that must exceeded to be considered a potential moving object. Such use of a minimum threshold value may reduce false detection of a moving object based on noise and/or error in adjusted optical flow.

In some implementations, detection component 26 (and/or a companion processor) may be configured to identify clusters of adjusted optical flow vectors. Detection component 26 (and/or a companion processor) may identify clusters of adjusted optical flow vectors based on same/similar magnitude, same/similar direction, and/or other same/similar qualities of adjusted optical flow vectors. For example, detection component 26 (and/or a companion processor) may identify a cluster of adjusted optical flow if the direction of optical flow within the cluster does not deviate from a direction by certain degrees. As another example, detection component 26 (and/or a companion processor) may identify a cluster of adjusted optical flow if the magnitude of optical flow within the cluster is within a certain magnitude range. As another example, detection component 26 (and/or a companion processor) may identify a cluster of adjusted optical flow if the direction of optical flow within the cluster does not deviate from a direction by certain degrees and the magnitude of optical flow within the cluster is within a certain magnitude range.

In some implementations, detection component 26 (and/or a companion processor) may detect the presence of a moving object through identification of a cluster of adjusted optical flow vectors. For example, detection component 26 (and/or a companion processor) may identify multiple clusters of adjusted optical flow vectors and may detect a moving object for one or more clusters of adjusted optical flow vectors. As another example, detection component 26 (and/or a companion processor) may identify a single object based on multiple clusters of adjusted optical flow vectors.

In some implementation, detection component 26 (and/or a companion processor) may be configured to identify an object type of the moving object based on the adjusted optical flow. An object type may refer to one or more categories of objects that have one or more common characteristics. A common characteristic may refer to a permanent or temporary feature of an object relating to the shape, motion, behavior and/or other features of the object. Common characteristics may pertain to an entire object, or one or more portions of the object. Non-limiting examples of object types include a person, one or more parts of a person (e.g., arm, hand, head, body, leg, feet, etc.), an animal, one or more parts of an animal, a vehicle, one or more parts of a vehicle (e.g., wheel, door, engine, trunk, window, wing, propeller, rotor, etc.), and other object types.

Detection component 26 (and/or a companion processor) may identify an object type by matching the adjusted optical flow to an object type. For example, detection component 27 (and/or a companion processor) may identify an object type by matching the adjusted optical flow to one or more of a shape, a motion, a behavior and/or other features of the object type. Object types may be programmed into detection component 26 (and/or a companion processor), updated by detection component 26 (and/or a companion processor), obtained by detection component 26 (and/or a companion processor) from electronic storage 14, obtained by detection component 26 (and/or a companion processor) from remote location, and/or obtained by detection component 26 (and/or a companion processor) in other ways.

In some implementations, identification of an object type may be accomplished through an iterative process. For example, adjusted optical flow may be determined for a moving object at different times, and the object type of the moving object may be refined or changed based on subsequently determined adjusted optical flow. By way of non-limiting example, detection component 26 (and/or a companion processor) may initially identify the object type of a moving object as a vehicle based on initial optical flow, and subsequently refine the object type as a motorcycle based on subsequently determined adjusted optical flow.

In some implementations, behavior component 27 may be configured to effectuate one or more operating behaviors of a vehicle based on an identified object type. Operating behavior may refer to one or more motions and/or operations of a vehicle and/or one or more components of a vehicle. Motion of a vehicle and/or one or more components of a vehicle may refer to motion of the vehicle/component(s) at a time, motion of the vehicle/component(s) over a period of time, motion of the vehicle/component(s) at a location, and/or motion of the vehicle/component(s) over a distance. Operation of a vehicle and/or one or more components of a vehicle may refer to operation of the vehicle/component(s) at a time, operation of the vehicle/component(s) over a period of time, operation of the vehicle/component(s) at a location, and/or operation of the vehicle/component(s) over a distance. Operating behavior may be programmed into behavior component 27, updated by behavior component 27, obtained by behavior component 27 from electronic storage 14, obtained by behavior component 27 from remote location, and/or obtained by behavior component 27 in other ways.

In some implementations, hardware-implemented processor 11 and image sensor 12 may be carried on or in vehicle 10, and hardware-implemented processor 11 may execute behavior component 27 to effectuate one or more operating behaviors of vehicle 10. By way of non-limiting example, vehicle 10 may include an unmanned aerial vehicle, hardware-implemented processor 11 may include one or more processing units of the unmanned aerial vehicle, and image sensor 12 may include one or more image sensors of the unmanned aerial vehicle. One or more processing units of the unmanned aerial vehicle may execute behavior component 27 to effectuate one or more operating behaviors of the unmanned aerial vehicle.

In some implementations, hardware-implemented processor 11 and image sensor 12 may be remotely located from vehicle 10, and hardware-implemented processor 11 remotely located from vehicle 10 may execute behavior component 27 to effectuate one or more operating behaviors of vehicle 10. By way of non-limiting example, vehicle 10 may include an unmanned aerial vehicle, hardware-implemented processor 11 may include one or more processing units coupled to a moving camera, such as a security camera, a moving vehicle, or another unmanned aerial vehicle, and image sensor 12 may be one or more image sensors of the moving camera. One or more components of the moving camera may wirelessly communicate with one or more components of the unmanned aerial vehicle. One or more processing units of the moving camera may execute behavior component 27 to effectuate one or more operating behaviors of the unmanned aerial vehicle. For example, an unmanned aerial vehicle may detect a moving person within the field of view of its image sensor(s), and the unmanned aerial vehicle may effectuate one or more operating behaviors of another unmanned aerial vehicle within the vicinity of the moving person.

In some implementations, hardware-implemented processor 11 may be carried on or in vehicle 10 and image sensor 12 may be remotely located from vehicle 10. By way of non-limiting example, vehicle 10 may include an unmanned aerial vehicle, and hardware-implemented processor 11 may include one or more processing units of the unmanned aerial vehicle. Image sensor 12 may include one or more image sensors of a moving camera, such as a security camera, a moving vehicle, or another unmanned aerial vehicle. One or more components of the moving camera may wirelessly communicate with one or more components of the unmanned aerial vehicle. One or more processing units of the unmanned aerial vehicle may execute behavior component 27 to effectuate one or more operating behaviors of the unmanned aerial vehicle. For example, a security camera may detect a moving person within the field of view of its images sensor(s), and wirelessly communicate with an unmanned aerial vehicle within the vicinity of the moving person. One or more processing units of the unmanned aerial vehicle may effectuate one or more operating behaviors of the unmanned aerial vehicle based on the security camera's detection of the moving person.

In some implementations, one or more operating behaviors of a vehicle may include the vehicle maintaining a minimum distance between the moving object and/or a maximum distance from the moving object. A minimum distance may refer to one or both of horizontal distance and/or vertical distance that the vehicle must keep between the vehicle and the moving object. For example, vehicle 10 may be configured to avoid a moving object by maintaining a certain horizontal distance and/or a certain vertical distance from the moving object. A maximum distance may refer to one or both of horizontal distance and/or vertical distance from the moving object within which vehicle 10 must stay. For example, vehicle 10 may be configured to follow a moving object by staying within a certain horizontal distance and/or a certain vertical distance around the moving object. A vehicle may be configured to maintain a set distance from the moving object by setting the same distance for the minimum distance and the maximum distance.

In some implementations, one or more operating behaviors of a vehicle may include the vehicle maintaining a minimum speed and/or a maximum speed. A minimum speed may refer to one or both of linear speed and/or angular speed that the vehicle should not drop below. A maximum speed may refer to one or both of linear speed and/or angular speed that the vehicle should not exceed. A vehicle may be configured to maintain a set speed in the vicinity of the moving object by setting the same speed for the minimum speed and the maximum speed.

In some implementations, one or more operating behaviors of a vehicle may include the vehicle maintaining the moving object within the field of view of the image sensor. Such operation may include maintaining and/or changing one or more of the vehicle position, height, speed, direction, path, and/or other operation of the vehicle. For example, vehicle 10 may detect a moving person and may operate to keep the person within the field of view of its image sensor 12 by maintaining and/or changing one or more of its position, height, speed, direction, path, and/or other operations.

In some implementations, one or more operating behaviors of a vehicle may include the vehicle facilitating wireless communication of the visual information to a remote computing device. For example, vehicle 10 may detect a moving person and wirelessly transmit output signals conveying visual information within the field of view of its image sensor 12. The visual information may include one or more of an image, a video, and/or other visual information regarding the moving person.

Figure 8:
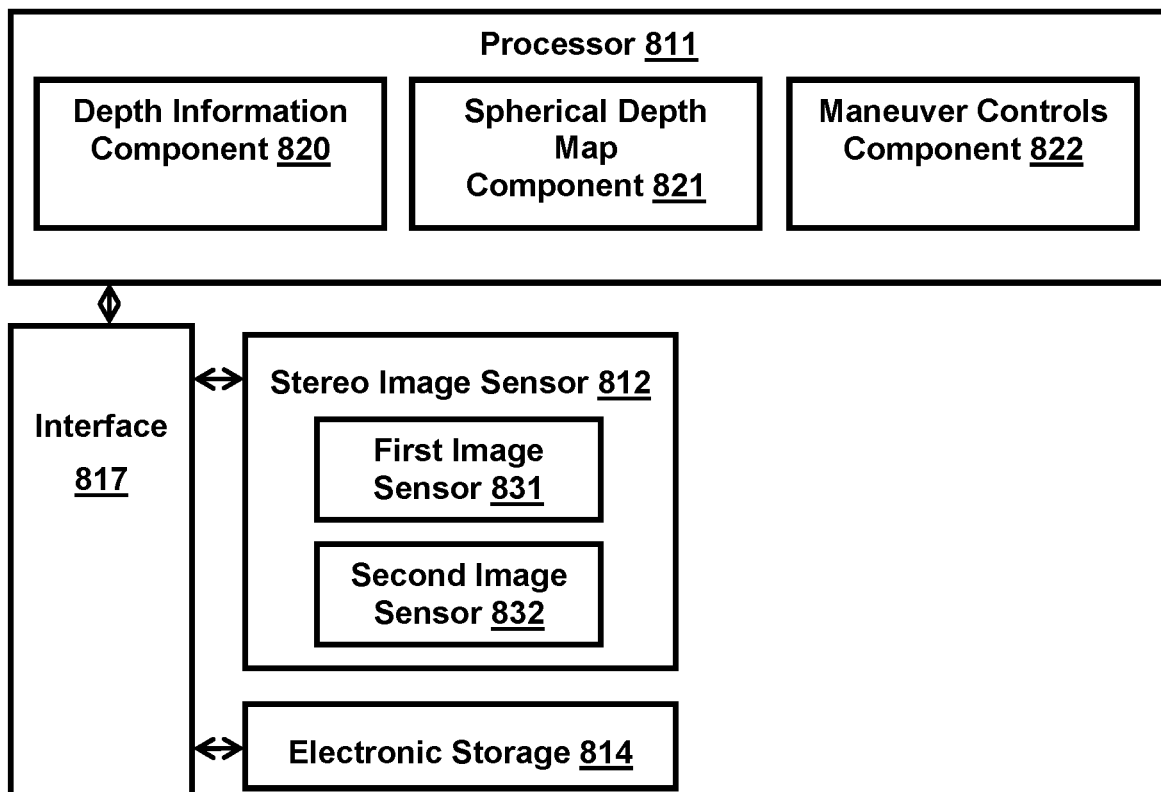
FIG. 8 illustrates a system for collision avoidance of an unmanned aerial vehicle using a spherical depth map.

Referring to FIG. 8, spherical depth map system 800 for collision avoidance of an unmanned aerial vehicle may include one or more of processor 811, electronic storage 814, interface 817, and/or other components. In some implementations, spherical depth map system 800 may include one or more of stereo image sensor 812. Depth information for an environment around the unmanned aerial vehicle may be obtained. The depth information may characterize distances between the unmanned aerial vehicle and the environment around the unmanned aerial vehicle. A spherical depth map may be generated from the depth information. A center of the spherical depth map may coincide with a location of the unmanned aerial vehicle. The spherical depth map may represent distances to closest surfaces of the environment around the unmanned aerial vehicle as a function of longitude angles and latitude angles. Maneuver controls for the unmanned aerial vehicle may be provided based on the spherical depth map.

Stereo image sensor 812 may be carried by the unmanned aerial vehicle. Stereo image sensor 812 may include first image sensor 831, second image sensor 832, and/or other components. First image sensor 831 may be configured to generate first visual output signals. The first visual output signals may convey visual information within a field of view of first image sensor 831. Visual information may include one or more of an image, a video, and/or other visual information. First image sensor 831 may include one or more of a charge-coupled device sensor, an active pixel sensor, a complementary metal-oxide semiconductor sensor, an N-type metal-oxide-semiconductor sensor, and/or other image sensors. Second image sensor 832 may be configured to generate second visual output signals. The second visual output signals may convey visual information within a field of view of second image sensor 832. Second image sensor 832 may include one or more of a charge-coupled device sensor, an active pixel sensor, a complementary metal-oxide semiconductor sensor, an N-type metal-oxide-semiconductor sensor, and/or other image sensors.

Electronic storage 814 may include electronic storage media that electronically stores information. Electronic storage 814 may store software algorithms, information determined by processor 811, information received remotely, and/or other information that enables spherical depth map system 800 to function properly. For example, electronic storage 814 may store information relating to spherical depth map (as discussed elsewhere herein), and/or other information.

Processor 811 may be configured to provide information processing capabilities in spherical depth map system 800. As such, processor 811 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. By way of non-limiting example, a microcontroller may include one or more of 8051, PIC, AVR, ARM microcontroller, and/or other microcontrollers. In some implementations, processor 811 may include a plurality of processing units. In some implementations, processor 811 may be coupled with one or more of RAM, ROM, input/output ports, and/or other peripherals.

Processor 811 may be configured by machine-readable instructions to execute one or more computer program components. The computer program components may include one or more of depth information component 820, spherical depth map component 821, maneuver controls component 822, and/or other computer program components. In some implementations, processor 811 may include one or more of a hardware-implemented processor, a software-implemented processor, and/or other processors. A hardware-implemented processor may include one or more computing/processing devices with one or more algorithms/logics implemented in hardware to perform one or more functions. A software-implemented processor may include one or more computing/processing devices with one or more algorithms/logics implemented in software to perform one or more functions.

In some implementations, one or more hardware-implemented processors may be located remotely from one or more software-implemented processors. In some implementations, one or more hardware-implemented processors and one or more software-implemented processors may be arranged and used as described in U.S. Provisional Patent Application No. 62/203,754, entitled "SYSTEM AND METHOD FOR OBSTACLE DETECTION FOR MOBILE ROBOTS," filed on Aug. 11, 2015, the foregoing being incorporated herein by reference in its entirety.

For example, a hardware-implemented processor may be located within an unmanned aerial vehicle and a software-implemented processor (e.g., a companion processor, etc.) may be located remotely from the unmanned aerial vehicle. The hardware-implemented processor may communicate with the software-implemented processor via a wireless communication link (e.g., Gigabit Ethernet link, etc.). The hardware-implemented processor and the software-implemented processor may perform one or more functions of the computer program components and/or other functions. For example, the hardware-implemented processor may perform streaming based tasks in real-time and show a light-weight polar-coordinate map (e.g., spherical depth map) to allow the software-implemented processor to fully process the data of stereo image sensor 812 and perform obstacle detection in real-time.

Depth information component 820 may be configured to obtain depth information for an environment around the unmanned aerial vehicle and/or other information. Depth information component 820 may obtain depth information from one or more sensors carried by the unmanned aerial vehicle, one or more sensors located remotely from the unmanned aerial vehicle, and/or from other locations. For example, depth information component 820 may obtain depth information from a distance sensor carried by the unmanned aerial vehicle, a distance sensor located remotely from the unmanned aerial vehicle, and/or from an electronic storage containing depth information for the environment around the unmanned aerial vehicle. The depth information may characterize one or more distances between the unmanned aerial vehicle and the environment around the unmanned aerial vehicle.

Figure 9A:
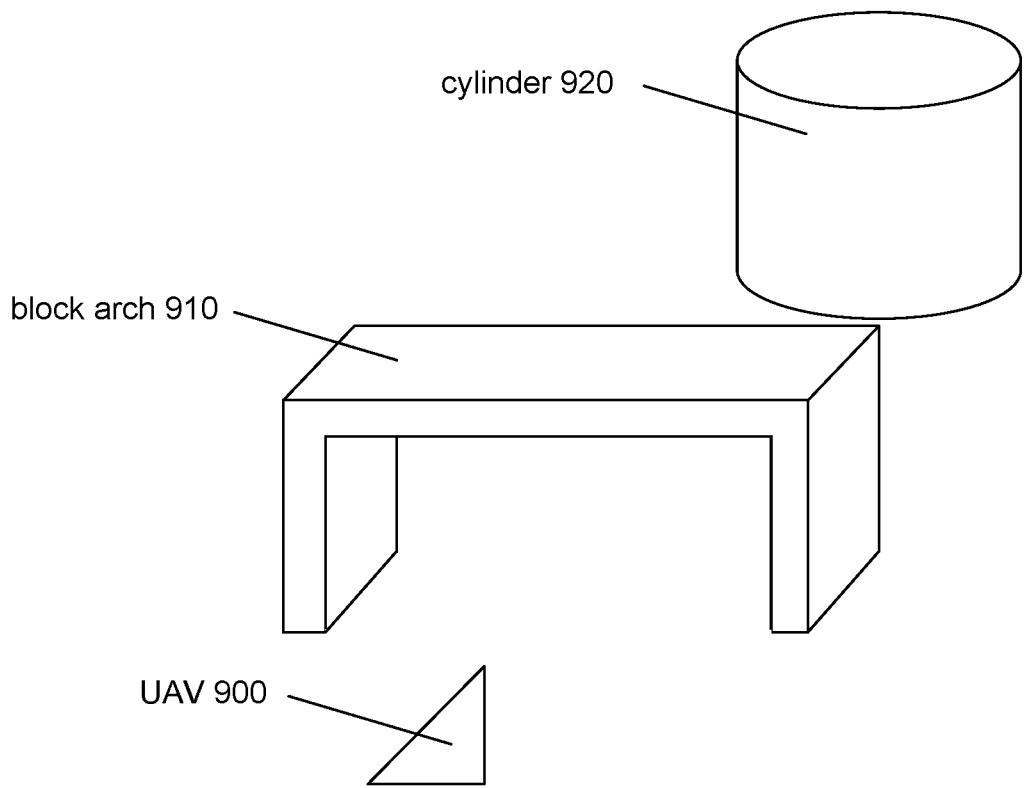
FIGS. 9A-9D illustrate exemplary environments around an unmanned aerial vehicle.
Figure 9B:
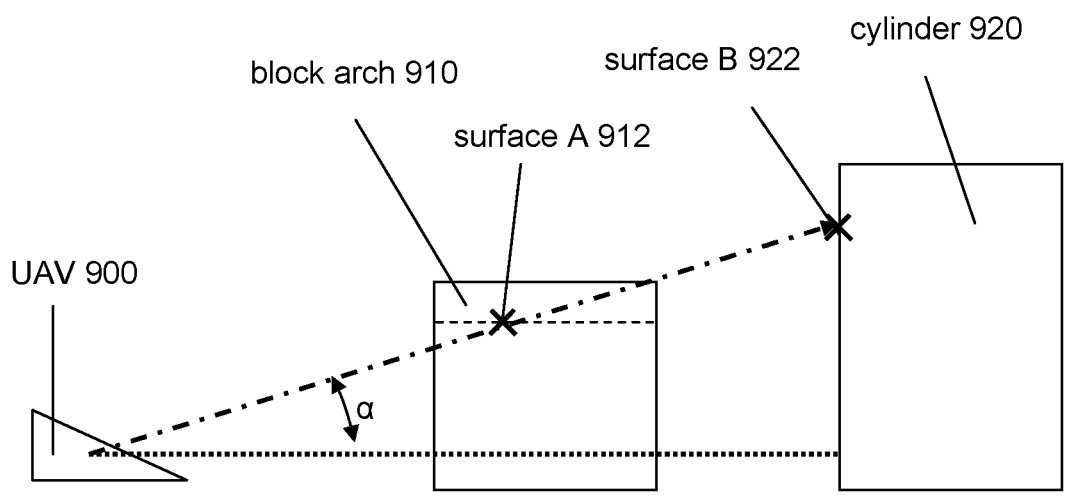

FIGS. 9A-9B illustrate non-limiting examples of environment around UAV 900 at one point in time. FIG. 9A provides a perspective view and FIG. 9B provides a side view of the environment around UAV 900. As shown in FIGS. 9A-9B, block arch 910 and cylinder 920 may be located in front of UAV 900. UAV 900 may be level with bottom of block arch 910 and cylinder 920. Depth information component 820 may obtain depth information for environment around UAV 900, including block arch 910 and cylinder 920. Depth information component 820 may obtain depth information at different longitude and latitude angles around UAV 900. For example, depth information component may obtain depth information for surface A 912 of block arch 910 and for surface B 922 of cylinder 920, which correspond to a longitude angle of zero degrees (directly in front of UAV 900) and a latitude angle of a degrees.

The depth information may include one or more of distance information, disparity information, and/or other depth information. For example, depth information component 820 may obtain one or more of distance information, disparity information, and/or other depth information for surface A 912 and surface B 912. One or more of distance information, disparity information, and/or other depth information may be obtained from and/or through use of distance sensors. Distance sensors may include sensors that provide depth information for objects around the distance sensors. As non-limiting examples, distance sensors may include one or more of image sensors, infrared distance sensors, laser rangefinders, Lidar, ultrasonic distance sensors, range cameras, and/or other distance sensors. For example, depth information component 820 may be configured to compare the visual information from one image sensor with the visual information from another image sensor (e.g., image sensors of a stereo image sensor, etc.) to determine the depth information and/or other information. The depth information may be undistorted and rectified based on a relative position and orientation of the two image sensors.

Figure 10:
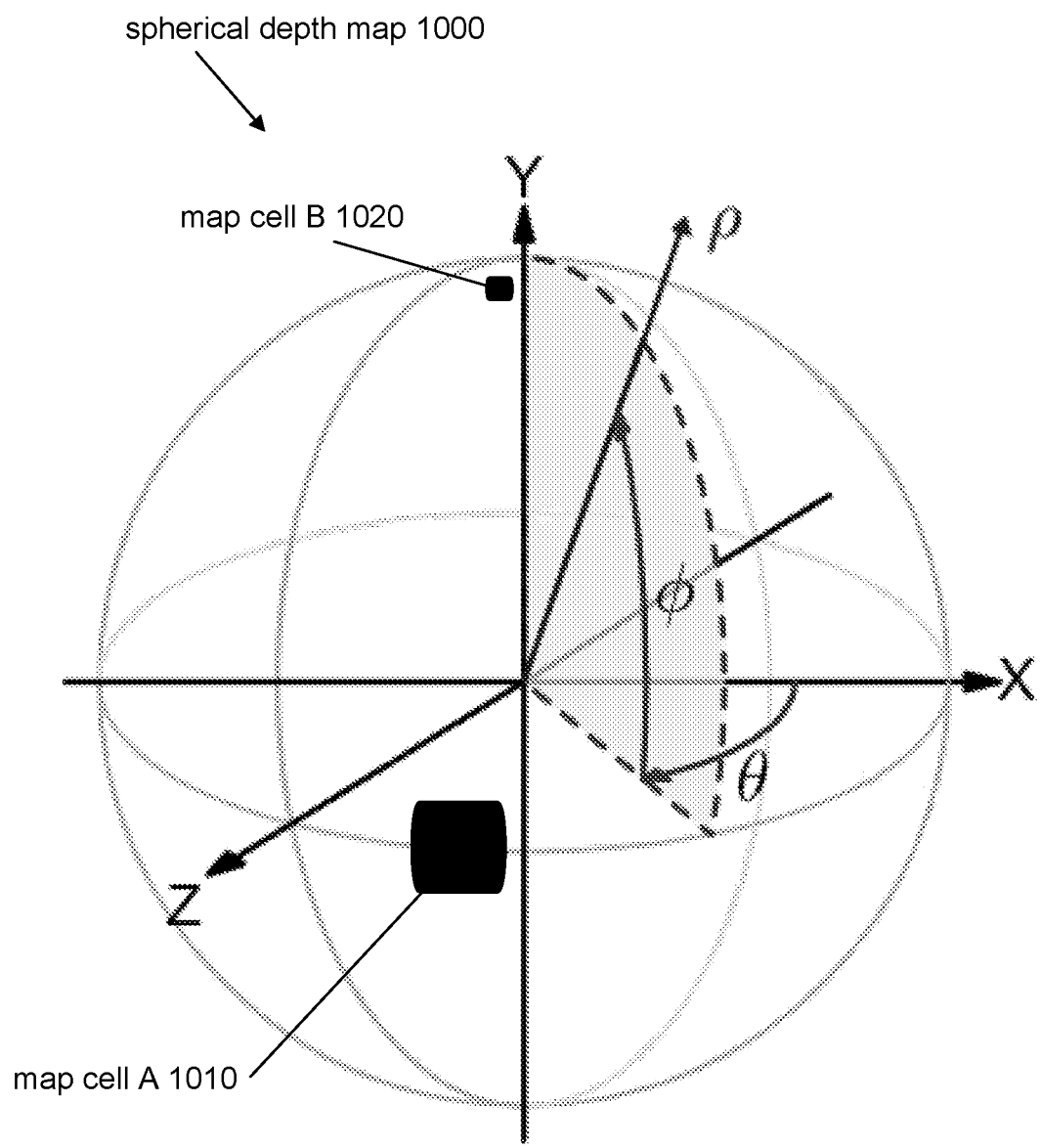
FIG. 10 illustrates an exemplary spherical depth map.

Spherical depth map component 821 may be configured to generate a spherical depth map from the depth information and/or other information. FIG. 10 illustrates an exemplary spherical depth map 1000. The center of spherical depth map 1000 may coincide with a location of the unmanned aerial vehicle (e.g., UAV 900, etc.). The spherical depth map may represent distances to closest surfaces of the environment around the unmanned aerial vehicle as a function of longitude angles and latitude angles (e.g., around UAV 900, etc.). The spherical depth map may capture the local geometry of the unmanned aerial vehicle's environment efficiently.

In some implementations, the spherical depth may be divided into map cells corresponding to longitude angles and latitude angles. For example, the surface of spherical depth map 1000 may be discretized into N rows, which correspond to $\theta \in [0, 2\pi]$ and M columns for $\Phi \in [\Phi', \pi-\Phi']$.

For example, spherical depth map 1000 may be divided into map cells by horizontal lines and vertical lines. Differing map resolution may be used, such as 200×100, 200×500, 1000×500. Other map resolutions are contemplated. Low resolution of the spherical depth map may allow for fast processing (e.g., inserting, updating, retrieval, filtering, etc.) of the depth information from the spherical depth map.

The division of the spherical depth map into map cells may allow depth information for a spherical environment around an unmanned aerial vehicle to be mapped to a fixed sized grid of discrete bearings. The map cells may include particular map cells corresponding to particular bearing angles (particular longitude angles and particular latitude angles). Individual map cells may include depth information for different bearing angles. For example, spherical depth map 1000 may include map cell A 1010, map cell B 1020, and/or other map cells. Map cell A 1010 and map cell B 1020 may correspond to different bearing angles. Map cell A 1010 may correspond to a bearing angle with a latitude angle of zero degrees (level with the unmanned aerial vehicle) and map cell B 1020 may correspond to a bearing angle with a latitude angle near the pole. Map cell A 1010 may be larger in size than map cell B 1020.

In some implementations, generating the spherical depth map may include reducing a three-dimensional map of a surrounding into the spherical depth map. Reducing a three-dimensional map of a surrounding into the spherical depth map may reduce the overall map data and allow for faster data insertion and/or retrieval. For example, to insert disparity data into a spherical depth map, the disparity data may be projected into 3D points. The projected disparity data may be transformed from the camera frame into the map frame. The disparity data in the map frame may be projected into a spherical coordinate system. In some implementations, disparity data may be inserted into a spherical depth map as described in U.S. Provisional Patent Application No. 62/203,754, entitled "SYSTEM AND METHOD FOR OBSTACLE DETECTION FOR MOBILE ROBOTS," filed on Aug. 11, 2015, incorporated supra.

In some implementations, generating the spherical depth map may include determining distance values for the map cells. The distance values may be determined based on the distances to the closest surfaces of the environment around the unmanned aerial vehicle and/or other information. A distance value for a particular map cell may be determined based on a distance to a closest surface of the environment around the unmanned aerial vehicle at a particular longitude angle and a particular latitude angle and/or other information. For example, as shown in FIGS. 9A-9B, a bearing from UAV 900 at a longitude angle of zero degrees (directly in front of UAV 900) and a latitude angle of a degrees may include two surfaces: surface A 912 and surface B 912. The distance value for this particular bearing angle may be determined based on the distance between UAV 900 and surface A 912.

In some the determination of distance values may disregard distances to surfaces of the environment around the unmanned aerial vehicle at individual longitude angles and individual latitude angles that are greater than the distances to the closest surfaces of the environment around the unmanned aerial vehicle at the individual longitude angles and the individual latitude angles. The distance values may correspond only to the closest surfaces of the environment around the unmanned aerial vehicle at individual longitude angles and individual latitude angles. For example, in FIGS. 9A-9B, the determination of the distance value for the bearing having a longitude angle of zero degrees (directly in front of UAV 900) and a latitude angle of a degrees may disregard distance to surface B 922. Such a determination of distance values may allow for tracking of surfaces immediately surrounding an unmanned aerial vehicle without having to keep track of the entire three-dimensional space.

In some implementations, the spherical depth map may include one or more dead zones in one or more polar regions. The distance values may not be determined for the map cells in the dead zone(s). The density of map cells may become large near the polar regions of the spherical depth map. The density of map cells near/in the polar regions may be greater than needed for vehicle guidance. Not processing depth information for these regions may reduce memory/processing requirements. The amount of polar regions to remove from processing may be determined based on the size of the unmanned aerial vehicle. Smaller sizes of the unmanned aerial vehicle may correspond to smaller sizes of the removed polar regions. The polar regions may be defined by angle (V.

Figure 9C:
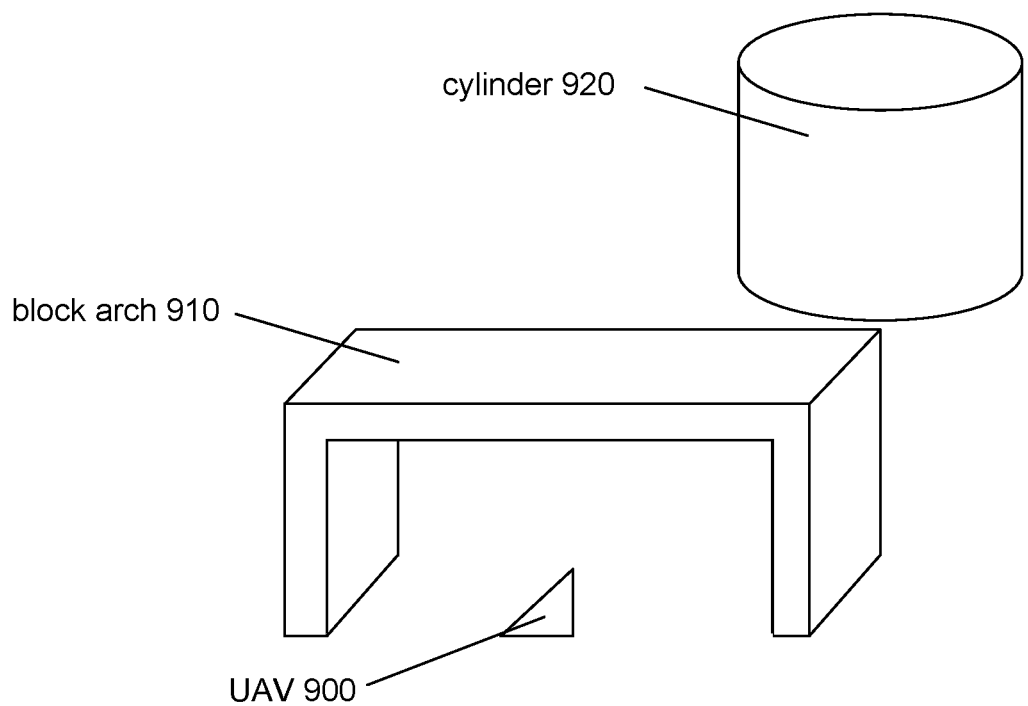
Figure 9D:
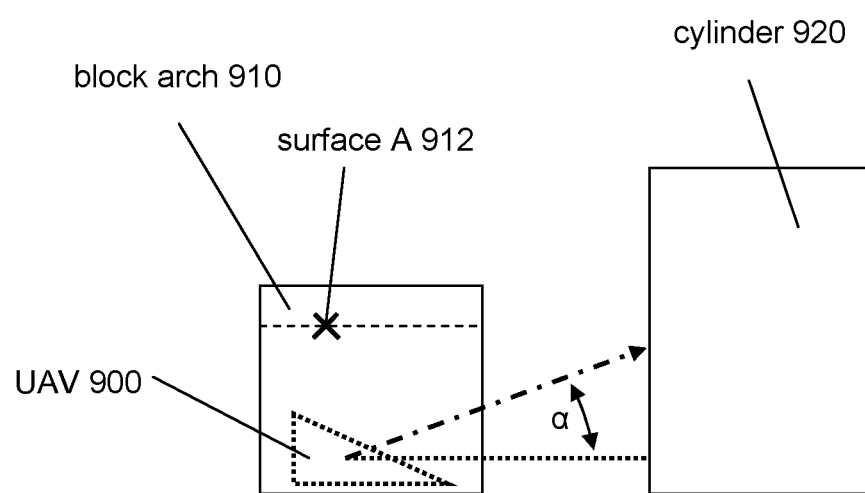

In some implementations, spherical depth map component 821 may be configured to, responsive to detecting the unmanned aerial vehicle traveling a threshold distance, transform the spherical depth map. The spherical depth may be transformed such that the center of the spherical depth map coincides with the location of the unmanned aerial vehicle. For example, UAV 900 may move from a position shown in FIGS. 9A-9B to a position shown in FIGS. 9C-9D. In FIGS. 9C-9D, UAV 900 may be underneath block arch 910. Spherical depth map component 821 may determine that UAV 900 has traveled from the position shown in FIGS. 9A-9B to the position shown in FIGS. 9C-9D (based on readings from a motion and orientation sensor, visual odometry, etc.). In response to the translational movement of UAV 900 exceeding a certain threshold, spherical depth map component 821 may transform the spherical depth map to keep the spherical depth map centered at UAV 900.

Transformation of the spherical depth map may allow spherical depth map system 800 to keep track of distances that may not be currently observable. For example, a sensor of UAV 900 used to determine depth information for the environment surrounding UAV 900 may be limited to a degree above the horizontal. In FIG. 9B, UAV 900 may be able to determine depth information for surface A 912 of block arch 910. In FIG. 9D, UAV 900 may not be able to determine depth information for surface A 912 of block arch 910 because surface A 910 is outside the sensor range of UAV 900. UAV 900 relying sole on present sensor data to determine depth information may not detect surface A 912 and may not be able to provide maneuver controls (e.g., collision warning, keeping a safe distance away from surface A 912, indication of distance to surface A 912, etc.) for UAV 900 based on surface A 912. Transformation of the spherical depth map may allow UAV 900 to remember depth information for surface A 912 when it moves from the position shown in FIGS. 9A-9B to the position shown in FIGS. 9C-9D.

Transformation of the spherical depth map may introduce discretization errors due to low angular resolution of the spherical depth map. To reduce the influence of these errors, the spherical depth map may be only updated after a certain minimal translation threshold. Fast transformation of the spherical depth map be performed by forward-propagating the last known position of UAV 900 using motion and orientation sensor measurements and current motion and orientation sensor bias estimate. In some implementations, a spherical depth map may be transformed as described in U.S. Provisional Patent Application No. 62/203,754, entitled "SYSTEM AND METHOD FOR OBSTACLE DETECTION FOR MOBILE ROBOTS," filed on Aug. 11, 2015, incorporated supra.

Maneuver controls component 822 may be configured to provide maneuver controls for the unmanned aerial vehicle. The maneuver controls for the unmanned aerial vehicle may be based on the spherical depth map. The maneuver controls for the unmanned aerial vehicle may include providing additional information relating to the unmanned aerial vehicle (environment around the unmanned aerial vehicle) based on the spherical depth map (e.g., detecting closest objects in the environment around the unmanned aerial vehicle, determining distances to closest objects in the environment around the unmanned aerial vehicle, providing warnings about closest objects in the environment around the unmanned aerial vehicle, etc.), providing control limits for the unmanned aerial vehicle based on the spherical depth map (e.g., restricting one or more of speed, heading, or distance to closest objects in the environment around the unmanned aerial vehicle, etc.), and/or other maneuver controls. In some implementations, the maneuver controls for the unmanned aerial vehicle may include controlling the unmanned aerial vehicle to avoid one or more objects in the environment around the unmanned aerial vehicle. For example, in FIGS. 9C-9D, maneuver controls component 822 may provide information about surface A 912 and/or restrict UAV 900 from flying near/into surface A 912.

In some implementations, maneuver controls component 822 may provide for obstacle detection. In some implementations, obstacle detection may be performed as described in U.S. Provisional Patent Application No. 62/203,754, entitled "SYSTEM AND METHOD FOR OBSTACLE DETECTION FOR MOBILE ROBOTS," filed on Aug. 11, 2015, incorporated supra. Maneuver controls component 822 may extract all values in the spherical depth map which are closer than a certain threshold (e.g., extract distance values closer than a certain distance). In some implementations, maneuver controls component 822 may provide for obstacle detection by determining distances at given bearing angles. For example, UAV 900 in FIGS. 9C-9D may be programmed to rise up. Maneuver controls component 822 may determine distances to surrounding objects (e.g., surface A 912 of block arch 910) by checking the depth information stored in the map cells corresponding to the programmed flight path. Based on the retrieval of distance to surface A 912, maneuver controls component 822 may detect surface A 912. In some implementations, information contained in a spherical depth map may be accessed as described in U.S. Provisional Patent Application No. 62/203,754, entitled "SYSTEM AND METHOD FOR OBSTACLE DETECTION FOR MOBILE ROBOTS," filed on Aug. 11, 2015, incorporated supra.

Figure 12:
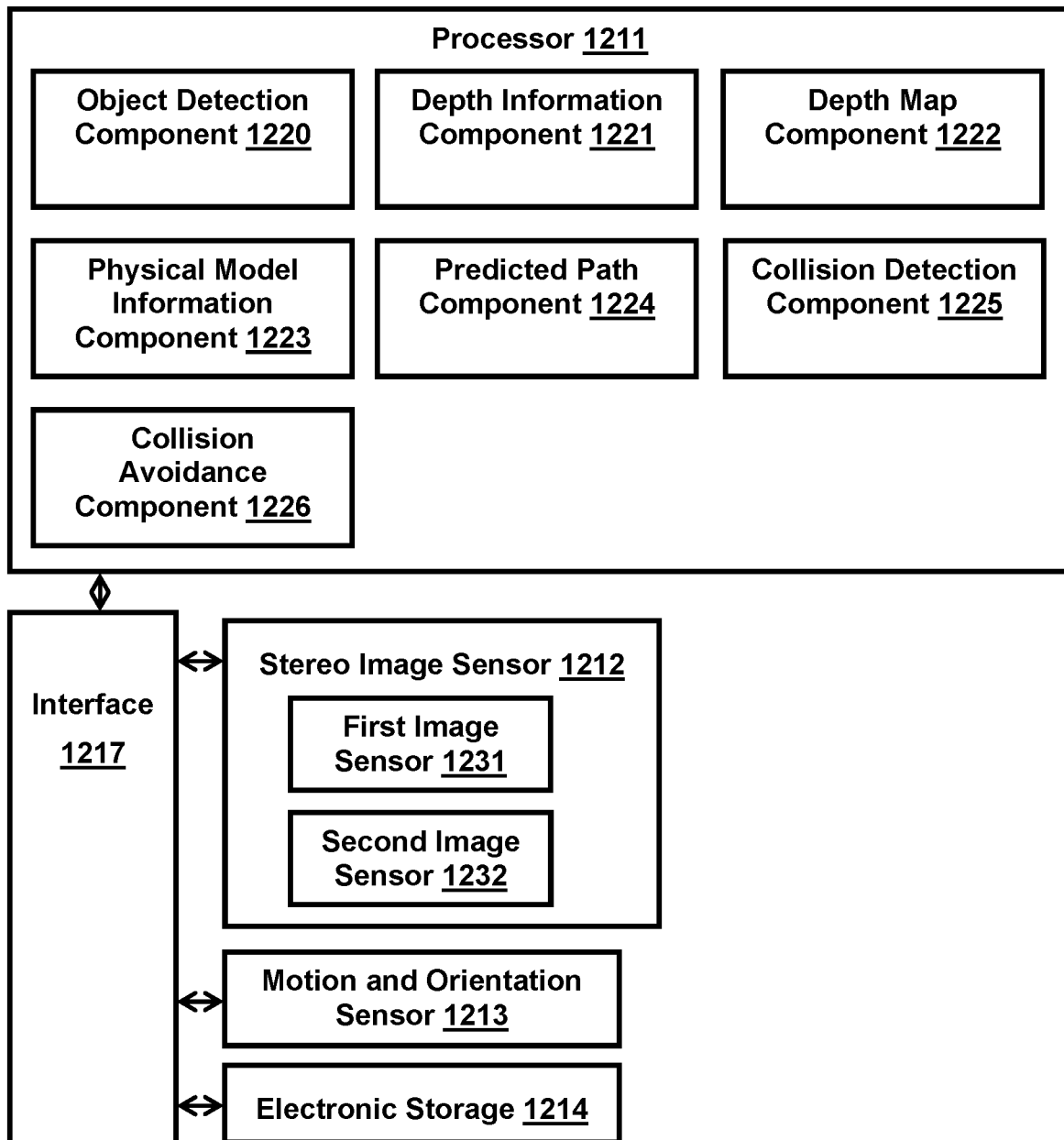
FIG. 12 illustrates a system for collision avoidance of an unmanned aerial vehicle using a predicted vehicle path.

Referring to FIG. 12, predicted path system 1200 for collision avoidance of an unmanned aerial vehicle may include one or more of processor 1211, electronic storage 1214, interface 1217, and/or other components. In some implementations, predicted path system 1200 may include one or more of stereo image sensor 1212. In some implementations, predicted path system 1200 may include one or more of motion and orientation sensor 1213. A stationary object and/or a moving object in an environment around the unmanned aerial vehicle may be detected. Depth information for the environment around the unmanned aerial vehicle may be obtained. The depth information may characterize distances between the unmanned aerial vehicle and the environment around the unmanned aerial vehicle, including the detected stationary object and/or the detected moving object. A depth map may be generated from the depth information. The accuracy of the depth map may be characterized by a depth map accuracy. Vehicle physical model information may be obtained. The vehicle physical model may characterize a motion of the unmanned aerial vehicle. The accuracy of the vehicle physical model information may be characterized by a vehicle physical model accuracy. A predicted vehicle path may be determined based on the vehicle physical model information and the vehicle physical model accuracy.

In response to detecting the stationary object, a potential collision of the unmanned aerial vehicle with the stationary object may be determined based on the depth map, the depth map accuracy, and the predicted vehicle path. In response to detecting the moving object, moving object physical model information may be obtained. The moving object physical model may characterize a motion of the moving object. The accuracy of the moving object physical model may be characterized by a moving object physical model accuracy. A predicted moving object path may be determined based on the depth map, the depth map accuracy, the moving object physical model information, and the moving object physical model accuracy. A potential collision of the unmanned aerial vehicle with the moving object may be determined based on the predicted vehicle path and the predicted moving object path. In response to detecting a collision of the unmanned aerial vehicle, a velocity of the unmanned aerial vehicle may be changed.

Stereo image sensor 1212 may be carried by the unmanned aerial vehicle. Stereo image sensor 1212 may include first image sensor 1231, second image sensor 1232, and/or other components. First image sensor 1231 may be configured to generate first visual output signals. The first visual output signals may convey visual information within a field of view of first image sensor 1231. Visual information may include one or more of an image, a video, and/or other visual information. First image sensor 1231 may include one or more of a charge-coupled device sensor, an active pixel sensor, a complementary metal-oxide semiconductor sensor, an N-type metal-oxide-semiconductor sensor, and/or other image sensors. Second image sensor 1232 may be configured to generate second visual output signals. The second visual output signals may convey visual information within a field of view of second image sensor 1232. Second image sensor 1232 may include one or more of a charge-coupled device sensor, an active pixel sensor, a complementary metal-oxide semiconductor sensor, an N-type metal-oxide-semiconductor sensor, and/or other image sensors.

Motion and orientation sensor 1213 may be configured to generate motion and orientation output signals. Motion and orientation output signals may convey motion information and orientation information of the unmanned aerial vehicle. Motion information may include one or more motion information regarding speed of the unmanned aerial vehicle, distance traveled by the unmanned aerial vehicle, and/or movement of the unmanned aerial vehicle, including one or more of moving forward, moving backwards, moving right, moving left, moving up, moving down, other movements, and/or other motion information. Orientation information may include one or more orientation information regarding orientation of the unmanned aerial vehicle, including one or more of turning right, turning left, rolling right, rolling left, pitching up, pitching down, and/or other orientation information. Motion information and/or orientation information may be processed to obtain motions and/or orientations of the unmanned aerial vehicle at particular times and/or locations. Motion and orientation sensor 1213 may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

Electronic storage 1214 may include electronic storage media that electronically stores information. Electronic storage 1214 may store software algorithms, information determined by processor 1211, information received remotely, and/or other information that enables predicted path system 1200 to function properly. For example, electronic storage 1214 may store depth information (as discussed elsewhere herein), and/or other information.

Processor 1211 may be configured to provide information processing capabilities in predicted path system 1200. As such, processor 1211 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. By way of non-limiting example, a microcontroller may include one or more of 8051, PIC, AVR, ARM microcontroller, and/or other microcontrollers. In some implementations, processor 1211 may include a plurality of processing units. In some implementations, processor 1211 may be coupled with one or more of RAM, ROM, input/output ports, and/or other peripherals.

Processor 1211 may be configured by machine-readable instructions to execute one or more computer program components. The computer program components may include one or more of object detection component 1220, depth information component 1221, depth map component 1222, physical model information component 1223, predicted path component 1224, collision detection component 1225, collision avoidance component 1226, and/or other computer program components. In some implementations, processor 1211 may include one or more of a hardware-implemented processor, a software-implemented processor, and/or other processors. In some implementations, one or more hardware-implemented processors may be located remotely from one or more software-implemented processors.

Figure 13A:
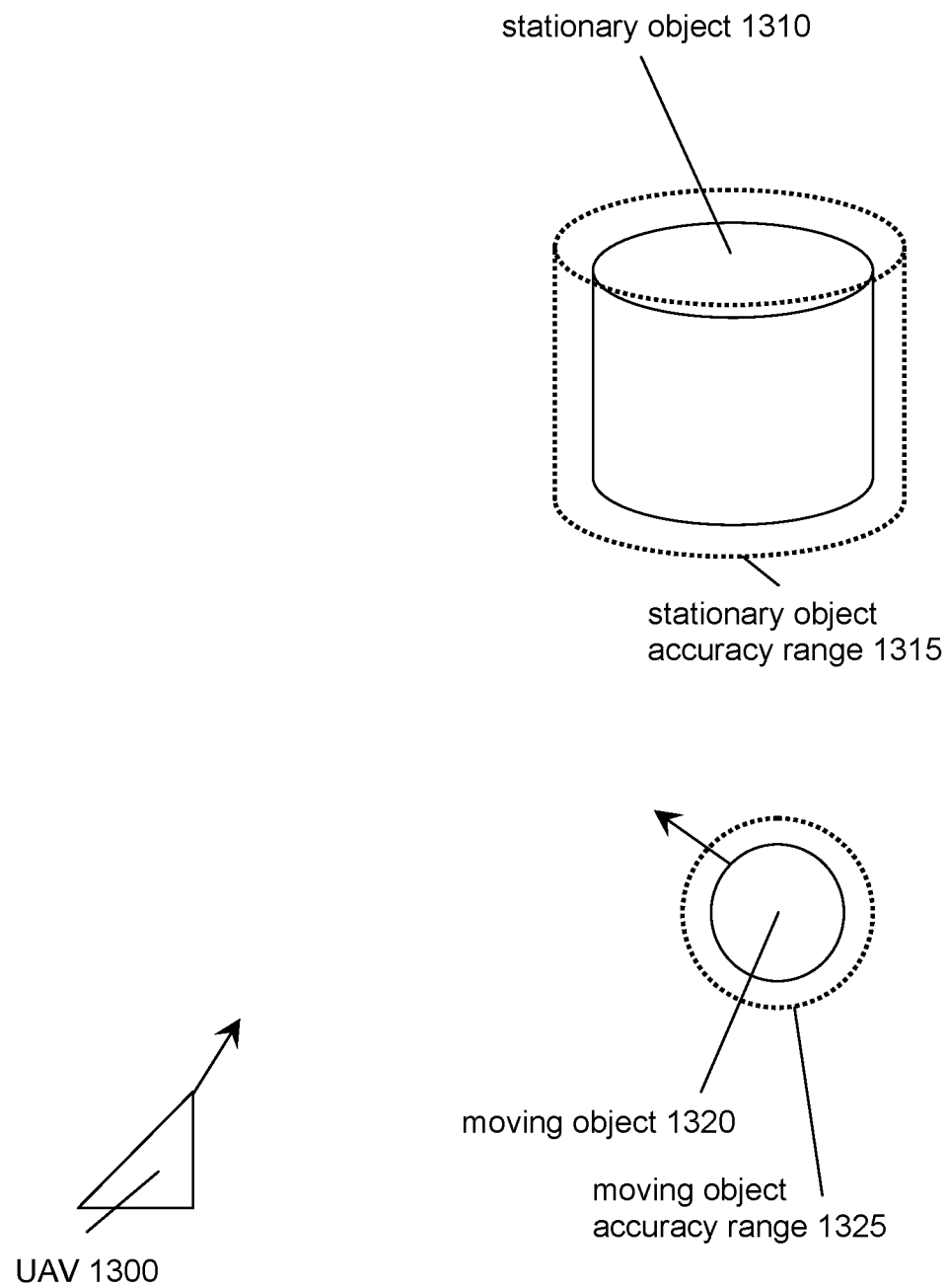
FIGS. 13A-13E illustrate exemplary environments around an unmanned aerial vehicle.

Object detection component 1220 may be configured to detect one or more stationary objects in an environment around the unmanned aerial vehicle. Object detection component 1220 may be configured to detect one or more moving objects in the environment around the unmanned aerial vehicle. For example, FIG. 13A illustrates an exemplary environment around an unmanned aerial vehicle (UAV 1300). Object detection component 1220 may detect stationary object 1310, moving object 1320, and/or other objects.

In some implementations, object detection component 1220 may be configured to identify one or more object types of one or more detected objects. An object type may refer to one or more categories of objects that have one or more common characteristics. A common characteristic may refer to a permanent or temporary feature of an object relating to the shape, motion, behavior and/or other features of the object. Common characteristics may pertain to an entire object, or one or more portions of the object. Non-limiting examples of object types include a person, a child, an adult, one or more parts of a person (e.g., arm, hand, head, body, leg, feet, etc.), an animal, a particular kind of animal, one or more parts of an animal, a vehicle, a particular kind of vehicle, one or more parts of a vehicle (e.g., wheel, door, engine, trunk, window, wing, propeller, rotor, etc.), a stationary object, one or more parts of a stationary object, and other object types.

Depth information component 1221 may be configured to obtain depth information for an environment around the unmanned aerial vehicle and/or other information. Depth information component 1221 may obtain depth information from one or more sensors carried by the unmanned aerial vehicle, one or more sensors located remotely from the unmanned aerial vehicle, and/or from other locations. For example, depth information component 1221 may obtain depth information from a distance sensor carried by the unmanned aerial vehicle, a distance sensor located remotely from the unmanned aerial vehicle, and/or from an electronic storage containing depth information for the environment around the unmanned aerial vehicle. The depth information may characterize one or more distances between the unmanned aerial vehicle and the environment around the unmanned aerial vehicle. The environment around the unmanned aerial vehicle may include one or more detected stationary objects and/or one or more detected moving objects. For example, depth information component 1221 may obtain depth information characterizing one or more distances between UAV 1300 and stationary object 1310 and one or more distances between UAV 1300 and moving object 1320.

The depth information may include one or more of distance information, disparity information, and/or other depth information. For example, depth information component 1221 may obtain one or more of distance information, disparity information, and/or other depth information for stationary object 1310 and moving object 1320. One or more of distance information, disparity information, and/or other depth information may be obtained from and/or through use of distance sensors. Distance sensors may include sensors that provide depth information for objects around the distance sensors. As non-limiting examples, distance sensors may include one or more of image sensors, infrared distance sensors, laser rangefinders, Lidar, ultrasonic distance sensors, range cameras, and/or other distance sensors. For example, depth information component 1221 may be configured to compare the visual information from one image sensor (e.g., first image sensor 1231) with the visual information from another image sensor (e.g., second image sensor 1232) to determine the depth information and/or other information.

Depth map component 1222 may be configured to generate a depth map from the depth information and/or other information. The depth map may characterize distances between the unmanned aerial vehicle and one or more detected stationary objects and/or one or more detected moving objects. For example, depth map component 1222 may generate depth map characterizing distances between one or more distances between UAV 1300 and stationary object 1310 and one or more distances between UAV 1300 and moving object 1320. In some implementations, the depth may include a statistical voxel-map, an Octomap, a spherical depth map, and/or other depth maps.

The accuracy of the depth map may be characterized by a depth map accuracy and/or other information. The depth map accuracy may be inherent in one or more of sensor(s) used to capture the depth information, algorithms used to capture/transform/store the depth information, algorithms used to create a depth map, and/or other processes/components used to capture depth information/create the depth map. The depth map accuracy may be obtained from electronic storage 1214 and/or obtained from other locations. The depth map accuracy may be calculated.

The depth map accuracy may provide information about accuracy of the distances between the unmanned aerial vehicle and the detected objects characterized by the depth map with respect to actual distances between the unmanned aerial vehicle and the detected objects. The depth map accuracy may provide information about accuracy of the distance between the unmanned aerial vehicle and one or more detected stationary objects characterized by the depth map with respect to actual distances between the unmanned aerial vehicle and one or more detected stationary objects. For example, the depth map accuracy may provide information about accuracy of distance between UAV 1300 and stationary object 1310. Based on the depth map accuracy, stationary object 1310 may be determined to be located within a range of locations, indicated as stationary object accuracy range 1315.

The depth map accuracy may provide information about accuracy of the distance between the unmanned aerial vehicle and characterized by the depth map with respect to actual distances between the unmanned aerial vehicle and one or more detected moving object. For example, the depth map accuracy may provide information about accuracy of distance between UAV 1300 and moving object 1320. Based on the depth map accuracy, moving object 1325 may be determined to be located within a range of locations, indicated as moving object accuracy range 1325.

Physical model information component 1223 may be configured to obtain vehicle physical model information and/or other information. The vehicle physical model information may characterize a motion of the unmanned aerial vehicle. For example, physical model information component 1223 may obtain vehicle physical model information for UAV 1300. The vehicle physical model information may be obtained from UAV 1300, obtained from one or more sensors measuring movement of UAV 1300, obtained from electronic storage 1214 and/or from other locations. The vehicle physical model information may be calculated.

In some implementations, the vehicle physical model information may be based on the motion and orientation information of the unmanned aerial vehicle and/or other information. In some implementations, the vehicle physical model information may be based on one or more of a weight of the unmanned aerial vehicle, a size of the unmanned aerial vehicle, a shape of the unmanned aerial vehicle, a linear speed of the unmanned aerial vehicle, a linear acceleration of the unmanned aerial vehicle, a linear direction of the unmanned aerial vehicle, an angular speed of the unmanned aerial vehicle, an angular acceleration of the unmanned aerial vehicle, an angular direction of the unmanned aerial vehicle, a motion instruction for the unmanned aerial vehicle, an environmental condition around the unmanned aerial vehicle, and/or other parameters. One or more of the parameters may be related to one or more other parameters. Physical model information component 1223 may include and/or retrieve information (for example, a database, etc.) relating to one or more of the parameters and/or one or more relationships between the parameters.

Figure 13B:
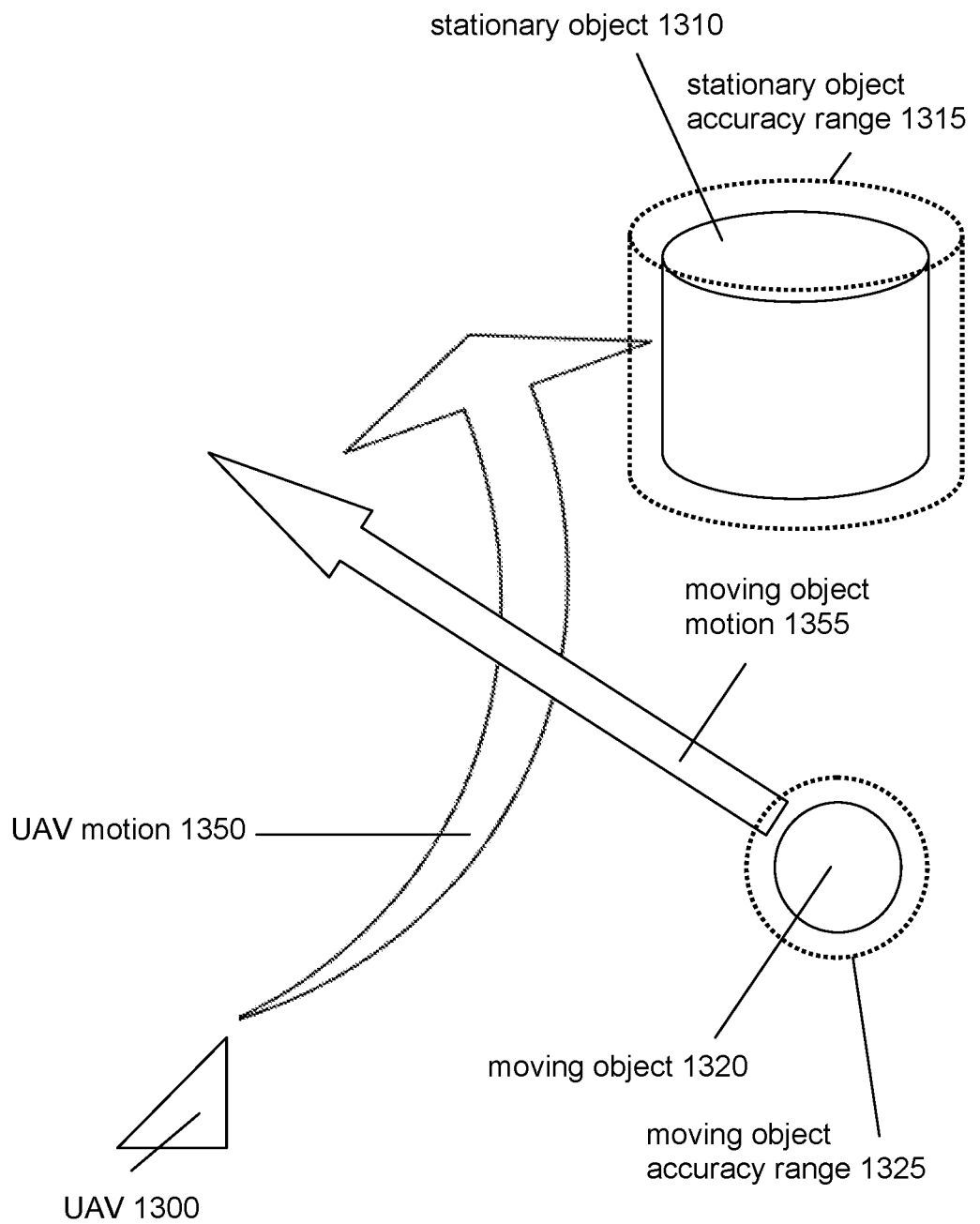

For example, physical model information component 1223 may obtain vehicle physical model information for UAV 1300. The vehicle physical model information for UAV 1300 may characterize motion of UAV 1300, shown as UAV motion 1350 in FIG. 13B. As shown in FIG. 13B, the vehicle physical model information for UAV 1300 may indicate that UAV 1300 will move forward by turning right and then turning left.

The accuracy of the vehicle physical model information may be characterized by a vehicle physical model accuracy and/or other information. The vehicle physical model accuracy may be inherent in one or more of the unmanned aerial vehicle, one or more parts of the unmanned aerial vehicle, algorithms used to control/move the unmanned aerial vehicle, environmental condition around the unmanned aerial vehicle, and/or sensors used to track movement of the unmanned aerial vehicle and/or surrounding conditions. The vehicle physical model accuracy may be determined based on the identity of unmanned aerial vehicle (e.g., model number, etc.) and/or other processes/components/factors (e.g., payload carried by the unmanned aerial vehicle, weather conditions, wind speed, etc.) impacting control/movement of the unmanned aerial vehicle. The vehicle physical model accuracy may be obtained from electronic storage 1214 and/or obtained from other locations. The vehicle physical model accuracy may be calculated.

The vehicle physical model accuracy may provide information about accuracy of the motion of the unmanned aerial vehicle characterized by the vehicle physical model information with respect to an actual motion of the unmanned aerial vehicle. For example, the vehicle physical model accuracy may provide information about accuracy of UAV motion 1350.

Physical model information component 1223 may be configured to, responsive to detection of one or more moving objects, obtain moving object physical model information and/or other information. The moving object physical model information may characterize one or more motions of one or more moving objects. For example, physical model information component 1223 may obtain moving object physical model information for moving object 1320. The moving object model information may be obtained from moving object 1320, obtained from one or more sensors measuring movement of moving object 1320, obtained from electronic storage 1214 and/or from other locations. The moving object physical model information may be calculated. In some implementations, the moving object physical model information may be based on one or more object types of one or more detected moving objects and/or other information. For example, the moving object physical model information for moving object 1320 may be based on the object type of moving object 1320.

For example, physical model information component 1223 may obtain moving object physical model information for moving object 1320. The moving object physical model information for moving object 1320 may characterize motion of moving object 1320, shown as moving object motion 1355 in FIG. 13B. As shown in FIG. 13B, the moving object physical model information for moving object 1320 may indicate that moving object 1320 will move diagonally to the left.

The accuracy of the moving object physical model information may be characterized by a moving object physical model accuracy and/or other information. The moving object physical model accuracy may be inherent in one or more of the moving object, one or more parts of the moving object, algorithms used to control/move the moving object, environmental condition around the moving object, and/or sensors used to track movement of the moving object and/or surrounding conditions. The moving object physical model accuracy may be determined based on the identity of moving object and/or other processes/components/factors impacting control/movement of the moving object. The moving object physical model accuracy may be obtained from electronic storage 1214 and/or obtained from other locations. The moving object physical model accuracy may be calculated.

The moving object physical model accuracy may provide information about accuracy of the motion of one or more moving objects characterized by the moving object physical model information with respect to the actual motion of one or more moving objects. For example, the moving object physical model accuracy may provide information about accuracy of moving object motion 1355.

Predicted path component 1224 may be configured to determine a predicted vehicle path. A predicted vehicle path may be determined based on the vehicle physical model information, the vehicle physical model accuracy, and/or other information. Predicted path component 1224 may determine a predicted vehicle path of an unmanned aerial vehicle by taking into account the vehicle physical model information (e.g., measured position, orientation, velocity of the unmanned aerial vehicle, etc.), the vehicle physical model accuracy (e.g., inaccuracies in position/orientation/velocity measurement, weather conditions, wind speeds, etc.), and/or other information. The predicted vehicle path may include predicted location(s) of the unmanned aerial vehicle at one or more future times.

Figure 13C:
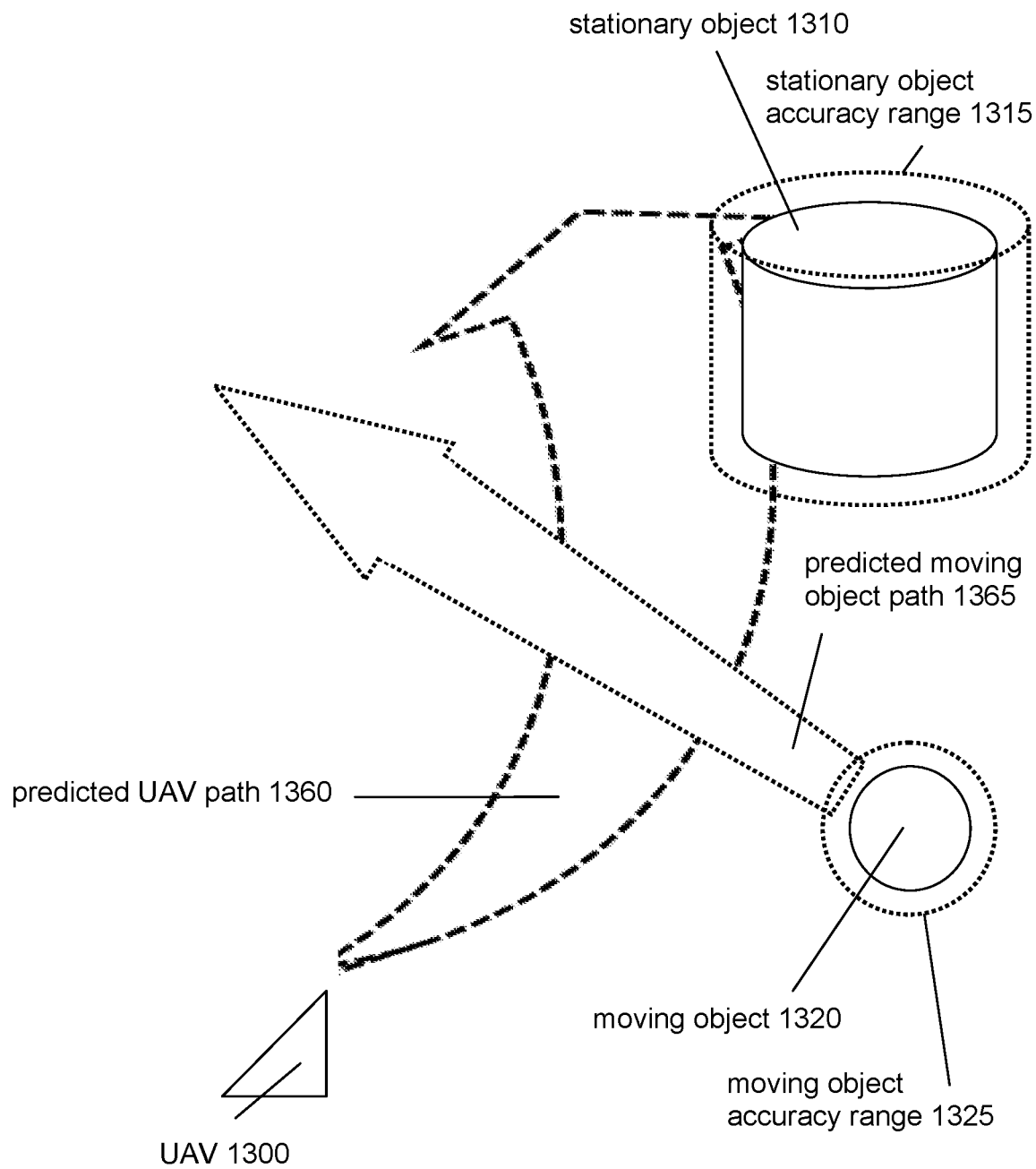

The area encompassed by the predicted vehicle path of the unmanned aerial vehicle may increase with time. The increased area covered by the predicted vehicle path may account for one or more errors in determining motion of the unmanned aerial vehicle and provide for safety margins in navigating the unmanned aerial vehicle to a destination. For example, based on the vehicle physical model information and the vehicle physical model accuracy of UAV 1300, predicted path component 1224 may determine predicted UAV path 1360, shown in FIG. 13C. Predicted UAV path 1360 may cover an area greater than UAV motion 1350.

Predicted path component 1224 may be configured to, responsive to detection of one or more moving objects, determine one or more predicted moving object paths. One or more predicted moving object paths may be determined based on the depth map, the depth map accuracy, the moving object physical model information, the moving object physical model accuracy, and/or other information. Predicted path component 1224 may determine a predicted moving object path of a moving object by taking into account the moving object physical model information (e.g., measured position, orientation, velocity of the moving object, etc.), the moving object physical model accuracy and/or the depth map accuracy (e.g., inaccuracies in position/orientation/velocity measurement, weather conditions, wind speeds, etc.), and/or other information. The predicted moving object path(s) may include predicted location(s) of the moving object(s) at one or more future times.

The area encompassed by the predicted moving object path of the moving object may increase with time. The increased area covered by the predicted moving object path may account for one or more errors in determining motion of the moving object and provide for safety margins in navigating the unmanned aerial vehicle to a destination. For example, based on the depth map, the depth map accuracy, the moving object physical model information and the moving object physical model accuracy of moving object 1320, predicted path component 1224 may determine predicted moving object path 1365, shown in FIG. 13C. Predicted moving object path 1365 may cover an area greater than moving object motion 1355.

In some implementations, the predicted motion object path may be determined based on the object type of the moving object. The type of the moving object may indicate limits of the moving object and/or predictability/unpredictability of the moving object. For example, based on an identification of a moving object as a car, predicted path component 1224 may determine a predicted motion object path based on limits of a car movement (e.g., cannot move sideways, cannot fly, etc.). As another example, based on an identification of a moving object as a child, predicted path component 1224 may determine a predicted motion object path based on unpredictability of a child (e.g., may change directions abruptly without warning). For example, a predicted motion object path for a child may cover a greater area than a predicted motion object path for a Ferris wheel to provide for safety margins in navigating the unmanned aerial vehicle near a child. The predicted motion object path for a child may be limited based on a likely maximum speed of a child. Other types of prediction of predicted motion object path based on the object type of the moving object are contemplated.

Figure 13D:
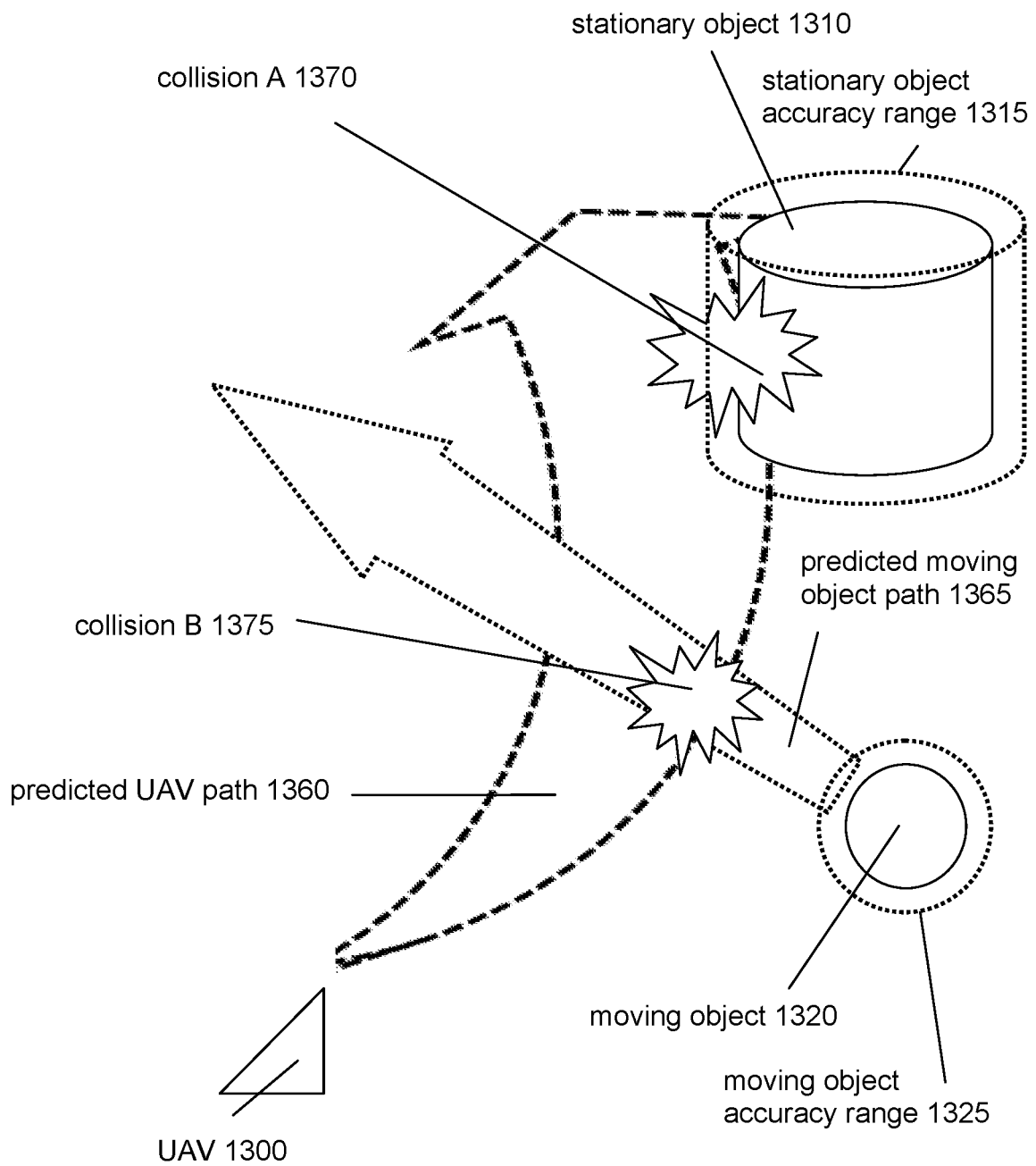

Collision detection component 1225 may be configured to, responsive to detecting one or more stationary objects, determine whether the unmanned aerial vehicle moving in the predicted vehicle path may collide with one or more detected stationary objects. A collision between the unmanned aerial vehicle and one or more detected stationary objects may be determined based on the depth map, the depth map accuracy, the predicted vehicle path, and/or other information. One or more collisions may be determined at one or more locations and/or at one or more future times. For example, as shown in FIG. 13D, collision detection component 1225 may determine that UAV 1300 moving in predicted UAV path 1360 may collide with stationary object 1310 (shown as collision A 1370) based on the depth map, the depth map accuracy, predicted UAV path 1360, and/or other information.

Collision detection component 1225 may be configured to, responsive to detection of one or more moving objects, determine whether the unmanned aerial vehicle moving in the predicted vehicle path may collide with one or more detected moving objects. A collision between the unmanned aerial vehicle and one or more detected moving objects may be determined based on the predicted vehicle path, the predicted moving object path, and/or other information. One or more collisions may be determined at one or more locations and/or at one or more future times. For example, as shown in FIG. 13D, collision detection component 1225 may determine, responsive to detection of moving object 1320, determine that UAV 1300 moving in predicted UAV path 1360 may collide with moving object 1320 (shown as collision B 1375) based on predicted UAV path 1360, predicted moving object path 1365, and/or other information.

Collision avoidance component 1226 may be configured to, responsive to determination of one or more collisions of the unmanned aerial vehicle moving in the predicted vehicle path, change a velocity of the unmanned aerial vehicle to avoid one or more collision. For example, in response to determining one or more collision of UAV 1300 with station object 1310 and/or moving object 1320, collision avoidance component 1226 may change a velocity of UAV 1300.

Figure 13E:
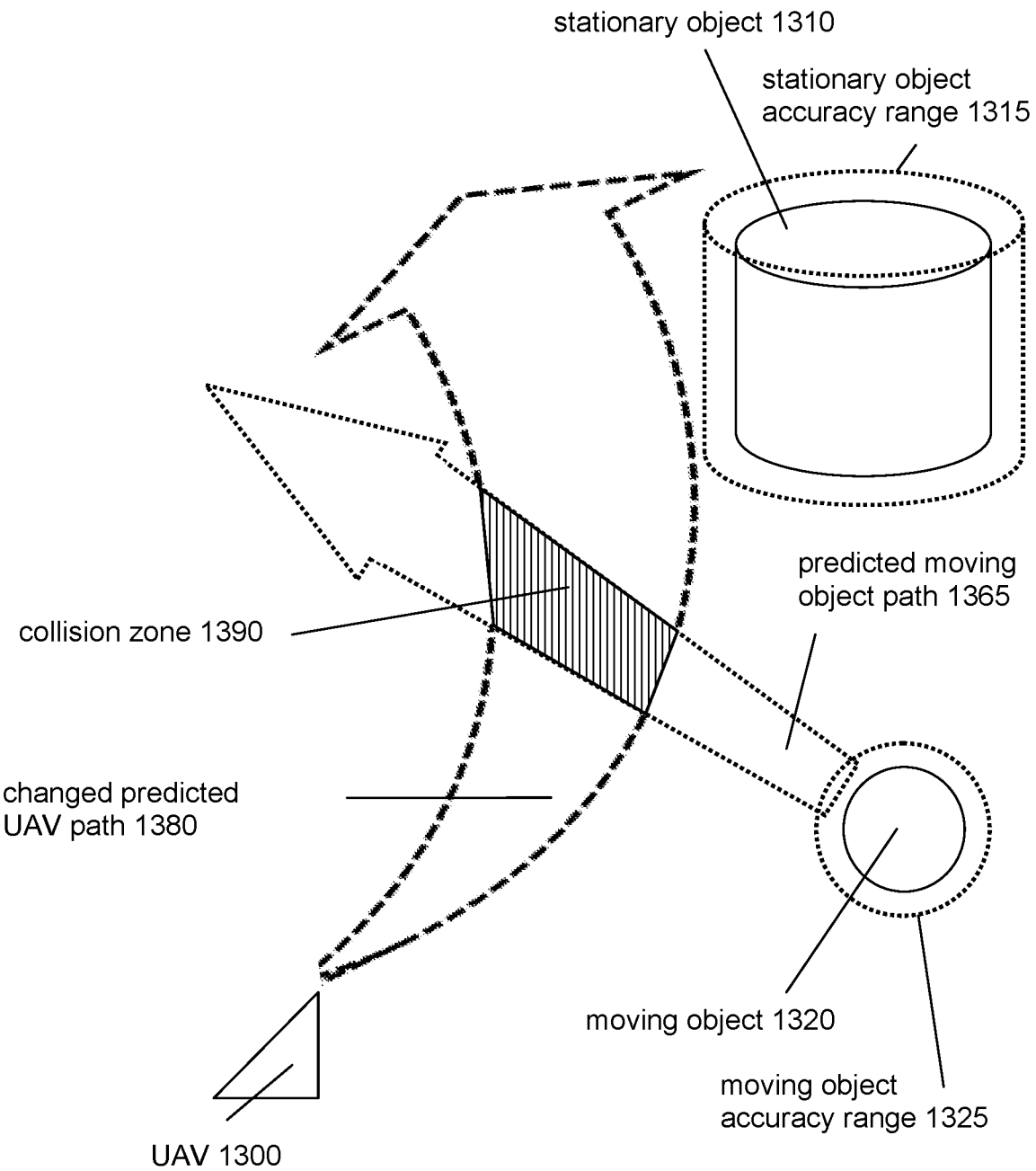

In some implementations, changing the velocity of the unmanned aerial vehicle may include changing one or more speeds of the unmanned aerial vehicle. For example, as shown in FIG. 13D, speed of UAV 1300 may be changed (slowed or increased) so that UAV 1300 passes the point marked as collision B 1375 at different time than moving object 1320. Speed of UAV 1300 may be changed one or more times. For example, the speed of UAV 1300 may be slowed to avoid moving object 1320. Once UAV 1300 has moved past predicted position(s) of moving object 1320, the speed of UAV 1300 may be increased to the original speed or beyond the original speed to make up for the delay caused in avoiding moving object 1320. In some implementations, changing the velocity of the unmanned aerial vehicle may include changing one or more directions of the unmanned aerial vehicle to move the unmanned aerial vehicle in a path that deviates from the predicted vehicle path. For example, as shown in FIG. 13E, the direction of UAV 1300 may be changed so that UAV 1300 does not move through locations encompassed within station object accuracy range 1315. The direction of UAV 1300 may be changed one or more times. For example, the direction of UAV 1300 may be shifted to the left to avoid stationary object 1310. Once UAV 1300 has moved past stationary object accuracy range 1315, the direction of UAV 1300 may be changed to put UAV 1300 back on the original course. In some implementations, changing in velocity of the unmanned aerial vehicle may include use of Dijkstra's algorithm and/or other shortest paths algorithms.

In some implementations, changing the velocity of the unmanned aerial vehicle may include changing one or more speeds of the unmanned aerial vehicle and one or more directions of the unmanned aerial vehicle. For example, the direction of UAV 1300 may be changed so that UAV moves in changed predicted UAV path 1380 (shown in FIG. 13E). Changed predicted UAV path 1380 may include different overlap with predicted moving object path 1365 than predicted UAV path 1360. The overlap between changed predicted UAV path 1380 and predicted moving object path 1365 is shown as collision zone 1390. The speed of UAV 1300 may be changed so that UAV 1300 and moving object 1320 are not within collision zone 1390 (or the same part of collision zone 1390) at the same time.

Figure 15:
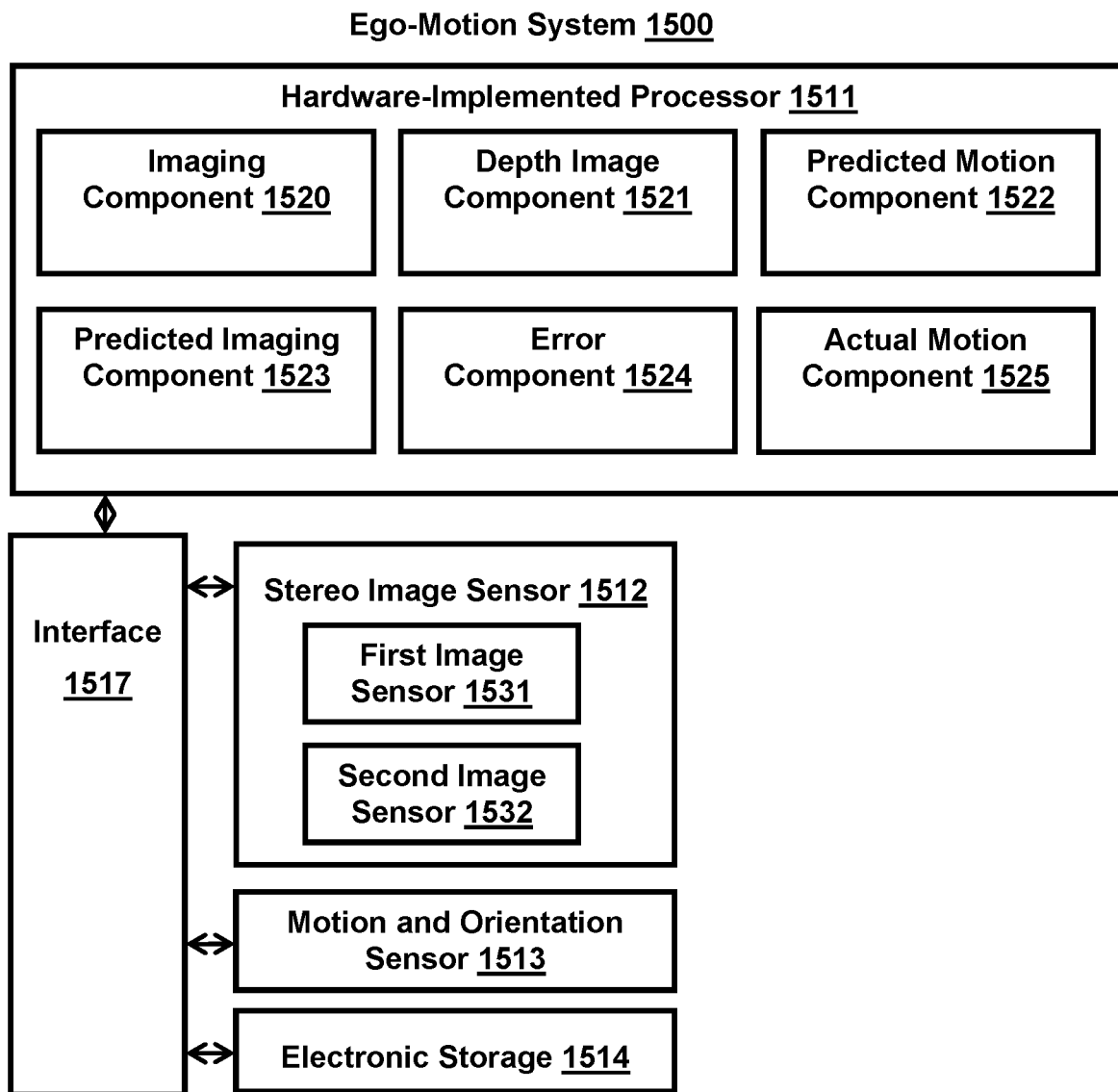
FIG. 15 illustrates a system for estimating an ego-motion.

Referring to FIG. 15, ego-motion system 1500 for estimating an ego-motion may include one or more of hardware-implemented processor 1511, stereo image sensor 1512, motion and orientation sensor 1513, electronic storage 1514, interface 1517, and/or other components. Pairs of stereo images may be obtained at different times using stereo image sensor 1512. A depth image may be determined based on a comparison of an earlier obtained pair of stereo images. A predicted motion of stereo image sensor 1512 may be obtained using motion and orientation sensor 1513. A prediction of a pair of stereo images at a later time may be determined using the depth image and the predicted motion of stereo image sensor 1512. Error between the pair of predicted stereo images and the later obtained pair of stereo images may be determined. An estimated actual motion of stereo image sensor 1512 may be obtained by adjusting the predicted motion to reduce the error.

Stereo image sensor 1512 may include first image sensor 1531, second image sensor 1532, and/or other components. First image sensor 1531 may be configured to generate first visual output signals. The first visual output signals may convey visual information within a field of view of the first image sensor 1531. Visual information may include one or more of an image, a video, and/or other visual information. First image sensor 1531 may include one or more of a charge-coupled device sensor, an active pixel sensor, a complementary metal-oxide semiconductor sensor, an N-type metal-oxide-semiconductor sensor, and/or other image sensors. Second image sensor 1532 may be configured to generate second visual output signals. The second visual output signals may convey visual information within a field of view of second image sensor 1532. Second image sensor 1532 may include one or more of a charge-coupled device sensor, an active pixel sensor, a complementary metal-oxide semiconductor sensor, an N-type metal-oxide-semiconductor sensor, and/or other image sensors.

Motion and orientation sensor 1513 may be configured to generate motion and orientation output signals. The motion and orientation output signals may convey motion information and orientation information of stereo image sensor 1512. Motion information may include one or more motion information regarding speed of stereo image sensor 1512, distance traveled by stereo image sensor 1512, and/or movement of stereo image sensor 1512, including one or more of moving forward, moving backwards, moving right, moving left, moving up, moving down, other movements, and/or other motion information. Orientation information may include one or more orientation information regarding orientation of stereo image sensor 1512, including one or more of turning right, turning left, rolling right, rolling left, pitching up, pitching down, and/or other orientation information. Motion information and/or orientation information may be processed to obtain motions and/or orientations of stereo image sensor 1512 at particular times and/or locations. Motion and orientation sensor 1513 may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

Electronic storage 1514 may include electronic storage media that electronically stores information. Electronic storage 1514 may store software algorithms, information determined by hardware-implemented processor 1511, information received remotely, and/or other information that enables ego-motion system 1500 to function properly. For example, electronic storage 1514 may store depth information (as discussed elsewhere herein), and/or other information.

Hardware-implemented processor 1511 may be configured to provide information processing capabilities in ego-motion system 1500. Hardware-implemented processor 1511 may include one or more computing/processing devices with one or more algorithms/logics implemented in hardware to perform one or more functions. Algorithms/ logics may be implemented in hardware via machine-readable instructions (e.g., a hardware description language file, a netlist, etc.). As a non-limiting example, hardware-implemented processor 1511 may include one or more of a field-programmable gate array, an application-specific integrated circuit, and/or other hardware-implemented processors. In some implementations, hardware-implemented processor 1511 may include a plurality of processing units. In some implementations, hardware-implemented processor 1511 may be coupled with one or more of RAM, ROM, input/output ports, and/or other peripherals.

Hardware-implemented processor 1511 may be configured by machine-readable instructions to execute one or more function components. The function components may include one or more of imaging component 1520, depth image component 1521, predicted motion component 1522, predicted imaging component 1523, error component 1524, actual motion component 1525, and/or other function components.

Imaging component 1520 may be configured to obtain one or more images and/or other information. One or more images may be determined based on one or more output signals conveying visual information. The images may be determined by one or more of imaging component 1520, stereo image sensor 1512, first image sensor 1531, second image sensor 1532, a computing/processing device coupled to stereo image sensor 1512/first image sensor 1531/second image sensor 1532, and/or other components.

Imaging component 1520 may be configured to obtain a first image, a second image, a third image, a fourth image, and/or other images at same or different times. The first image may be determined based on the first visual output signals such that the first visual output signals used to determine the first image are generated by first image sensor 1531 at a first time. The second image may be determined based on the second visual output signals such that the second visual output signals used to determine the second image are generated by second image sensor 1532 at the first time.

The third image may be determined based on the first visual output signals such that the first visual output signals used to determine the first image are generated by first image sensor 1531 at a second time that is subsequent to the first time. The fourth image may be determined based on the second visual output signals such that the second visual output signals used to determine the second image are generated by second image sensor 1532 at the second time.

Imaging component 1520 may be configured to undistort and rectify one or more images. Imaging component 1520 may be configured to undistort and rectify the first image, the second image, and/or other images. Imaging component 1520 may be configured to undistort and rectify the third image, the fourth image, and/or other images. Images may be undistorted and rectified based on a relative position and orientation of first image sensor 1531 and second image sensor 1532.

Figure 16A:
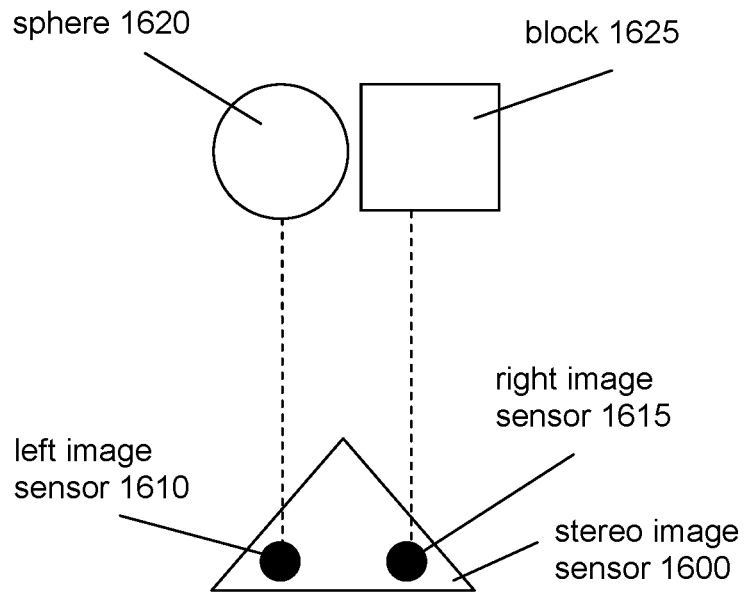
FIG. 16A illustrates a top-down view of an arrangement of a stereo image sensor, a sphere, and a block at time t.
Figure 16B:
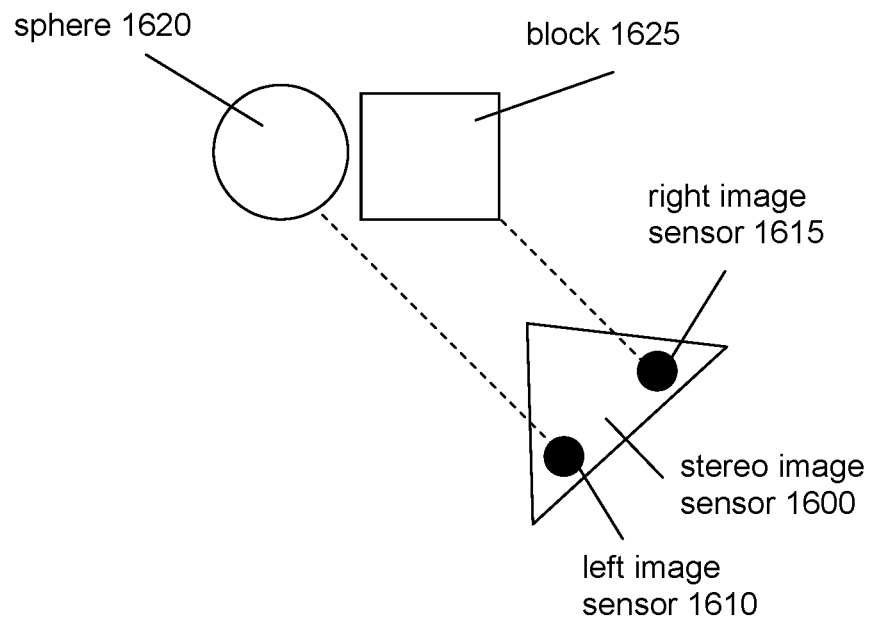
FIG. 16B illustrates a top-down view of an arrangement of a stereo image sensor, a sphere, and a block at time t+1.

For example, FIG. 16A illustrates a top-down view of an arrangement of stereo image sensor 1600, sphere 1620, and block 1625 at time t. FIG. 16B illustrates a top-down view of an arrangement of stereo image sensor 1600, sphere 1620, and block 1625 at time t+1 (subsequent to time t). Dashed lines in FIGS. 16A-16B extending out from left image sensor 1610 and right image sensor 1615 may indicate the middle of fields of view of left image sensor 1610 and right image sensor 1615. Between time t and time t+1, stereo image sensor 1600 may have moved to the right and rotated to the left, while sphere 1620 and block 1625 may have remained stationary.

Imaging component 1520 may obtain images shown in FIGS. 17A-17D. Left image at t 1710 (shown in FIG. 17A) may be determined based on visual output signals conveying visual information generated by left image sensor 1610 at time t. Right image at t 1715 (shown in FIG. 17B) may be determined based on visual output signals conveying visual information generated by right image sensor 1615 at time t. Left image at t+1 1720 (shown in FIG. 17C) may be determined based on visual output signals conveying visual information generated by left image sensor 1610 at time t+1. Right image at t+1 1725 (shown in FIG. 17D) may be determined based on visual output signals conveying visual information generated by right image sensor 1615 at time t+1. Dashed lines in FIGS. 17A-17D may indicate the middle of fields of view of left image sensor 1610 and right image sensor 1615.

Depth image component 1521 may be configured to determine one or more depth images based on one or more comparisons of images. For example, depth image component 1521 may determine a depth image based on a comparison of left image at t 1710 and right image at t 1715. A depth image may include pixel values characterizing distances between stereo image sensor 1600 and objects within the compared images (e.g., left image at t 1710 and right image at t 1715, etc.). For example, FIG. 18 illustrates an exemplary depth image at time t 1800. Depth image at time t 1800 may be determined by depth image component 1521 based on a comparison of left image at t 1710 and right image at t 1715. Depth image at time t 1800 may include pixel values characterizing distances between stereo image sensor 1600 and sphere 1620, and pixel values characterizing distances between stereo image sensor 1600 and block 1625.

Depth images may be determined at a rate different from an image acquisition rate of stereo image sensor 1600. For example, depth image component 1521 may determine depth images when the state-estimation framework generates a new keyframe. In some implementations, ego-motion system 1500 may use the state-estimation framework described in U.S. Provisional Patent Application No. 62/203,765, entitled "SYSTEM AND METHOD FOR VISUAL INSPECTION USING AERIAL ROBOTS," filed on Aug. 11, 2015, the foregoing being incorporated herein by reference in its entirety. A new keyframe may be generated when motion of stereo image sensor 1600 exceeds a certain threshold (e.g., threshold translational motion, etc.). Such determination of depth images may allow for consistent mapping of the environment while avoiding continuous re-estimation of depth of previously seen scenes.

In some implementations, one or more depth images may be determined using one or more parallel algorithms and/or other algorithms. A parallel algorithm may assess the depth on a per pixel level and individual threads may run per pixel. In some implementations, one or more depth images may be determined using one or more block matching algorithms and/or other algorithms. In some implementations, one or more depth images may be determined using one or more semi-global block matching algorithms and/or other algorithms.

Figure 16C:
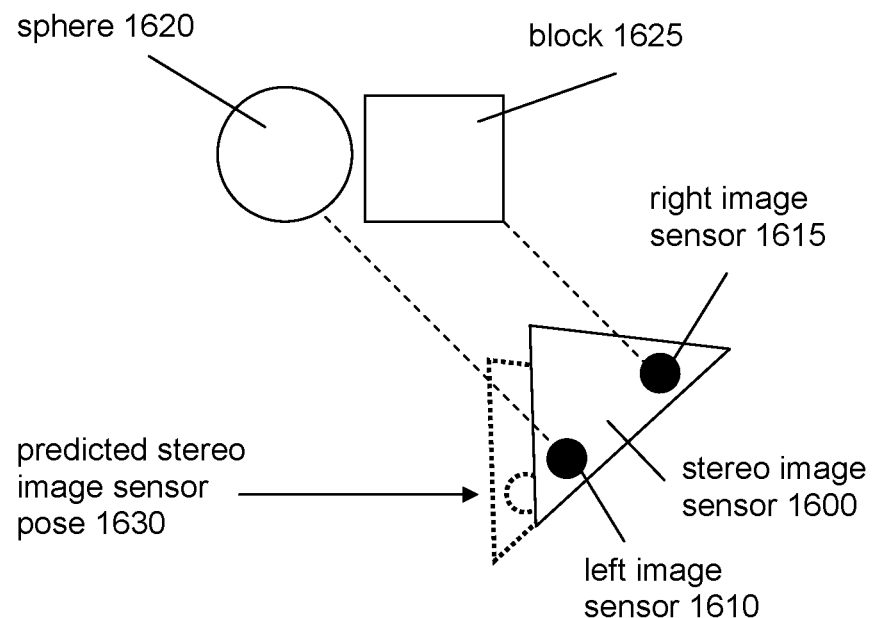
FIG. 16C illustrates a predicted pose of a stereo image sensor.
Figure 17A:
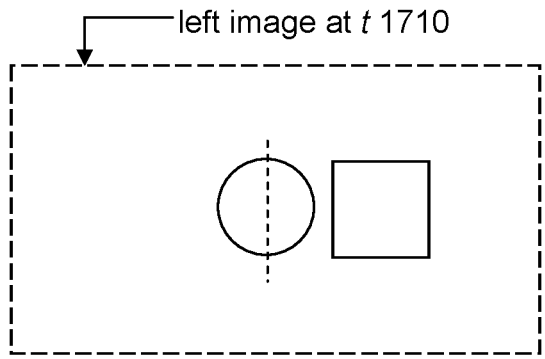
FIG. 17A-17B illustrate exemplary images at time t.
Figure 17B:
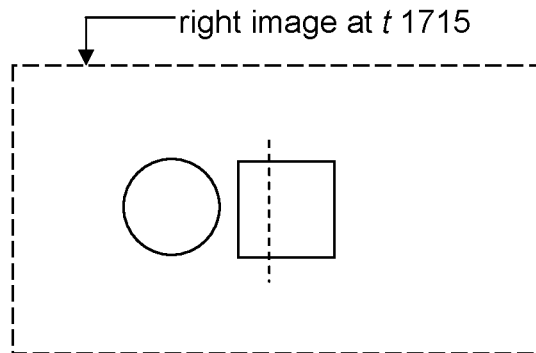
Figure 17C:
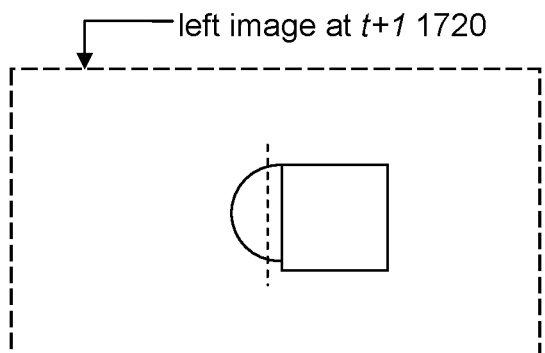
FIGS. 17C-17D illustrate exemplary images at time t+1.
Figure 17D:
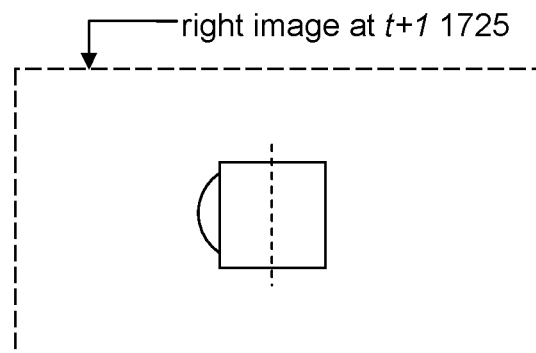

Predicted motion component 1522 may be configured to obtain one or more predicted motion of stereo image sensor 1512 between different times. Predicted motion component 1522 may estimate the motion of stereo image sensor 1512 between different times. For example, predicted motion component 1522 may be configured to obtain a predicted motion of stereo image sensor 1512 between time t and time t+1. Prediction motion of stereo image sensor 1512 between time t and time t+1 may be used to determine a predicted pose of stereo image sensor 1512 at time t+1. For example, FIG. 16C illustrates an exemplary predicted pose of stereo image sensor 1600. Based on predicted motion of stereo image sensor 1600 between t and time t+1, predicted stereo image sensor pose 1630 may be determined. Predicted stereo image sensor pose 1630 may be determined by moving the pose of stereo image sensor 1600 at time t (as shown in FIG. 16A) to account for the predicted motion. Predicted pose may be offset from actual pose. For example, in FIG. 16C, predicted stereo image sensor pose 1630 may be located below and to the left (as seen from a top-down view) of actual pose of stereo image sensor 1600.

The predicted motion of stereo image sensor 1512 may be determined based on the motion and orientation output signals generated by motion and orientation sensor 1513. The motion and orientation output signals may convey motion information and orientation information of stereo image sensor 1512. In some implementations, the predicted motion may be determined based on visual odometry. In some implementations, predicted motion may be determined by a companion processor (e.g., a software-implemented processor, etc.), and/or other components. A companion processor may be located local to hardware-implemented processor 1511 or located remotely from hardware-implemented processor 1511. Predicted motion component 1522 may obtain predicted motion from the companion processor.

Predicted imaging component 1523 may be configured to determine one or more predicted images. Predicted images may estimate how a scene may appear from one or more image sensors based on motion of image sensors between different times (e.g., estimated views of a scene from a predicted pose, etc.). For example, one or more predicted images may be determined based on one or more predicted motion of stereo image sensor 1512 between time t and time t+1, one or more depth images, and/or other information. For example, predicted imaging component 1523 may determine predicted left image at t+1 1920 (shown in FIG. 19A) by adjusting left image at t 1710 based on the predicted motion, depth image at t 1800, and/or other information. Predicted left image at t+1 1920 may show a scene of sphere 1620 and block 1625 as would be observed by left image sensor 1610 from predicted stereo image sensor pose 1630. Predicted imaging component 1523 may determine predicted right image at t+1 1925 (shown in FIG. 19B) by adjusting right image at t 1715 based on the predicted motion, depth image 1800, and/or other information. Predicted right image at t+1 1925 may show a scene of sphere 1620 and block 1625 as would be observed by right image sensor 1615 from predicted stereo image sensor pose 1630.

Error component 1524 may be configured to determine one or more error distributions of one or more predicted motion by comparing one or more captured images with one or more predicted images. Error component 1524 may determine one or more differences between captured images determined at a certain time and predicted images determined for the certain time. For example, error component 1524 may determine one or more differences between images captured by stereo image sensor 1600 at time t+1 and images predicted for time t+1 by predicted imaging component 1523. For example, error component 1524 may determine an error distribution of the predicted motion of stereo image sensor 1512 between time t and time t+1 by comparing left image at t+1 1720 with predicted left image at t+1 1920 and right image at t+1 1725 with predicted right image at t+1 1925.

Actual motion component 1525 may be configured to obtain one or more estimated actual motion of stereo image sensor 1512 between different times. For example, actual motion component 1525 may be configured to obtain an estimated actual motion of stereo image sensor 1512 between time t and time t+1. The estimated actual motion may be determined by adjusting the predicted motion to reduce the error distribution of the predicted motion. For example, for individual pixels, error may be computed between the predicted and measured intensities. The predicted motion may be adjusted to minimize the intensity errors between a predicted image (e.g., predicted left image at t+1 1920, etc.) and a captured image (e.g., left image at t+1 1720, etc.). Minimizing the intensities errors may shift the predicted stereo image sensor location 1630 closer to the actual pose of stereo image sensor 1600.

In some implementations, the predicted motion may be adjusted based on one or more absolute error thresholds and/or other information. For example, the predicted motion may be adjusted until the error distribution (or a majority/certain percentage of the error distribution) of the predicted motion is below a certain error threshold. In some implementations, the predicted motion may be adjusted based on one or more relative error thresholds and/or other information. For example, the predicted motion may be adjusted until the change in error distribution (or a change in majority/certain percentage of the error distribution) is below a certain error threshold.

In some implementations, the adjustment of the predicted motion may be performed over a fixed number of image key frames. Image key frames may be arbitrarily spaced in time and may be related to each over by error terms. Such an approach may avoid pose drift during location motions (such as hovering by an unmanned aerial vehicle carrying image sensors) while tracking dynamic motions.

In some implementations, the estimated actual motion of stereo image sensor 1512 between time t and time t+1 may include an estimated position of stereo image sensor 1512 at time t+1, an estimated orientation of stereo image sensor 1512 at time t+1, an estimated velocity of stereo image sensor 1512 at time t+1, and/or other estimated actual motion of stereo image sensor 1512.

In some implementations, the estimated actual motion of stereo image sensor 1512 between time t and time t+1 may be used to estimate one or more of an estimated gravity-aligned position of stereo image sensor 1512 at time t+1, an estimated gravity-aligned orientation of stereo image sensor 1512 at time t+1, an estimated gravity-aligned velocity of stereo image sensor 1512 at time t+1, and/or other estimated gravity-aligned motion of stereo image sensor 1512. Estimated gravity-aligned motion of stereo image sensor 1512 may be estimated using an Extended Kalman filter. The Extended Kalman filter may run on a soft-core of hardware-implemented processor 1511 or a companion processor (e.g., a software-implemented processor, etc.).

A depth image may be transformed into a three-dimensional point-cloud. A statistical voxel map, an Octomap, a spherical depth map, and/or other depth map framework may be used. In some implementations, a depth image may be converted into a three-dimensional point-cloud as described in U.S. Provisional Patent Application No. 62/203,765, entitled "SYSTEM AND METHOD FOR VISUAL INSPECTION USING AERIAL ROBOTS," filed on Aug. 11, 2015, incorporated supra.

Based on the estimated actual motion of stereo image sensor 1512, obstacle avoidance and/or trajectory planning may be provided for stereo image sensor 1512 (and/or objects carrying stereo image sensor 1512, such as an unmanned aerial vehicle). In some implementations, obstacle avoidance and/or trajectory planning may be provided using potential field algorithm, algorithms discussed herein, and/or other algorithms. In some implementations obstacle, avoidance and/or trajectory planning may be provided as described in U.S. Provisional Patent Application No. 62/203,765, entitled "SYSTEM AND METHOD FOR VISUAL INSPECTION USING AERIAL ROBOTS," filed on Aug. 11, 2015, incorporated supra.

Figure 21:
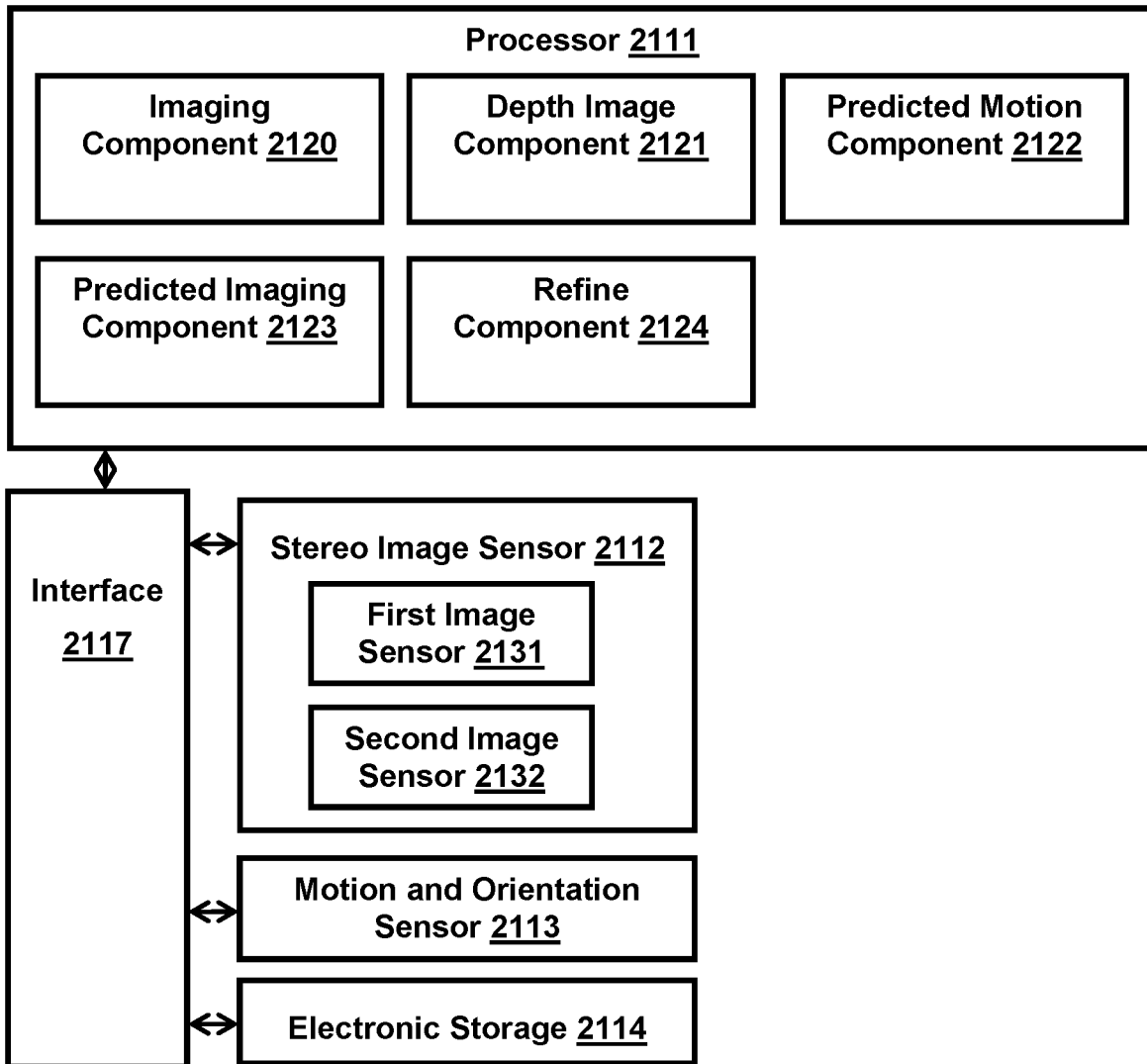
FIG. 21 illustrates a system for refining a depth image.

Referring to FIG. 21, depth refining system 2100 for refining a depth image may include one or more of processor 2111, stereo image sensor 2112, electronic storage 2114, interface 2117, and/or other components. In some implementations, the system may include one or more of motion and orientation sensor 2113. Images may be obtained at different times using stereo image sensor 2112. A depth image may be determined based on a comparison of an earlier obtained pair of stereo images. The depth image may be used to predict one of the earlier obtained pair of stereo images. The depth image may be refined based on a comparison of the earlier obtained stereo image and the prediction of the stereo image at the earlier time. A predicted motion of stereo image sensor 2112 may be determined. A prediction of a stereo image at a later time may be determined using the depth image and the predicted motion of stereo image sensor 2112. The depth image may be refined based on a comparison of the later obtained stereo image and the prediction of the stereo image at the later time.

Stereo image sensor 2112 may include first image sensor 2131, second image sensor 2132, and/or other components. First image sensor 2131 may be configured to generate first visual output signals. The first visual output signals may convey visual information within a field of view of first image sensor 2131. Visual information may include one or more of an image, a video, and/or other visual information. First image sensor 2131 may include one or more of a charge-coupled device sensor, an active pixel sensor, a complementary metal-oxide semiconductor sensor, an N-type metal-oxide-semiconductor sensor, and/or other image sensors. Second image sensor 2132 may be configured to generate second visual output signals. The second visual output signals may convey visual information within a field of view of second image sensor 2132. Second image sensor 2132 may include one or more of a charge-coupled device sensor, an active pixel sensor, a complementary metal-oxide semiconductor sensor, an N-type metal-oxide-semiconductor sensor, and/or other image sensors.

Motion and orientation sensor 2113 may be configured to generate motion and orientation output signals. The motion and orientation output signals may convey motion information and orientation information of stereo image sensor 2112. Motion information may include one or more motion information regarding speed of stereo image sensor 2112, distance traveled by stereo image sensor 2112, and/or movement of stereo image sensor 2112, including one or more of moving forward, moving backwards, moving right, moving left, moving up, moving down, other movements, and/or other motion information. Orientation information may include one or more orientation information regarding orientation of stereo image sensor 2112, including one or more of turning right, turning left, rolling right, rolling left, pitching up, pitching down, and/or other orientation information. Motion information and/or orientation information may be processed to obtain motions and/or orientations of stereo image sensor 2112 at particular times and/or locations. Motion and orientation sensor 2113 may include one or more of an accelerometer, a tilt sensor, an inclination sensor, an angular rate sensor, a gyroscope, an inertial measurement unit, a compass, a magnetometer, a pressure sensor, a barometer, a global positioning system device, a distance sensor, and/or other motion and orientation sensors.

Electronic storage 2114 may include electronic storage media that electronically stores information. Electronic storage 2114 may store software algorithms, information determined by processor 2111, information received remotely, and/or other information that enables depth refining system 2100 to function properly. For example, electronic storage 2114 may store information relating to depth image (as discussed elsewhere herein), and/or other information.

Processor 2111 may be configured to provide information processing capabilities in depth refining system 2100. As such, processor 2111 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. By way of non-limiting example, a microcontroller may include one or more of 8051, PIC, AVR, ARM microcontroller, and/or other microcontrollers. In some implementations, processor 2111 may include a plurality of processing units. In some implementations, processor 2111 may be coupled with one or more of RAM, ROM, input/output ports, and/or other peripherals.

The Processor 2111 may be configured by machine-readable instructions to execute one or more computer program components. The computer program components may include one or more of imaging component 2120, depth image component 2121, predicted motion component 2122, predicted imaging component 2123, refine component 2124, and/or other computer program components. In some implementations, processor 2111 may include one or more of a hardware-implemented processor, a software-implemented processor, and/or other processors. In some implementations, one or more hardware-implemented processors may be located remotely from one or more software-implemented processors.

Imaging component 2120 may be configured to obtain one or more images and/or other information. One or more images may be determined based on one or more output signals conveying visual information. The images may be determined by one or more of imaging component 2120, stereo image sensor 2112, first image sensor 2131, second image sensor 2132, a computing/processing device coupled to stereo image sensor 2112/first image sensor 2131/second image sensor 2132, and/or other components.

Imaging component 2120 may be configured to obtain a first image, a second image, a third image, a fourth image, and/or other images. The first image may be determined based on the first visual output signals such that the first visual output signals used to determine the first image are generated by first image sensor 2131 at a first time. The second image may be determined based on the second visual output signals such that the second visual output signals used to determine the second image are generated by second image sensor 2132 at the first time.

The third image may be determined based on the first visual output signals such that the first visual output signals used to determine the first image are generated by first image sensor 2131 at a second time that is subsequent to the first time. The fourth image may be determined based on the second visual output signals such that the second visual output signals used to determine the second image are generated by second image sensor 2132 at the second time.

Imaging component 2120 may be configured to undistort and rectify one or more images. Imaging component 2120 may be configured to undistort and rectify the first image, the second image, and/or other images. Imaging component 2120 may be configured to undistort and rectify the third image, and/or other images. The imaging component may be configured to undistort and rectify the fourth image, and/or other images. Images may be undistorted and rectified based on a relative position and orientation of first image sensor 2131 and second image sensor 2132.

For example, first image sensor 2131 and second image sensor 2132 may be used to obtain left image at t 1710, right image at t 1715, left image at t+1 1720, right image at t+1 1725 (shown in FIGS. 17A-17D) based on poses of stereo image sensor 2112 at time t and at time t+1. Poses of stereo image sensor 2112 time t and time t+1 may be the same or similar to poses of stereo image sensor 1600 shown in FIGS. 16A-16B.

The depth image component 2121 may be configured to determine one or more depth images based on one or more comparisons of images. For example, depth image component 2121 may determine depth image at t 2200 (shown in FIG. 22A) based on a comparison of left image at t 1710 and right image at t 1715. Depth image at t 2200 image may include pixel values characterizing distances between stereo image sensor 2112 and objects within the compared images (e.g., left image at t 1710 and right image at t 1715, etc.). In some implementations, depth image component 2121 may determine depth image at t+1 2205 (shown in FIG. 22B) based on a comparison of left image at t+1 1720 and right image at t+1 1725. Depth image at t+1 may include pixel values characterizing distances between stereo image sensor 2112 and objects within the compared images.

Predicted motion component 2122 may be configured to obtain one or more predicted motion of stereo image sensor 2112 between different times. Predicted motion component 2122 may estimate the motion of stereo image sensor 2112 between different times. For example, predicted motion component 2122 may be configured to obtain a predicted motion of stereo image sensor 2112 between time t and time t+1. Predicted motion of stereo image sensor 2112 between time t and time t+1 may be used to determine a predicted pose of stereo image sensor 2112 at time t+1. In some implementations, the predicted motion of stereo image sensor 2112 may be determined based on the motion and orientation output signals generated by motion and orientation sensor 2113. The motion and orientation output signals may convey motion information and orientation information of stereo image sensor 2112. In some implementations, the predicted motion may be determined based on visual odometry. In some implementations, the predicted motion may include estimated actual motion described above.

Predicted imaging component 2123 may be configured to determine one or more predicted images. Predicted images may estimate how a scene may appear from one or more image sensors from a particular/predicted pose. For example, one or more predicted images may be determined based on one or more of predicted motion of stereo image sensor 2112, depth images, and/or other information. For example, predicted imaging component 2123 may determine predicted right image at t 2320 (shown in FIG. 23A) by adjusting left image at t 1710 based on depth image at t 2200, and/or other information. Given left image at t 1720 and depth image at t 2200, predicted imaging component 2123 may predict how the scene may appear to second image sensor 2132 at time t.

Predicted imaging component 2123 may determine predicted left image at t+1 2325 by adjusting left image at t 1710 based on the predicted motion, the depth image at t 2200, and/or other information. Given left image at t 1720, depth image at t 2200, and prediction motion, predicted imaging component 2123 may predict how the scene may appear to first image sensor 2131 at time t+1. In some implementations, predicted left image at t+1 2325 may be determined using an inverse compositional warping approach as described in U.S. Provisional Patent Application No. 62/203,745, entitled "SYSTEM AND METHOD FOR MOBILE ROBOT NAVIGATION," filed on Aug. 11, 2015, the foregoing being incorporated herein by reference in its entirety.

Figure 24:
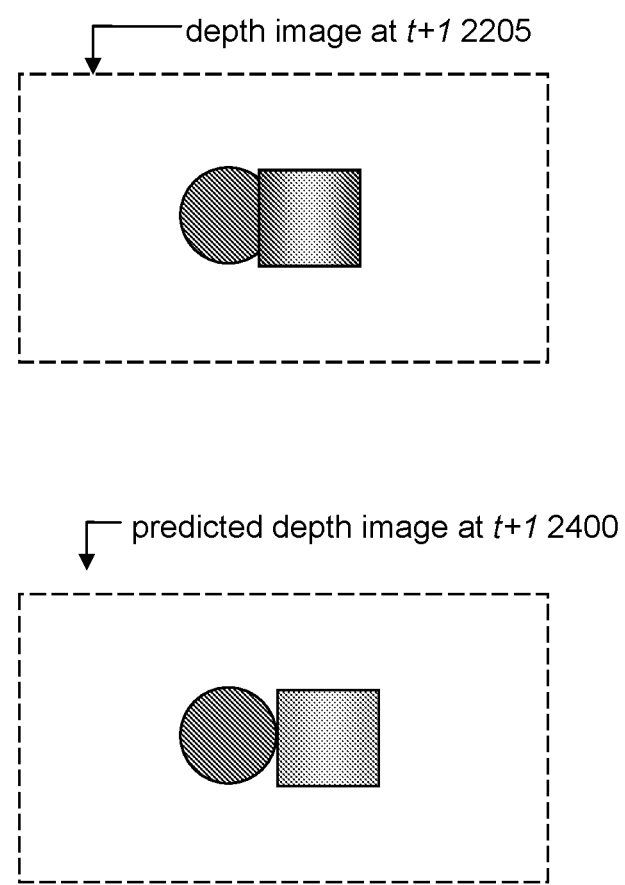
FIG. 24 illustrate exemplary depth image and predicted depth image.

In some implementations, predicted imaging component 2123 determine predicted depth image at t+1 2400 (shown in FIG. 24) by adjusting depth image at t 2200 based on the predicted motion and/or other information. Given depth image at t 2200 and the predicted motion, predicted imaging component 2123 may predict how the depth image may appear at time t+1.

Refine component 2124 may be configured to refine one or more depth images based on one or more comparisons of images with predicted images. Refine component 2124 may keep depth values of depth images that generate a good prediction of images and remove depth values of depth images that do not generate a good prediction of images. For example, refine component 2124 may be configured to refine depth image at t 2200 based on a comparison of right image at t 2310 (obtained using second image sensor 2132) and predicted right image at t 2320 (obtained by adjusting left image at t 1710 using depth image at t 2200). In some implementations, refining depth image at t 2200 based on the comparison of right image at t 2310 with predicted right image at t 2320 may include determining one or more mismatches between an image patch in right image at t 2310 with a corresponding image patch in predicted right image at t 2320. Responsive to the mismatch(es) meeting and/or exceeding an error threshold, one or more pixel value of depth image at t 2200 corresponding to the image patch may be rejected.

Refine component 2124 may be configured to refine depth image at t 2200 based on a comparison of left image at t+1 2315 (obtained using first image sensor 2131) with predicted left image at t+1 2325 (obtained by adjusting left image at t 1710 using depth image at t 2200 and predicted motion). In some implementations, refining depth image at t 2200 based on the comparison of left image at t+1 2315 with predicted left image at t+1 2325 may include determining one or more mismatches between an image patch in left image at t+1 2315 with a corresponding image patch in predicted left image at t+1 2325. Responsive to the mismatch(es) meeting and/or exceeding an error threshold, one or more pixel values of depth image at t 2200 corresponding to the image patch may be rejected.

In some implementations, refine component 2124 may be configured to refine depth image at t+1 2205 based on a comparison of depth image at t+1 2205 with predicted depth image at t+1 2400. In some implementations, refining refine depth image at t+1 2205 based on the comparison of refine depth image at t+1 2205 with predicted depth image at t+1 2400 may include determining one or more mismatches between a pixel value in depth image at t+1 2205 with a corresponding pixel value in predicted depth image at t+1 2400. Responsive to the mismatch(es) meeting and/or exceeding an error threshold, a pixel value of depth image at t+1 2205 corresponding to the mismatch may be rejected. In some implementations, responsive to the mismatch(es) meeting and/or exceeding an error threshold, refine component 2124 may refine depth image at t 2200.

In some implementations, the error threshold may be based on inverse of the distances between stereo image sensor 2112 and the objects. In some implementations, the mismatch between an image patch in an image with the corresponding image patch in a predicted image may be determined based on an error distribution. In some implementations, an image may be compared with a predicted image as described in U.S. Provisional Patent Application No. 62/203,745, entitled "SYSTEM AND METHOD FOR MOBILE ROBOT NAVIGATION," filed on Aug. 11, 2015, incorporated supra.

While the present disclosure may be directed to unmanned aerial vehicles, one or more other implementations of the system may be configured for other types vehicles. Other types of vehicles may include a passenger vehicle (e.g., a car, a bike, a boat, an airplane, etc.), a non-passenger vehicle, and/or a remoted controlled vehicle (e.g., remote controlled airplane, remote controlled car, remoted controlled submarine, etc.).

Although all components of vehicle 10 are shown to be located in vehicle 10 in FIG. 1, some or all of the components may be installed in vehicle 10 and/or be otherwise coupled with vehicle 10. In some implementations, hardware-implemented processor 11 may be located remotely from vehicle 10. In some implementations, hardware-implemented processor 11 may be located on or in vehicle 10. In some implementations, image sensor 12 may be located remotely from vehicle 10. In some implementations, image sensor 12 may be located on or in vehicle 10.

Although components are shown to be connected to interface (17, 1217, 1517, 2127) in FIGS. 1, 12, 15, and 21, any communication medium may be used to facilitate interaction between any components depicted in FIGS. 1, 12, 15, and 21. One or more components may communicate with each other through hard-wired communication, wireless communication, or both. By way of non-limiting example, wireless communication may include one or more of radio communication, Bluetooth communication, Wi-Fi communication, cellular communication, infrared communication, or other wireless communication.

Although hardware-implemented processor (11, 1511) and processor (1211, 2111) are shown in FIGS. 1, 12, 15, and 21 as a single entity, this is for illustrative purposes only. In some implementations, hardware-implemented processor/processor may comprise a plurality of processing units. These processing units may be physically located within the same device. Hardware-implemented processor/processor may represent processing functionality of a plurality of devices operating in coordination.

It should be appreciated that although various components (computer program components, function components) are illustrated in FIGS. 1, 12, 15, and 21 as being co-located within a single processing unit, in implementations in which the hardware-implemented processor/processor comprises multiple processing units, one or more of the components may be located remotely from the other components.

The description of the functionality provided by the different computer program/function components described herein is for illustrative purposes, and is not intended to be limiting, as any of computer program/function components may provide more or less functionality than is described. For example, one or more of computer program/function components may be eliminated, and some or all of its functionality may be provided by other computer program/function components. As another example, one or more additional computer program/function components that may perform some or all of the functionality attributed to one or more of computer program/function components.

Although image sensor 12, stereo image sensor (812, 1212, 1512, 2112), first image sensor (831, 1231, 1531, 2131), second image sensor (832, 1232, 1532, 2132) are depicted in FIGS. 1, 12, 15, and 21 as a single element, this is not intended to be limiting. Image sensor/stereo image sensor may include one or more image sensors in one or more locations.

Although motion and orientation sensors (13, 1213, 1513, 2113) are depicted in FIGS. 1, 12, 15, and 21 as a single element, this is not intended to be limiting. Motion and orientation sensor may include one or more motion and orientation sensors in one or more locations.

The electronic storage media of electronic storage (14, 1214, 1514, 2114) may be provided integrally (i.e., substantially non-removable) with one or more components and/or removable storage that is connectable to one or more components via, for example, a port (e.g., a USB port, a Firewire port, etc.) or a drive (e.g., a disk drive, etc.). Electronic storage (14, 1214, 1514, 2114) may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage (14, 1214, 1514, 2114) may be a separate component or may be provided integrally with one or more other components shown in FIGS. 1, 12, 15, and 21 (e.g., hardware-implemented processor 11). Although electronic storage (14, 1214, 1514, 2114) is shown in FIGS. 1, 12, 15, and 21 as a single entity, this is for illustrative purposes only. In some implementations, electronic storage (14, 1214, 1514, 2114) may comprise a plurality of storage units. These storage units may be physically located within the same device, or electronic storage (14, 1214, 1514, 2114) may represent storage functionality of a plurality of devices operating in coordination.

Figure 7:
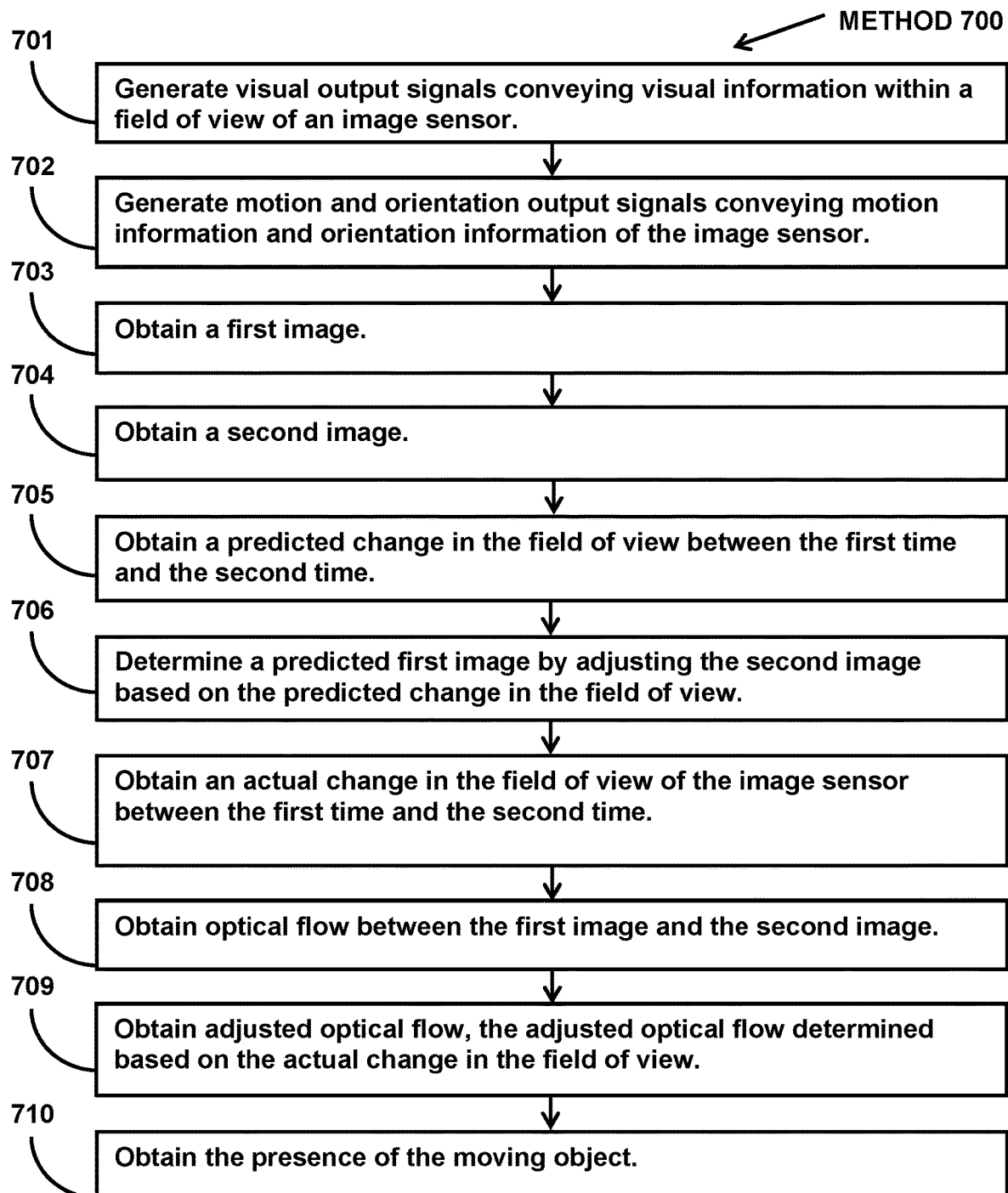
FIG. 7 illustrates a method to detect a moving object using adjusted optical flow.

FIG. 7 illustrates method 700 for detecting a moving object using adjusted optical flow. The operations of method 700 presented below are intended to be illustrative. In some implementations, method 700 may be accomplished with one or more additional operations not described, and/or without one or more of the operations discussed. In some implementations, two or more of the operations may occur substantially simultaneously.

Referring to FIG. 7 and method 700, at operation 701, visual output signals conveying visual information within a field of view of an image sensor may be generated. Visual information may include one or more of an image, a video, and/or other visual information. In some implementations, operation 701 may be performed by one or more sensors the same as or similar to image sensor 12 (shown in FIG. 1 and described herein).

At operation 702, motion and orientation output signals conveying motion information and orientation information of the image sensor may be generated. Motion information may include one or more motion information regarding speed of the image sensor, distance traveled by the image sensor, and/or movement of the image sensor, including one or more of moving forward, moving backwards, moving right, moving left, moving up, moving down, and/or other movement, and/or other motion information. Orientation information may include one or more orientation information regarding orientation of the image sensor, including one or more of turning right, turning left, rolling right, rolling left, pitching up, pitching down, and/or other orientation information. In some implementations, operation 702 may be performed by one or more sensors the same as or similar to motion and orientation senor 13 (shown in FIG. 1 and described herein).

At operation 703, a first image based on the visual output signals may be obtained. The visual output signals used to determine the first image may be generated by the image sensor at a first time. In some implementations, operation 703 may be performed by a processor component the same as or similar to imaging component 20 (shown in FIG. 1 and described herein).

At operation 704, a second image based on the visual output signals may be obtained. The visual output signals used to determine the second image may be generated by the image sensor at a second time. The second time may be subsequent to the first time. In some implementations, operation 704 may be performed by a processor component the same as or similar to imaging component 20 (shown in FIG. 1 and described herein).

At operation 705, a predicted change in the field of view of the image sensor between the first time and the second time may be obtained. In some implementations, operation 705 may be performed by a processor component the same as or similar to predicted change component 21 (shown in FIG. 1 and described herein).

At operation 706, a predicted first image may be determined by adjusting the second image based on the predicted change in the field of view of the image sensor. In some implementations, operation 706 may be performed by a processor component the same as or similar to predicted imaging component 22 (shown in FIG. 1 and described herein).

At operation 707, an actual change in the field of view of the image sensor between the first time and the second time may be obtained. The actual change in the field of view of the image sensor between the first time and the second time may be determined based on a comparison of the first image with the predicted first image. In some implementations, operation 707 may be performed by a processor component the same as or similar to actual change component 23 (shown in FIG. 1 and described herein).

At operation 708, optical flow between the first image and the second image may be obtained. In some implementations, operation 708 may be performed by a processor component the same as or similar to optical flow component 24 (shown in FIG. 1 and described herein).

At operation 709, an adjusted optical flow may be obtained. The adjusted optical flow may be determined by adjusting the optical flow based on the actual change in the field of view of the image sensor. In some implementations, operation 709 may be performed by a processor component the same as or similar to optical flow adjustment component 25 (shown in FIG. 1 and described herein).

At operation 710, the presence of the moving object may be obtained. The presence of the moving object may be detected based on the adjusted optical flow. In some implementations, operation 710 may be performed by a processor component the same as or similar to detection component 26 (shown in FIG. 1 and described herein).

Figure 11:
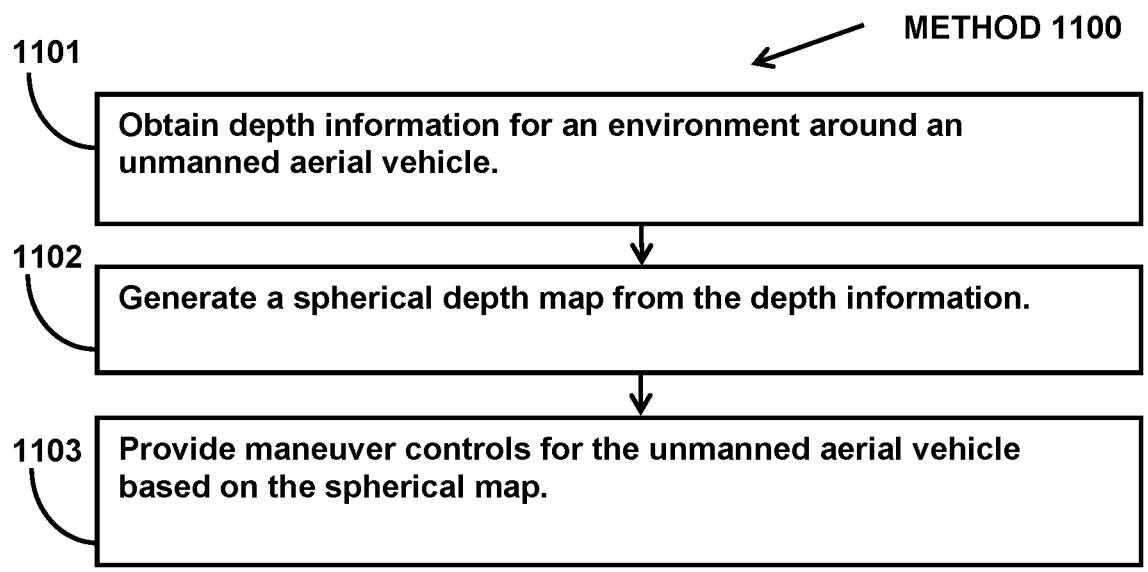
FIG. 11 illustrates a method for collision avoidance of an unmanned aerial vehicle using a spherical depth map.

FIG. 11 illustrates method 1100 for collision avoidance of an unmanned aerial vehicle. The operations of method 1100 presented below are intended to be illustrative. In some implementations, method 1100 may be accomplished with one or more additional operations not described, and/or without one or more of the operations discussed. In some implementations, two or more of the operations may occur substantially simultaneously.

Referring to FIG. 11 and method 1100, at operation 1101, depth information for an environment around an unmanned aerial vehicle may be obtained. The depth information may characterize one or more distances between the unmanned aerial vehicle and the environment around the unmanned aerial vehicle. In some implementations, operation 1101 may be performed by a processor component the same as or similar to depth information component 820 (shown in FIG. 8 and described herein).

At operation 1102, a spherical depth map may be generated from the depth information. The spherical depth map may represent distances to closest surfaces of the environment around the unmanned aerial vehicle as a function of longitude angles and latitude angles. In some implementations, operation 1102 may be performed by a processor component the same as or similar to spherical depth map component 821 (shown in FIG. 8 and described herein).

At operation 1103, maneuver controls for the unmanned aerial vehicle may be provided based on the spherical map. The maneuver controls for the unmanned aerial vehicle may include controlling the unmanned aerial vehicle to avoid one or more objects in the environment around the unmanned aerial vehicle. In some implementations, operation 1103 may be performed by a processor component the same as or similar to maneuver controls component 821 (shown in FIG. 8 and described herein).

Figure 14:
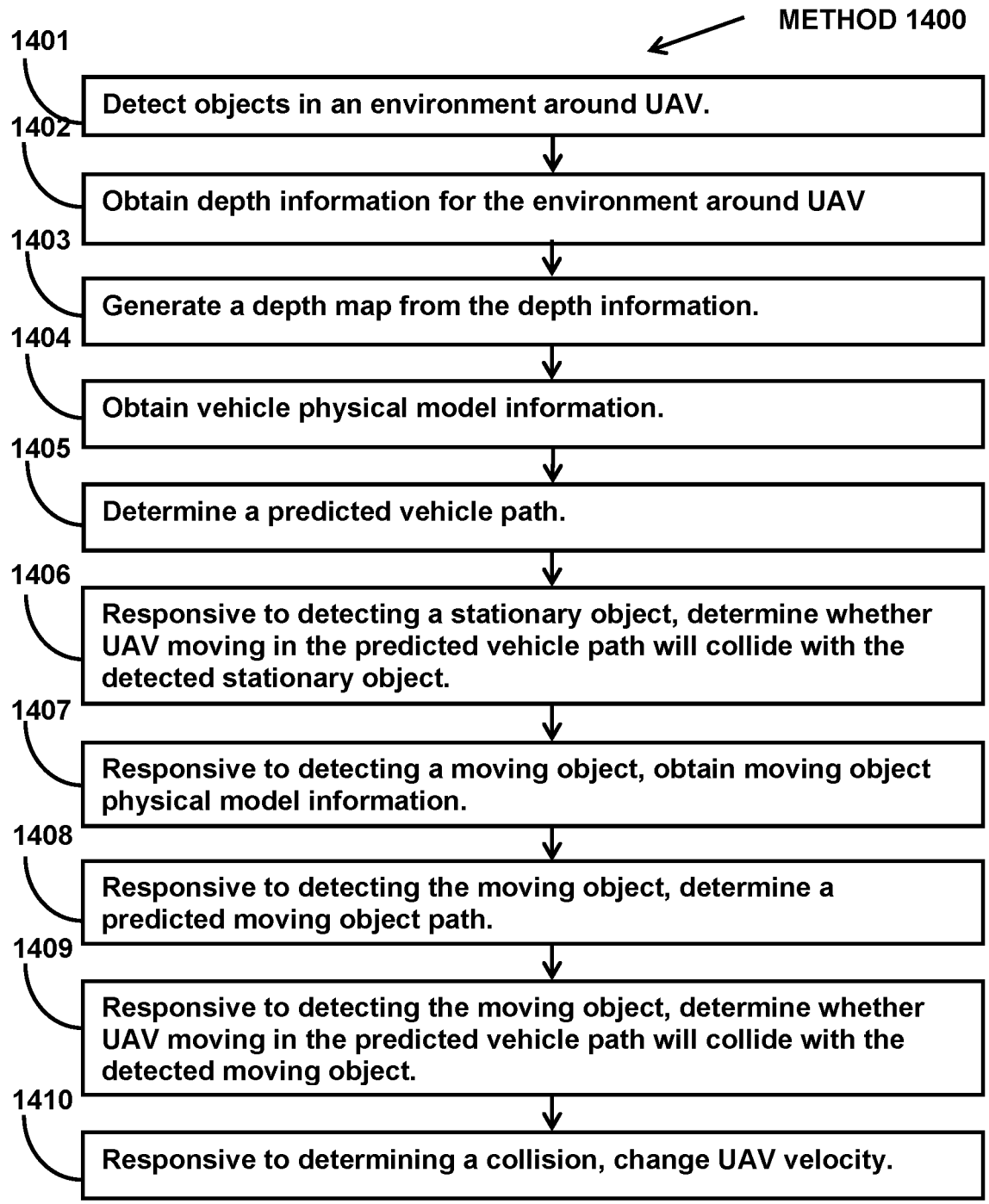
FIG. 14 illustrates a method for collision avoidance of an unmanned aerial vehicle using a predicted vehicle path.

FIG. 14 illustrates method 1400 for collision avoidance of an unmanned aerial vehicle. The operations of method 1400 presented below are intended to be illustrative. In some implementations, method 1400 may be accomplished with one or more additional operations not described, and/or without one or more of the operations discussed. In some implementations, two or more of the operations may occur substantially simultaneously.

Referring to FIG. 14 and method 1400, at operation 1401, objects in an environment around an unmanned aerial vehicle may be detected. The objects may include one or more stationary object and/or one or more moving objects. In some implementations, operation 1401 may be performed by a processor component the same as or similar to object detection component 1220.

At operation 1402, depth information for the environment around the unmanned aerial vehicle may be obtained. The depth information may characterize one or more distances between the unmanned aerial vehicle and the environment around the unmanned aerial vehicle.

The environment around the unmanned aerial vehicle may include one or more detected stationary objects and/or one or more detected moving objects. In some implementations, operation 1402 may be performed by a processor component the same as or similar to depth information component 1221 (shown in FIG. 12 and described herein).

At operation 1403, a depth map may be generated from the depth information. The depth map may characterize distances between the unmanned aerial vehicle and one or more detected stationary objects and/or one or more detected moving objects. The accuracy of the depth map may be characterized by a depth map accuracy and/or other information. In some implementations, operation 1403 may be performed by a processor component the same as or similar to depth map component 1222 (shown in FIG. 12 and described herein).

At operation 1404, vehicle physical model information may be obtained. The vehicle physical model information may characterize the motion of the unmanned aerial vehicle. The accuracy of the vehicle physical model information may be characterized by a vehicle physical model accuracy and/or other information. In some implementations, operation 1404 may be performed by a processor component the same as or similar to physical model information component 1223 (shown in FIG. 12 and described herein).

At operation 1405, a predicted vehicle path may be determined. The predicted vehicle path may include predicted location(s) of the unmanned aerial vehicle at one or more future times. In some implementations, operation 1405 may be performed by a processor component the same as or similar to predicted path component 1224 (shown in FIG. 12 and described herein).

At operation 1406, responsive to detecting a stationary object, it may be determined whether the unmanned aerial vehicle moving in the predicted vehicle path will collide with the detected stationary object. One or more collisions may be determined at one or more locations and/or at one or more future times. In some implementations, operation 1406 may be performed by a processor component the same as or similar to collision detection component 1225 (shown in FIG. 12 and described herein).

At operation 1407, responsive to detecting a moving object, moving object physical model information may be obtained. The moving object physical model information may characterize the motion of one or more moving objects. The accuracy of the moving object physical model information may be characterized by a moving object physical model accuracy and/or other information. In some implementations, operation 1407 may be performed by a processor component the same as or similar to physical model information component 1223 (shown in FIG. 12 and described herein).

At operation 1408, responsive to detecting the moving object, a predicted moving object path may be determined. The predicted moving object path may include predicted location(s) of the moving object at one or more future times. In some implementations, operation 1408 may be performed by a processor component the same as or similar to predicted path component 1224 (shown in FIG. 12 and described herein).

At operation 1409, responsive to detecting the moving object, it may be determined whether the unmanned aerial vehicle moving in the predicted vehicle path will collide with the detected moving object. One or more collisions may be determined at one or more locations and/or at one or more future times. In some implementations, operation 1409 may be performed by a processor component the same as or similar to collision detection component 1225 (shown in FIG. 12 and described herein).

At operation 1410, responsive to determining a collision, a velocity of the unmanned aerial vehicle may be changed to avoid the collision. Changing the velocity of the unmanned aerial vehicle may include changing one or more speeds of the unmanned aerial vehicle. Changing the velocity of the unmanned aerial vehicle may include changing one or more directions of the unmanned aerial vehicle to move the unmanned aerial vehicle in a path that deviates from the predicted vehicle path. In some implementations, operation 1410 may be performed by a processor component the same as or similar to collision avoidance component 1226 (shown in FIG. 12 and described herein).

Figure 20:
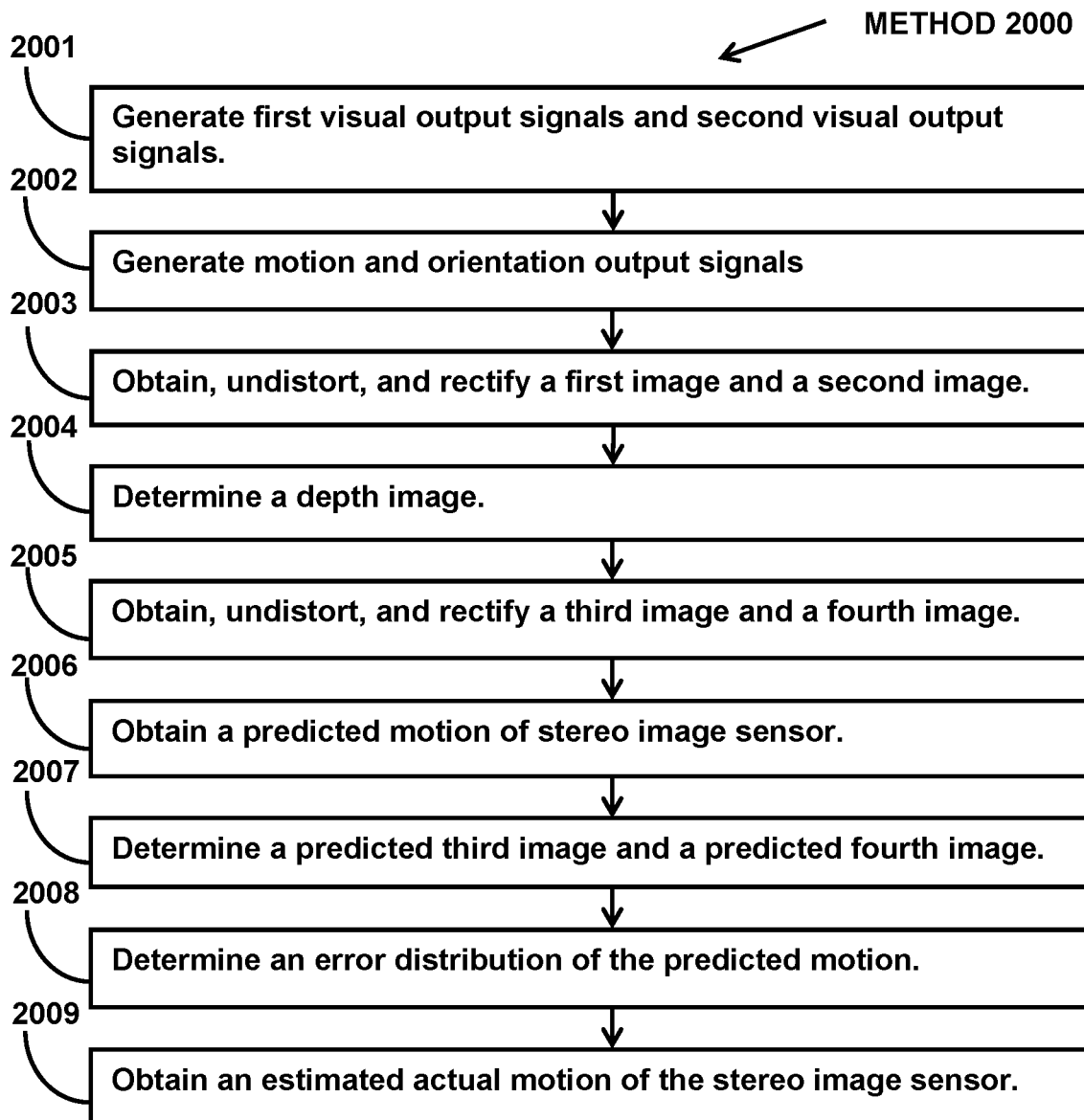
FIG. 20 illustrates a method for estimating an ego-motion.

FIG. 20 illustrates method 2000 for ego-motion estimation. The operations of method 2000 presented below are intended to be illustrative. In some implementations, method 2000 may be accomplished with one or more additional operations not described, and/or without one or more of the operations discussed. In some implementations, two or more of the operations may occur substantially simultaneously.

Referring to FIG. 20 and method 2000, at operation 2001, first visual output signals and second visual output signals may be generated. The first visual output signals may be generated by a first image sensor of a stereo image sensor. The second visual output signals may be generated by a second image sensor of the stereo image sensor. The first visual output signals may convey visual information within a field of view of a first image sensor. The second visual output signals may convey visual information within a field of view of a first image sensor. In some implementations, operation 2001 may be performed by one or more sensors the same as or similar to stereo image sensor 1512, first image sensor 1531, and/or second image sensor 1532 (shown in FIG. 15 and described herein).

At operation 2002, motion and orientation output signals may be generated. The motion and orientation output signals may convey motion information and orientation information of the stereo image sensor. In some implementations, operation 2002 may be performed by a sensor the same as or similar to motion and orientation sensor 1513 (shown in FIG. 15 and described herein).

At operation 2003, a first image and a second image may be obtained, undistorted and rectified. The first image may be determined based on the first visual output signals such that the first visual output signals used to determine the first image are generated by the first image sensor at a first time. The second image may be determined based on the second visual output signals such that the second visual output signals used to determine the second image are generated by the second image sensor at the first time. In some implementations, operation 2003 may be performed by a processor component the same as or similar to imaging component 1520 (shown in FIG. 15 and described herein).

At operation 2004, a depth image may be determined. The depth image may be determined based on a comparison of the first image and the second image. The depth image may include pixel values characterizing distances between the stereo image sensor and objects within the first image and the second image. In some implementations, operation 2004 may be performed by a processor component the same as or similar to depth image component 1521 (shown in FIG. 15 and described herein).

At operation 2005, a third image and a fourth image may be obtained, undistorted and rectified. The third image may be determined based on the first visual output signals such that the first visual output signals used to determine the first image are generated by the first image sensor at a second time that is subsequent to the first time. The fourth image may be determined based on the second visual output signals such that the second visual output signals used to determine the second image are generated by the second image sensor at the second time. In some implementations, operation 2005 may be performed by a processor component the same as or similar to imaging component 1520 (shown in FIG. 15 and described herein).

At operation 2006, a predicted motion of a stereo image sensor may be obtained. The predicted motion of the stereo image sensors may be determined based on the motion and orientation output signals. In some implementations, operation 2006 may be performed by a processor component the same as or similar to predicted motion component 1522 (shown in FIG. 15 and described herein).

At operation 2007, a predicted third image and a predicted fourth image may be determined. The predicted third image may be determined by adjusting the first image based on the predicted motion of the stereo image sensor, the depth image, and/or other information. The predicted fourth image may be determined by adjusting the second image based on the predicted motion of the image sensor, the depth image, and/or other information. In some implementations, operation 2007 may be performed by a processor component the same as or similar to predicted imaging component 1523 (shown in FIG. 15 and described herein).

At operation 2008, an error distribution of the predicted motion may be determined. The error distribution of the predicted motion may be determined by comparing the third image with the predicted third image and the fourth image with the predicted fourth image. In some implementations, operation 2008 may be performed by a processor component the same as or similar to error component 1524 (shown in FIG. 15 and described herein).

At operation 2009, an estimated actual motion of the stereo image sensors may be obtained. The estimated actual motion of the stereo image sensors may be determined by adjusting the predicted motion of the stereo image sensor to reduce the error distribution of the predicted motion of the stereo image sensor. In some implementations, operation 2009 may be performed by a processor component the same as or similar to actual motion component 1525 (shown in FIG. 15 and described herein).

Figure 25:
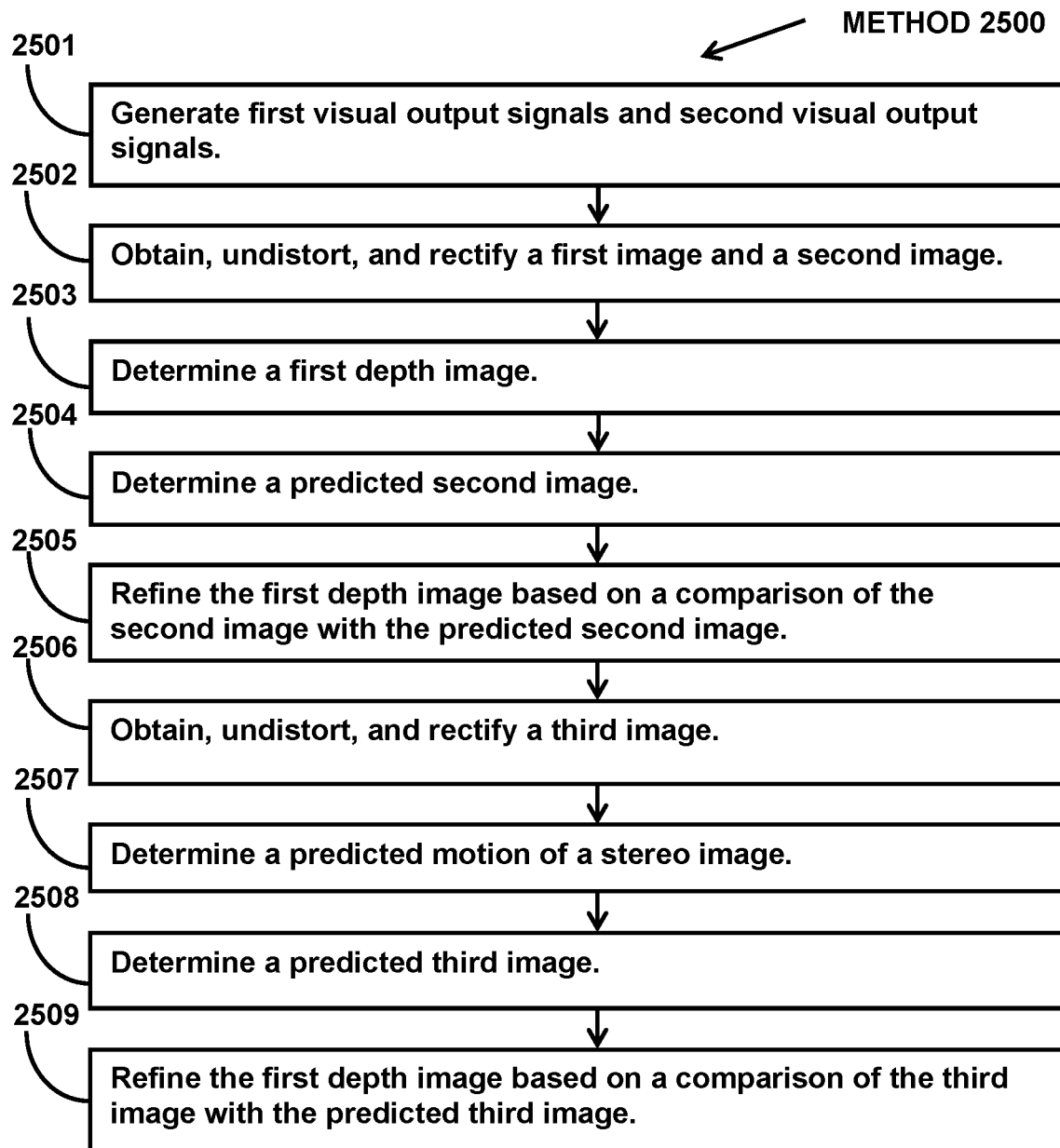
FIG. 25 illustrates a method for refining a depth image.

FIG. 25 illustrates method 2500 for refining a depth image. The operations of method 2500 presented below are intended to be illustrative. In some implementations, method 2500 may be accomplished with one or more additional operations not described, and/or without one or more of the operations discussed. In some implementations, two or more of the operations may occur substantially simultaneously.

Referring to FIG. 25 and method 2500, at operation 2501, first visual output signals and second visual output signals may be generated. The first visual output signals may be generated by a first image sensor of a stereo image sensor. The second visual output signals may be generated by a second image sensor of the stereo image sensor. The first visual output signals may convey visual information within a field of view of a first image sensor. The second visual output signals may convey visual information within a field of view of a first image sensor. In some implementations, operation 2501 may be performed by one or more sensors the same as or similar to stereo image sensor 2112, first image sensor 2131, and/or second image sensor 2132 (shown in FIG. 21 and described herein).

At operation 2502, a first image and a second image may be obtained, undistorted and rectified. The first image may be determined based on the first visual output signals such that the first visual output signals used to determine the first image are generated by the first image sensor at a first time. The second image may be determined based on the second visual output signals such that the second visual output signals used to determine the second image are generated by the second image sensor at the first time. In some implementations, operation 2502 may be performed by a processor component the same as or similar to imaging component 2120 (shown in FIG. 21 and described herein).

At operation 2503, a first depth image may be determined. The first depth image may be determined based on a comparison of the first image and the second image. The depth image may include pixel values characterizing distances between the stereo image sensor and objects within the first image and the second image. In some implementations, operation 2503 may be performed by a processor component the same as or similar to depth image component 2121 (shown in FIG. 21 and described herein).

At operation 2504, a predicted second image may be determined. The predicted second image may be determined by adjusting the first image based on the first depth image, and/or other information. In some implementations, operation 2504 may be performed by a processor component the same as or similar to predicted imaging component 2123 (shown in FIG. 21 and described herein).

At operation 2505, the first depth image may be refined based on a comparison of the second image with the predicted second image. Refining the first depth image based on the comparison of the second image with the predicted second image may include determining a mismatch between an image patch in the second image with a corresponding image patch in the predicted second image. Responsive to the mismatch meeting and/or exceeding an error threshold, one or more pixel values of the first depth image corresponding to the image patch may be rejected. In some implementations, operation 2505 may be performed by a processor component the same as or similar to refine component 2124 (shown in FIG. 21 and described herein).

At operation 2506, a third image may be obtained, undistorted and rectified. The third image may be determined based on the first visual output signals such that the first visual output signals used to determine the first image are generated by the first image sensor at a second time that is subsequent to the first time. In some implementations, operation 2506 may be performed by a processor component the same as or similar to imaging component 2120 (shown in FIG. 21 and described herein).

At operation 2507, a predicted motion of a stereo image sensor may be determined. In some implementations, the predicted motion of the stereo image sensor may be determined based on motion and orientation output signals. The motion and orientation output signals may convey motion information and orientation information of the stereo image sensor. In some implementations, the predicted motion may be determined based on visual odometry. In some implementations, operation 2507 may be performed by a processor component the same as or similar to predicted motion component 2122 (shown in FIG. 21 and described herein).

At operation 2508, a predicted third image may be determined. The predicted third image may be determined by adjusting the first image based on the predicted motion, the first depth image, and/or other information. In some implementations, operation 2508 may be performed by a processor component the same as or similar to predicted imaging component 2123 (shown in FIG. 21 and described herein).

At operation 2509, the first depth image may be refined based on a comparison of the third image with the predicted third image. Refining the first depth image based on the comparison of the third image with the predicted third image may include determining a mismatch between an image patch in the third image with a corresponding image patch in the predicted third image. Responsive to the mismatch meeting and/or exceeding an error threshold, one or more pixel values of the first depth image corresponding to the image patch may be rejected. In some implementations, operation 2509 may be performed by a processor component the same as or similar to refine component 2124 (shown in FIG. 21 and described herein).

In some implementations, one or more of methods 700, 1100, 1400, 2000, 2500 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of methods 700, 1100, 1400, 2000, 2500 in response to instructions stored electronically on one or more electronic storage mediums. The one or more processing devices may include one or more devices configured through hardware, firmware, and/or software to be specifically designed for execution of one or more of the operations of methods 700, 1100, 1400, 2000, 2500.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An aerial vehicle, comprising:
a sensor generating information from an environment around the aerial vehicle; and
a processing apparatus coupled to a memory storing instructions that when executed causes the processing apparatus to:
generate a depth map based on the environment, the depth map including maps cells corresponding to longitude angles and to latitude angles, wherein the depth map represents distances to closest surfaces of the environment around the aerial vehicle, and wherein the depth map is a function of longitude angles and latitude angles; and
provide controls for the aerial vehicle based on the depth map; and
wherein to generate the depth map comprises to:
determine distance values for the map cells based on the distances to the closest surfaces of the environment around the aerial vehicle, wherein a first distance value for a first map cell is determined based on a first distance to a first closest surface of the environment around the aerial vehicle at a first longitude angle and a first latitude angle.

2. The aerial vehicle of claim 1, wherein the depth map includes a dead zone in a polar region, and the distance values are not determined for the map cells in the dead zone.

3. The aerial vehicle of claim 1, wherein the determination of the distance values disregards distances to surfaces of the environment around the aerial vehicle at individual longitude angles and individual latitude angles that are greater than the distances to the closest surfaces of the environment around the aerial vehicle at the individual longitude angles and the individual latitude angles.

4. The aerial vehicle of claim 3, wherein the distance values correspond only to the closest surfaces of the environment around the aerial vehicle at the individual longitude angles and the individual latitude angles.

5. The aerial vehicle of claim 1, wherein the sensor is a stereo image sensor comprising:
a first image sensor configured to generate first visual output signals providing first visual information within a first field of view of the first image sensor; and
a second image sensor configured to generate second visual output signals providing second visual information within a second field of view of the second image sensor, wherein the depth map is generated by comparing the first visual information with the second visual information.

6. The aerial vehicle of claim 1, wherein the processing apparatus comprises a hardware-implemented processor and a software-implemented processor.

7. The aerial vehicle of claim 6, wherein the hardware-implemented processor is located remotely from the software-implemented processor.

8. The aerial vehicle of claim 1, further including instructions that when executed causes the processing apparatus to:
responsive to detecting the aerial vehicle traveling a threshold distance, transform the depth map such that the center of the depth map coincides with a location of the aerial vehicle.

9. A method, comprising:
generating a depth map based on an environment of an unmanned aerial vehicle, the depth map including maps cells corresponding to longitude angles and to latitude angles, wherein the depth map represents distances to closest surfaces of the environment around the aerial vehicle, wherein the depth map is a function of longitude angles and latitude angles; and
providing controls for the unmanned aerial vehicle based on the depth map;
wherein to generate the depth map comprises to:
determine distance values for the map cells based on the distances to the closest surfaces of the environment around the aerial vehicle, wherein a first distance value for a first map cell is determined based on a first distance to a first closest surface of the environment around the aerial vehicle at a first longitude angle and a first latitude angle.

10. The method of claim 9, wherein the depth map includes a dead zone in a polar region, and the distance values are not determined for the map cells in the dead zone.

11. The method of claim 9, wherein the determination of the distance values disregards distances to surfaces of the environment around the aerial vehicle at individual longitude angles and individual latitude angles that are greater than the distances to the closest surfaces of the environment around the aerial vehicle at the individual longitude angles and the individual latitude angles.

12. The method of claim 9, comprising:
generating first visual output signals conveying first visual information within a first field of view of a first image sensor of the unmanned aerial vehicle; and
generating second visual output signals conveying second visual information within a second field of view of a second image sensor of the unmanned aerial vehicle, wherein the depth map is generated by comparing the first visual information with the second visual information.

13. The method of claim 9, comprising:
responsive to detecting the unmanned aerial vehicle traveling a threshold distance, transforming the depth map such that the center of the depth map coincides with a location of the unmanned aerial vehicle.

14. A non-transitory computer-readable medium including instructions that, when executed by one or more processors, cause the one or more processors to:
generate visual information from an environment around an unmanned aerial vehicle;
generate a depth map based on the environment, the depth map including maps cells corresponding to longitude angles and to latitude angles, wherein the depth map represents distances to closest surfaces of the environment around the aerial vehicle, wherein the depth map is a function of longitude angles and latitude angles;
providing controls for the unmanned aerial vehicle based on the depth map; and
determine distance values for the map cells based on the distances to the closest surfaces of the environment around the aerial vehicle, wherein a first distance value for a first map cell is determined based on a first distance to a first closest surface of the environment around the aerial vehicle at a first longitude angle and a first latitude angle.

15. The non-transitory computer-readable medium of claim 14, wherein the depth map includes a dead zone in a polar region, and the distance values are not determined for the map cells in the dead zone.

16. The non-transitory computer-readable medium of claim 14, wherein the determination of the distance values disregards distances to surfaces of the environment around the aerial vehicle at individual longitude angles and individual latitude angles that are greater than the distances to the closest surfaces of the environment around the aerial vehicle at the individual longitude angles and the individual latitude angles.

17. The non-transitory computer-readable medium of claim 16, wherein the distance values correspond only to the closest surfaces of the environment around the aerial vehicle at the individual longitude angles and the individual latitude angles.

18. The non-transitory computer-readable medium of claim 14, wherein the unmanned aerial vehicle includes a sensor that is a stereo image sensor comprising:
a first image sensor configured to generate first visual output signals providing first visual information within a first field of view of the first image sensor; and
a second image sensor configured to generate second visual output signals providing second visual information within a second field of view of the second image sensor, wherein the depth map is generated by comparing the first visual information with the second visual information.

19. The non-transitory computer-readable medium of claim 14, wherein the one or more processors comprise a hardware-implemented processor and a software-implemented processor; and
wherein the hardware-implemented processor is located remotely from the software-implemented processor.

20. The non-transitory computer-readable medium of claim 14, further including instructions that when executed causes the processing apparatus to:
responsive to detecting the aerial vehicle traveling a threshold distance, transform the depth map such that the center of the depth map coincides with a location of the aerial vehicle.

* * * * *